(12) United States Patent
Nakashima et al.

(10) Patent No.: US 10,539,797 B2
(45) Date of Patent: Jan. 21, 2020

(54) METHOD OF PROVIDING VIRTUAL SPACE, PROGRAM THEREFOR, AND RECORDING MEDIUM

(71) Applicant: COLOPL, Inc., Tokyo (JP)

(72) Inventors: Kento Nakashima, Tokyo (JP); Yuichiro Arai, Tokyo (JP); Naruatsu Baba, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/588,590

(22) Filed: May 5, 2017

(65) Prior Publication Data
US 2018/0003979 A1 Jan. 4, 2018

(30) Foreign Application Priority Data

May 6, 2016 (JP) .................. 2016-093196
May 17, 2016 (JP) .................. 2016-099088
(Continued)

(51) Int. Cl.
*G06F 3/01* (2006.01)
*G02B 27/01* (2006.01)
*G06Q 30/02* (2012.01)

(52) U.S. Cl.
CPC ......... *G02B 27/0172* (2013.01); *G06F 3/013* (2013.01); *G06Q 30/0277* (2013.01);
(Continued)

(58) Field of Classification Search
CPC ...... G02B 2027/0138; G02B 2027/014; G02B 2027/0141; G02B 2027/0187;
(Continued)

(56) References Cited

U.S. PATENT DOCUMENTS 7,411,594 B2 * 8/2008 Endo ............ G09B 29/10
345/633
2002/0154070 A1 10/2002 Sato et al.
(Continued)

FOREIGN PATENT DOCUMENTS

JP    2002-271693 A    9/2002
JP    2003-248844 A    9/2003
(Continued)

OTHER PUBLICATIONS

Nabi, Michael, "Exclusive Interview with Oculus on the Future of the Samsung Gear VR", Heavy.com [Online], Jun. 30, 2015 (Searched Nov. 15, 2016) URL, http://heavy.com/tech/2015/06/exclusive-interview-with-oculus-on-the-future-of-the-samsung-gear-vr/.
(Continued)

*Primary Examiner* — Tony O Davis
(74) *Attorney, Agent, or Firm* — Hauptman Ham, LLP

(57) ABSTRACT

A method of providing a 360 degree virtual space to a head mounted display (HMD). The method includes defining the 360 degree virtual space including sections. The method further includes generating synthetic content by synthesizing a main content and sub-content, the main content to be played in the 360 degree virtual space as a 360 degree movie in accordance with a predetermined timeline, and the sub-content to be displayed in a part of a display region of the main content at a temporal position defined by the timeline, the display region is specified by one or more sections of the 360 degree virtual space. The method further includes adapting the synthetic content to the 360 degree virtual space. The method further includes determining a line of sight of a user. The method further includes specifying a field-of-view region based on the line of sight. The method further includes generating a field-of-view image corre-
(Continued)

sponding to the field-of-view region in the synthetic content to output the field-of-view image to the HMD.

12 Claims, 26 Drawing Sheets

(30) Foreign Application Priority Data

May 17, 2016 (JP) .................................. 2016-099108
May 17, 2016 (JP) .................................. 2016-099119

(52) U.S. Cl.
CPC ................. *G02B 2027/014* (2013.01); *G02B 2027/0141* (2013.01); *G02B 2027/0187* (2013.01)

(58) Field of Classification Search
CPC ........ G02B 2027/0198; G02B 27/0093; G02B 27/017; G02B 27/0172; G06F 1/163; G06F 3/011; G06F 3/012; G06F 3/013; G06F 3/0304; G06Q 30/0277
USPC .................................................. 345/1.1, 633
See application file for complete search history.

(56) References Cited

U.S. PATENT DOCUMENTS

| | | | |
|---|---|---|---|
| 2003/0126035 A1 | 7/2003 | Kake et al. | |
| 2005/0179685 A1 | 8/2005 | Kake et al. | |
| 2011/0140994 A1 | 6/2011 | Noma | |
| 2011/0169928 A1 | 7/2011 | Gassel et al. | |
| 2012/0210255 A1 | 8/2012 | Ooi et al. | |
| 2013/0194305 A1 | 8/2013 | Kakuta et al. | |
| 2013/0314402 A1* | 11/2013 | Furumura | G03B 35/02 345/419 |
| 2014/0139624 A1* | 5/2014 | Shinozaki | H04N 5/23238 348/38 |
| 2014/0327666 A1* | 11/2014 | Suzuki | G06T 19/006 345/419 |
| 2014/0361956 A1 | 12/2014 | Mikhailov et al. | |
| 2014/0362084 A1 | 12/2014 | Ooi et al. | |
| 2014/0364215 A1 | 12/2014 | Mikhailov et al. | |
| 2015/0163473 A1* | 6/2015 | Osawa | H04N 13/044 348/53 |
| 2015/0260990 A1* | 9/2015 | Ueno | G02B 27/017 345/419 |
| 2015/0379777 A1* | 12/2015 | Sasaki | A63F 13/211 345/633 |
| 2016/0129346 A1 | 5/2016 | Mikhailov et al. | |
| 2016/0136523 A1* | 5/2016 | Yano | A63B 13/52 463/31 |
| 2016/0282619 A1 | 9/2016 | Oto et al. | |
| 2016/0364916 A1 | 12/2016 | Terahata | |
| 2017/0024935 A1* | 1/2017 | Baba | G06F 3/01 |
| 2017/0059871 A1* | 3/2017 | Hashiba | G02B 27/0179 |
| 2017/0076497 A1* | 3/2017 | Inomata | G06F 3/0346 |
| 2017/0098330 A1* | 4/2017 | Inomata | G06T 19/006 |
| 2017/0150139 A1* | 5/2017 | Lee | H04N 13/0497 |
| 2017/0171539 A1* | 6/2017 | Inomata | H04N 13/0497 |
| 2017/0221180 A1* | 8/2017 | Nakashima | G06F 3/013 |
| 2017/0295363 A1* | 10/2017 | Kikuchi | H04N 13/0062 |
| 2017/0322624 A1* | 11/2017 | Niccolini | G06F 3/013 |
| 2018/0003979 A1* | 1/2018 | Nakashima | G02B 27/0172 |

FOREIGN PATENT DOCUMENTS

| | | |
|---|---|---|
| JP | 2005-173042 A | 6/2005 |
| JP | 2009-145883 A | 7/2009 |
| JP | 2010-256534 A | 11/2010 |
| JP | 2011-128220 A | 6/2011 |
| JP | 2012-48597 A | 3/2012 |
| JP | 2012-168798 A | 9/2012 |
| JP | 2013-258614 A | 12/2013 |
| JP | 2014-203153 A | 10/2014 |
| JP | 2015-95045 A | 5/2015 |
| JP | 5777185 B1 | 9/2015 |
| JP | 5869177 B1 | 2/2016 |
| JP | 5876607 B1 | 3/2016 |
| JP | 5882517 B1 | 3/2016 |
| JP | 5914739 B1 | 5/2016 |
| WO | 2014/200779 A2 | 12/2014 |

OTHER PUBLICATIONS

Office Action in JP Application in 2016-099088, dated Nov. 22, 2016.
Office Action in JP Application in 2016-099088, dated Mar. 14, 2017.
Office Action in JP Application in 2016-099108, dated Nov. 22, 2016.
Notice to grant a patent in JP Application No. 2016-099108, dated Mar. 14, 2017.
Office Action in JP Application No. 2016-099119, dated Nov. 22, 2016.
Notice to grant a patent in JP Application No. 2016-099119, dated Mar. 14, 2017.
Office Action in JP Application No. 2016-093196, dated Nov. 1, 2016.
Office Action in JP Application No. 2016-093196, dated Jan. 31, 2017.

* cited by examiner

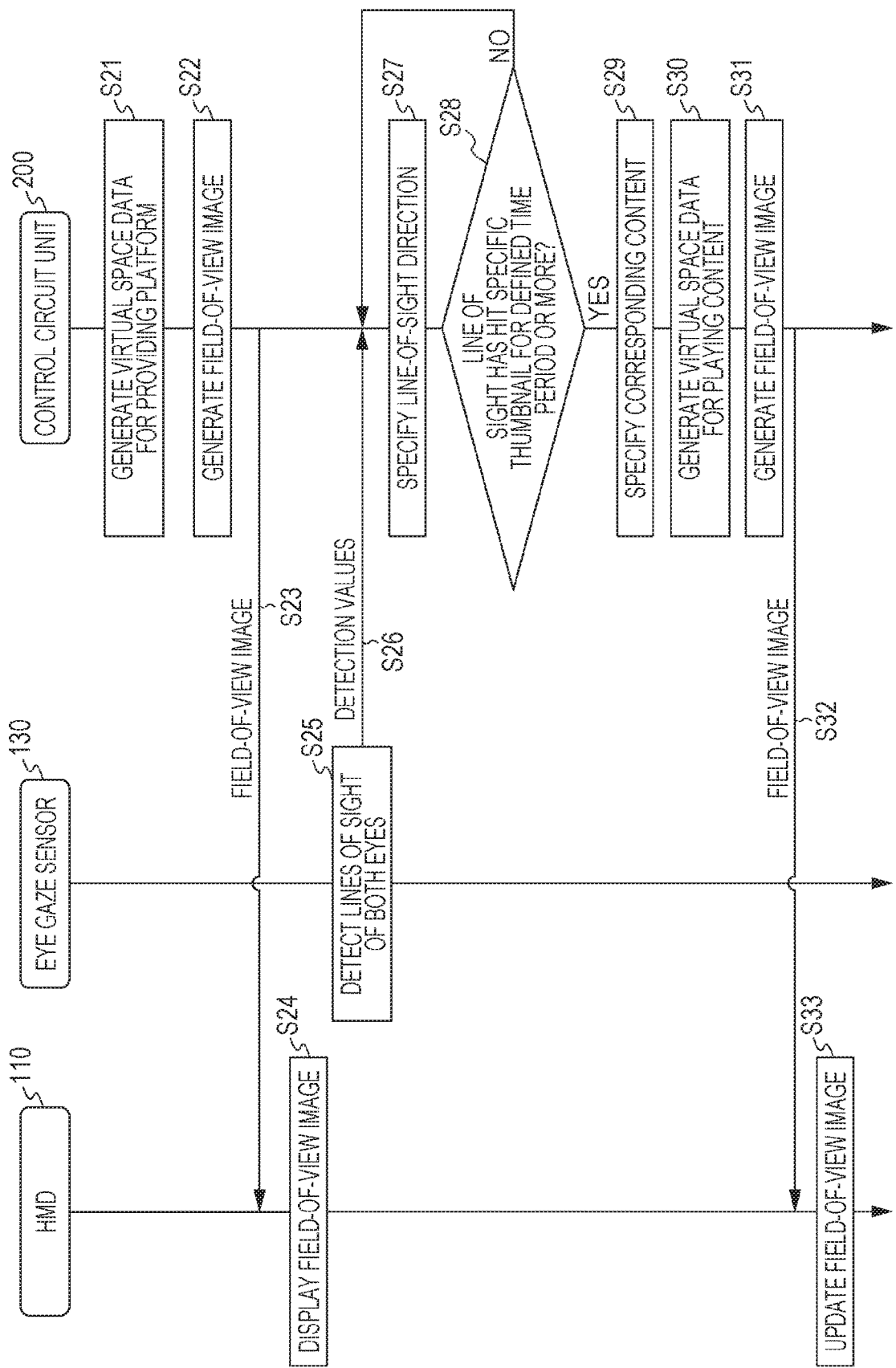

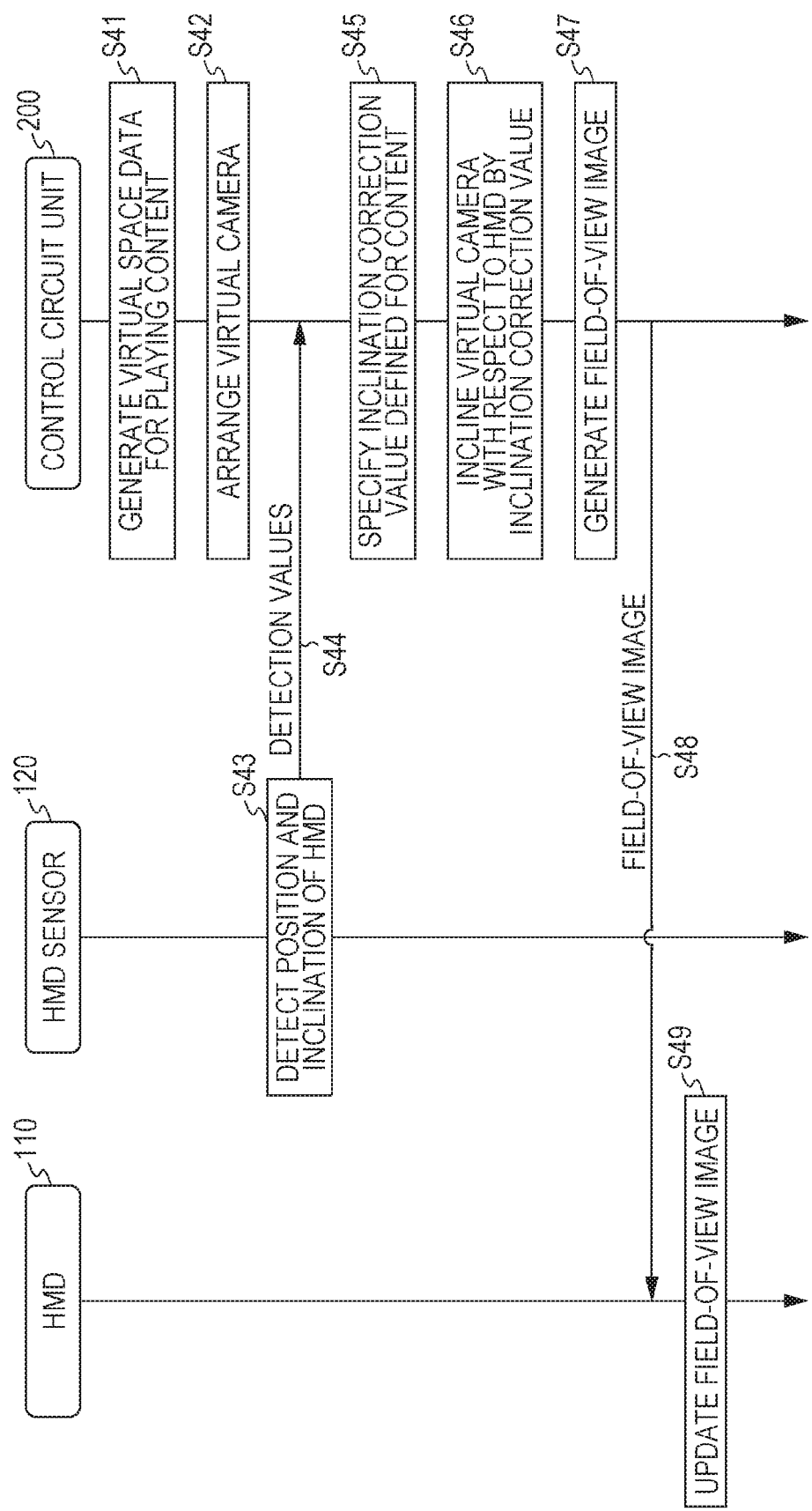

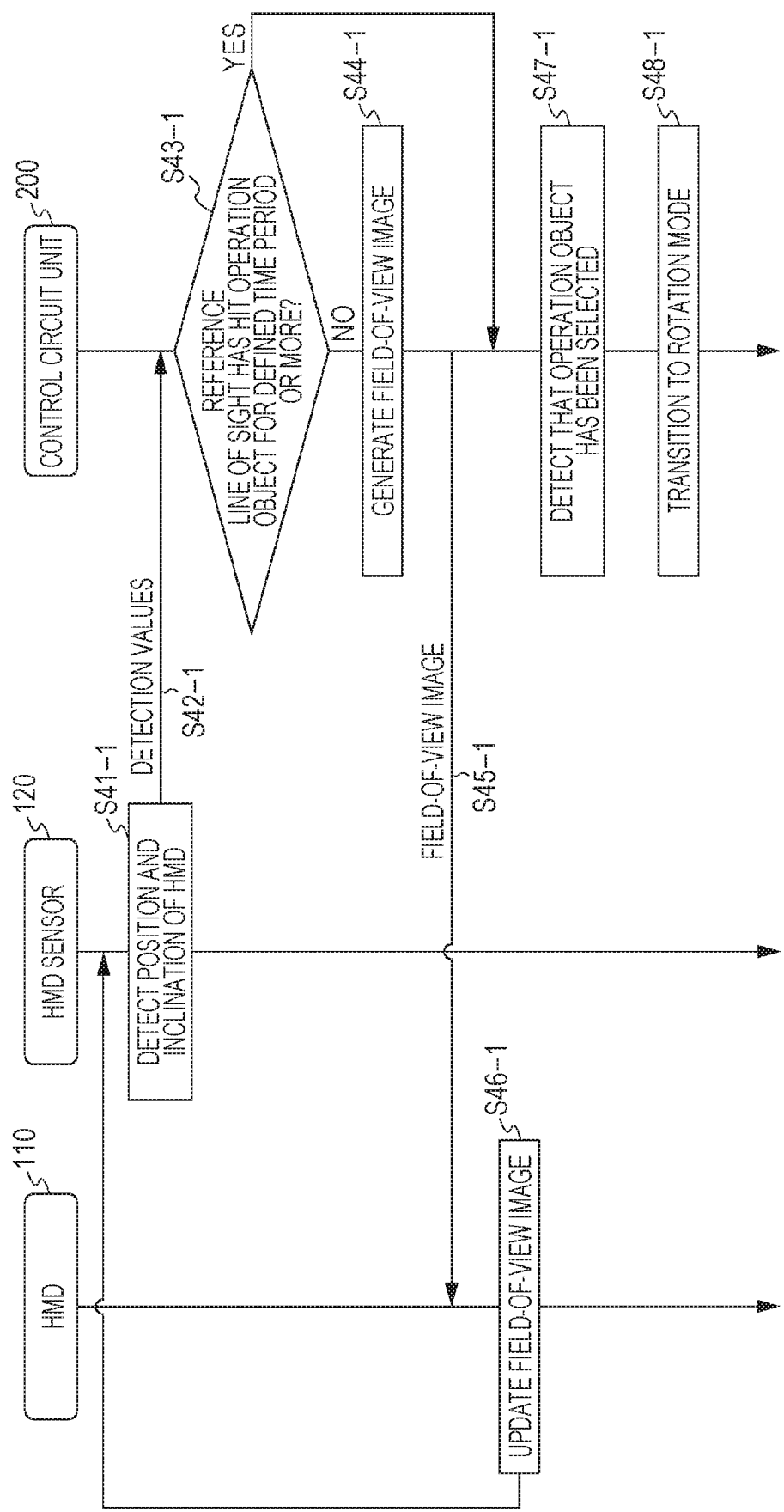

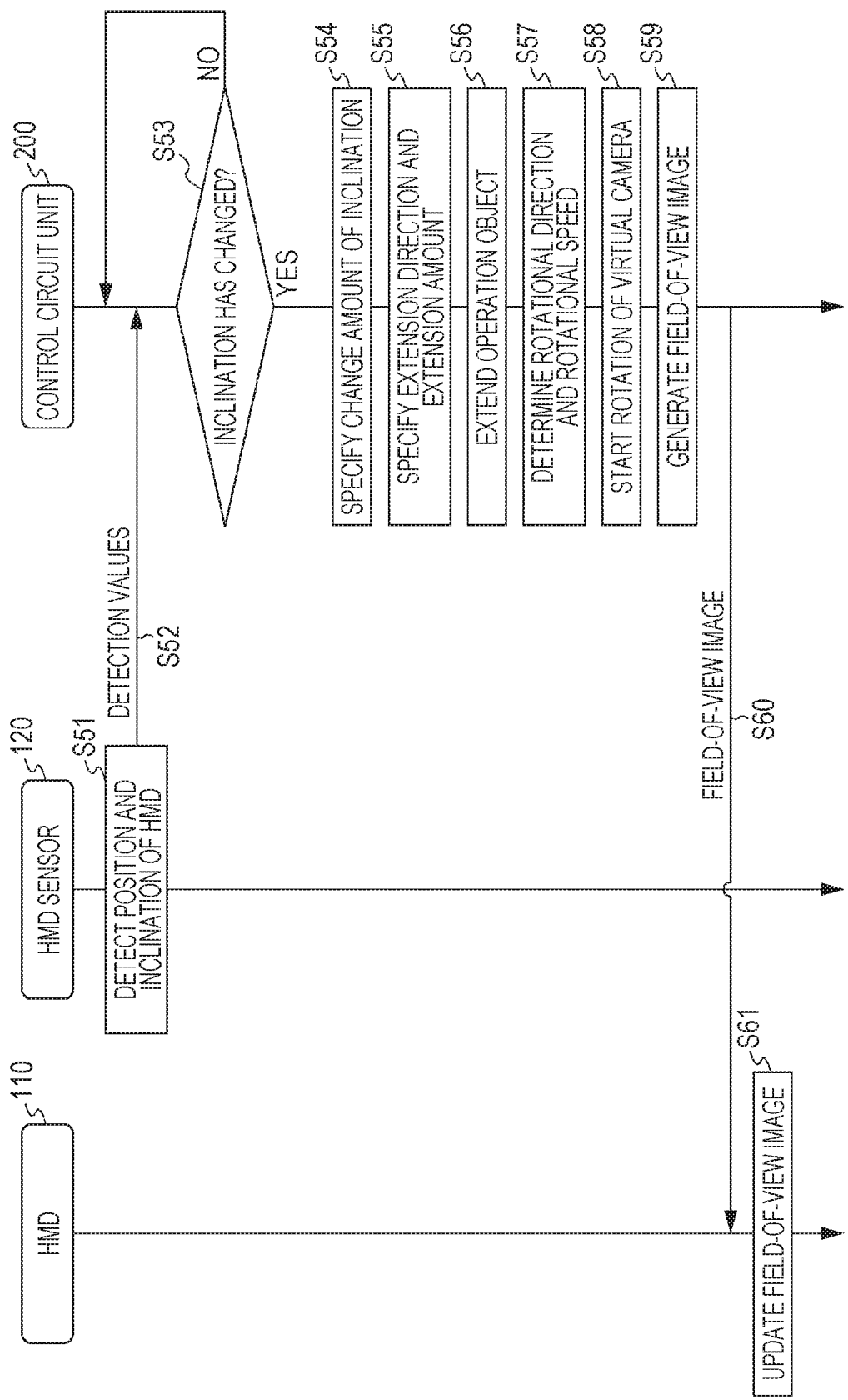

METHOD OF PROVIDING VIRTUAL SPACE, PROGRAM THEREFOR, AND RECORDING MEDIUM

RELATED APPLICATIONS

The present application claims priority to Japanese Patent Application Numbers 2016-099088, 2016-099108, 2016-099119 filed May 17, 2016, and 2016-093196 filed May 6, 2016, the disclosures of which are hereby incorporated by reference herein in their entirety.

TECHNICAL FIELD

This disclosure relates to a method of providing a virtual space, a system, and a non-transitory storage medium.

BACKGROUND

In Patent Literature 1, a method of displaying objects such as a billboard and a message board in a virtual space is described. In Patent Literature 2, there is described a system for viewing content with use of a head mounted display. In Patent Literature 3, a system for viewing content with use of a head mounted display is described. In Patent Literature 4, a technology for enabling a user to visually recognize content played in a virtual space via a head mounted display is described.

Patent Literature

[Patent Literature 1] Japanese Patent Application Laid-open No. 2003-248844
[Patent Literature 2] Japanese Patent No. 5882517
[Patent Literature 3] Japanese Patent Application Laid-open No. 2013-258614
[Patent Literature 4] Japanese Patent Application Laid-open No. 2009-145883

SUMMARY

A user viewing moving image content using a head mounted display is immersed deeper in the world of the moving image content than a user viewing the moving image content with a stationary television or the like. In view of this, when an advertisement is be displayed on the head mounted display playing the moving image content, increased advertising effectiveness can be expected.

This disclosure has been made in view of such circumstances, and describes a method of displaying another piece of content, for example, an advertisement when moving image content is played on a head mounted display.

According to at least one embodiment of this disclosure, a method includes providing a virtual space to a user wearing a head mounted display (hereinafter referred to as "HMD"). The method includes defining the virtual space. The method further includes generating synthetic content by synthesizing moving image content to be played in the virtual space and sub-content to be displayed in a part of a display region of the moving image content. The method further includes adapting the synthetic content to the virtual space. The method further includes specifying a line of sight of the user. The method further includes specifying a field-of-view region based on the line of sight. The method further includes generating a field-of-view image corresponding to the field-of-view region in the synthetic content to output the field-of-view image to the HMD.

Using this method, displaying another piece of content, for example, an advertisement when moving image content is played on the head mounted display is possible.

BRIEF DESCRIPTION OF THE DRAWINGS

FIG. 9 is a sequence diagram of a method of processing performed by an HMD system to play, in a virtual space, moving image content selected by the user via a platform in the virtual space according to at least one embodiment.

FIG. 16 is a sequence diagram of a flow of processing performed by an HMD system to provide a virtual space including a virtual camera whose inclination is corrected to the user according to at least one embodiment.

FIG. 21 is a sequence diagram of a flow of processing performed by an HMD system to transition to a rotation mode according to at least one embodiment.

FIG. 22 is a sequence diagram of a flow of processing performed by a control circuit unit when a rotation of the virtual camera is started in the rotation mode according to at least one embodiment.

DETAILED DESCRIPTION

Specific examples of a method of providing a virtual space and a system according to at least one embodiment of this disclosure are described below with reference to the drawings. This disclosure is not limited to those examples, and is defined by the appended claims. This disclosure encompasses all modifications within the appended claims and the equivalents thereof. In the following description, like elements are denoted by like reference symbols in the description of the drawings, and redundant description thereof is not repeated for the sake of brevity.

Figure 1:
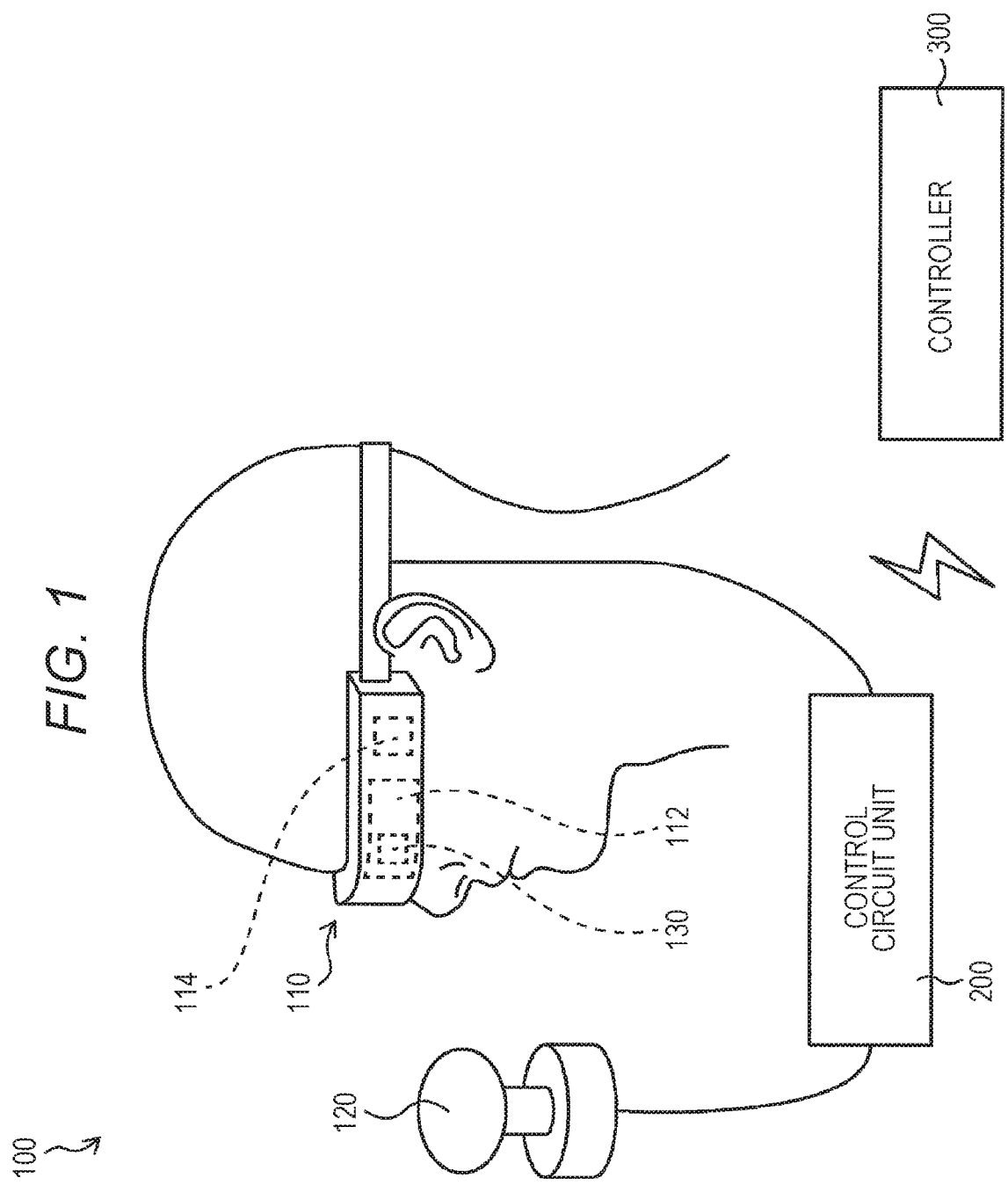
FIG. 1 is a diagram of a configuration of a head mounted display (HMD) system according to at least one embodiment.

FIG. 1 is a diagram of a configuration of a head mounted display (HMD) system 100 according to at least one embodiment. As illustrated in FIG. 1, the HMD system 100 includes an HMD 110, an HMD sensor 120, a control circuit unit 200, and a controller 300.

The HMD 110 is configured to be worn on a head of a user. The HMD 110 includes a display 112 that is a non-transmissive or partially transmissive display device, a sensor 114, and an eye gaze sensor 130. The HMD 110 is configured to cause the display 112 to display each of a right-eye image and a left-eye image, to thereby enable the user to visually recognize a three-dimensional image to be three-dimensionally visually recognized by the user based on binocular parallax of both eyes of the user. A virtual space is provided to the user in this way. The display 112 is arranged in front of the user's eyes, and hence the user can be immersed in the virtual space via an image displayed on the display 112. The virtual space may include a background, various objects that can be operated by the user, menu images, and the like.

The display 112 may include a right-eye sub-display configured to display a right-eye image, and a left-eye sub-display configured to display a left-eye image. Alternatively, the display 112 may be constructed of one display device configured to display the right-eye image and the left-eye image on a common screen. Examples of such a display device include a display device configured to switch at high speed, for example, using a shutter, that enables recognition of a display image with only one eye, to thereby independently and alternately display the right-eye image and the left-eye image.

Figure 2:
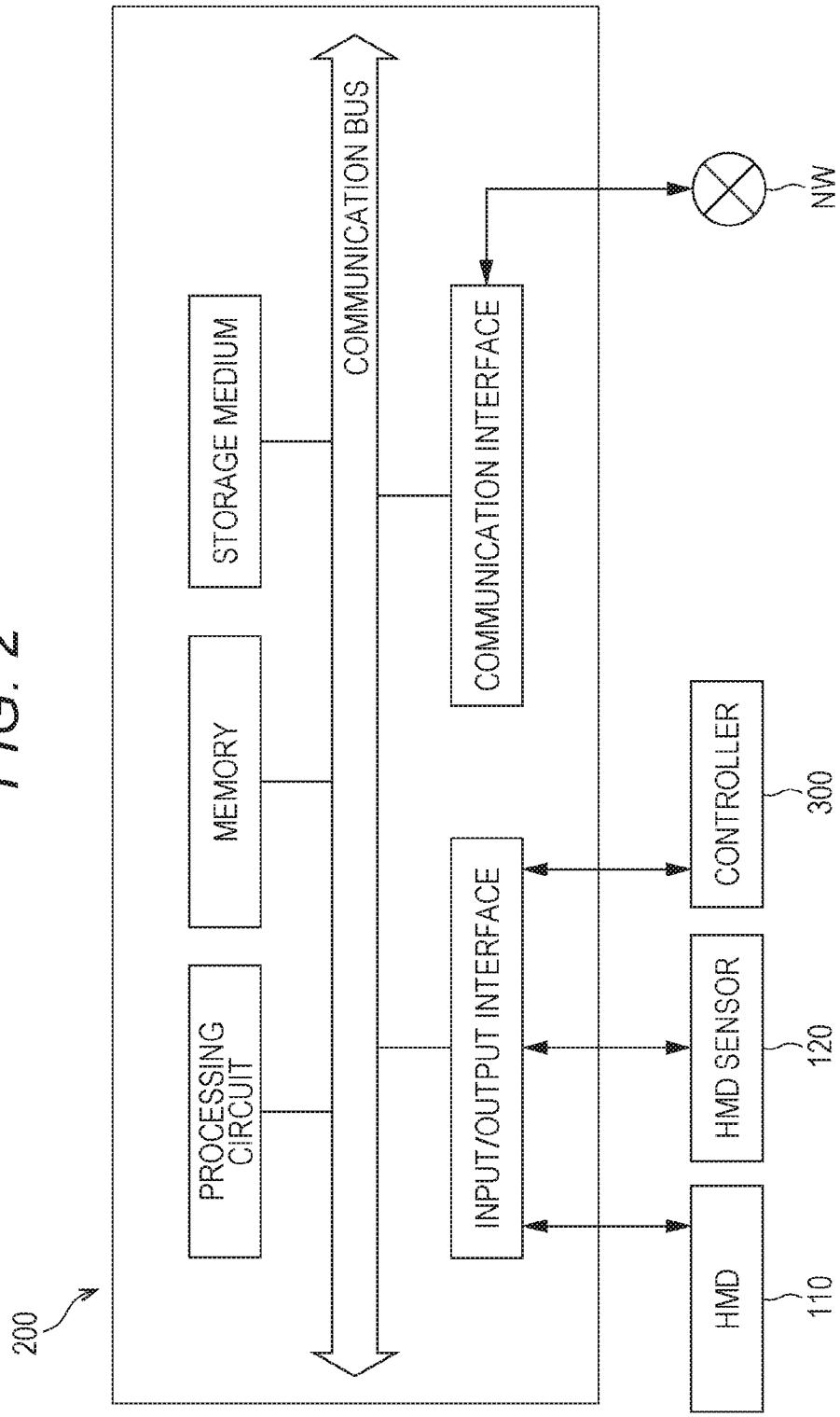
FIG. 2 is a diagram of a hardware configuration of a control circuit unit according to at least one embodiment.

FIG. 2 is a diagram of a hardware configuration of the control circuit unit 200 according to at least one embodiment. The control circuit unit 200 is a computer for causing the HMD 110 to provide a virtual space. As illustrated in FIG. 2, the control circuit unit 200 includes a processor, a memory, a storage, an input/output interface, and a communication interface. Those components are connected to each other in the control circuit unit 200 via a bus serving as a data transmission path.

The processor includes a central processing unit (CPU), a micro-processing unit (MPU), a graphics processing unit (GPU), or the like, and is configured to control the operation of the control circuit unit 200 and HMD system 100.

The memory functions as a main storage. The memory stores programs to be processed by the processor and control data (for example, calculation parameters). The memory may include a read only memory (ROM), a random access memory (RAM), or the like.

The storage functions as an auxiliary storage. The storage stores instructions for controlling the operation of the HMD system 100, various simulation programs and user authentication programs, and various kinds of data (for example, images and objects) for defining the virtual space. Further, a database including tables for managing various kinds of data may be constructed in the storage. The storage may include a flash memory, a hard disc drive (HDD), or the like.

The input/output interface includes various wire connection terminals such as a universal serial bus (USB) terminal, a digital visual interface (DVI) terminal, and a high-definition multimedia interface (HDMI) (R) terminal, and/or various processing circuits for wireless connection. The input/output interface is configured to connect the HMD 110, various sensors including the HMD sensor 120, and the controller 300 to each other.

The communication interface includes various wire connection terminals for communicating to/from an external apparatus via a network NW, and/or various processing circuits for wireless connection. The communication interface is configured to adapt to various communication standards and protocols for communication via a local area network (LAN) or the Internet.

The control circuit unit 200 is configured to load a predetermined application program stored in the storage to the memory to execute the program, to thereby provide the virtual space to the user. Further, at the time of execution of the program, the memory and the storage store various instructions for operating various objects to be arranged in the virtual space, or for displaying and controlling various menu images and the like.

The control circuit unit 200 may be mounted on the HMD 110, or may not be mounted thereon. That is, the control circuit unit 200 may be constructed as different hardware independent of the HMD 110 (for example, a personal computer, or a server apparatus that can communicate to/from the HMD 110 via a network). The control circuit unit 200 may be a device in which one or more functions are implemented through cooperation between a plurality of pieces of hardware. Alternatively, only a part of all the functions of the control circuit unit 200 may be performed by hardware mounted on the HMD 110, and other functions may be performed by hardware separate from the HMD 110.

In each element, for example, the HMD 110, constructing the HMD system 100, a global coordinate system (reference coordinate system, xyz coordinate system) is set in advance. The global coordinate system has three reference directions (axes) that are respectively parallel to a vertical direction, a lateral direction orthogonal to the vertical direction, and a front-rear direction orthogonal to both of the vertical direction and the lateral direction in a real space. In at least one embodiment, the global coordinate system is one type of point-of-view coordinate system, and hence the lateral direction, the vertical direction (up-down direction), and the front-rear direction of the global coordinate system are referred to as an x axis, a y axis, and a z axis, respectively. Specifically, the x axis of the global coordinate system is parallel to the lateral direction of the real space, the y axis thereof is parallel to the vertical direction of the real space, and the z axis thereof is parallel to the front-rear direction of the real space.

The HMD sensor 120 has a position tracking function for detecting the movement of the HMD 110. The HMD sensor 120 is configured to detect the position and the inclination of the HMD 110 in the real space with this function. In order to enable this detection, the HMD 110 includes a plurality of light sources (not shown). Each of the light sources is, for example, an LED configured to emit an infrared ray. The HMD sensor 120 includes, for example, an infrared sensor. The HMD sensor 120 is configured to detect the infrared ray emitted from the light source of the HMD 110 by the infrared sensor, to thereby detect a detection point of the HMD 110. Further, the HMD sensor 120 is configured to detect, based on a detection value of the detection point of the HMD 110, the position and the inclination of the HMD 110 in the real space based on the movement of the user. The HMD sensor 120 can determine a time change of the position and the inclination of the HMD 110 based on a temporal change of the detection value.

The HMD sensor 120 may include an optical camera. In at least one embodiment, the HMD sensor 120 detects the position and the inclination of the HMD 110 based on image information of the HMD 110 obtained by the optical camera.

The HMD 110 may use the sensor 114 instead of the HMD sensor 120 to detect the position and the inclination of the HMD 110. In at least one embodiment, the sensor 114 may be, for example, an angular velocity sensor, a geomagnetic sensor, an acceleration sensor, or a gyrosensor. The HMD 110 uses at least one of those sensors. When the sensor 114 is the angular velocity sensor, the sensor 114 detects over time the angular velocity about three axes in the real space of the HMD 110 in accordance with the movement of the HMD 110. The HMD 110 can determine the time change of the angle about the three axes of the HMD 110 based on the detection value of the angular velocity, and can detect the inclination of the HMD 110 based on the time change of the angle.

In at least one embodiment, when the HMD 110 detects the position and the inclination of the HMD 110 based on the detection value of the sensor 114, the HMD system 100 does not require the HMD sensor 120. In at least one embodiment, when the HMD sensor 120 arranged at a position away from the HMD 110 detects the position and the inclination of the HMD 110, the HMD 110 does not require the sensor 114.

As described above, the global coordinate system is parallel to the coordinate system of the real space. Therefore, each inclination of the HMD 110 detected by the HMD sensor 120 corresponds to each inclination about the three axes of the HMD 110 in the global coordinate system. The HMD sensor 120 is configured to set a UVW visual-field coordinate system to the HMD 110 based on the detection value of the inclination of the HMD sensor 120 in the global coordinate system. The UVW visual-field coordinate system set in the HMD 110 corresponds to the point-of-view coordinate system used when the user wearing the HMD 110 views an object.

Figure 3:
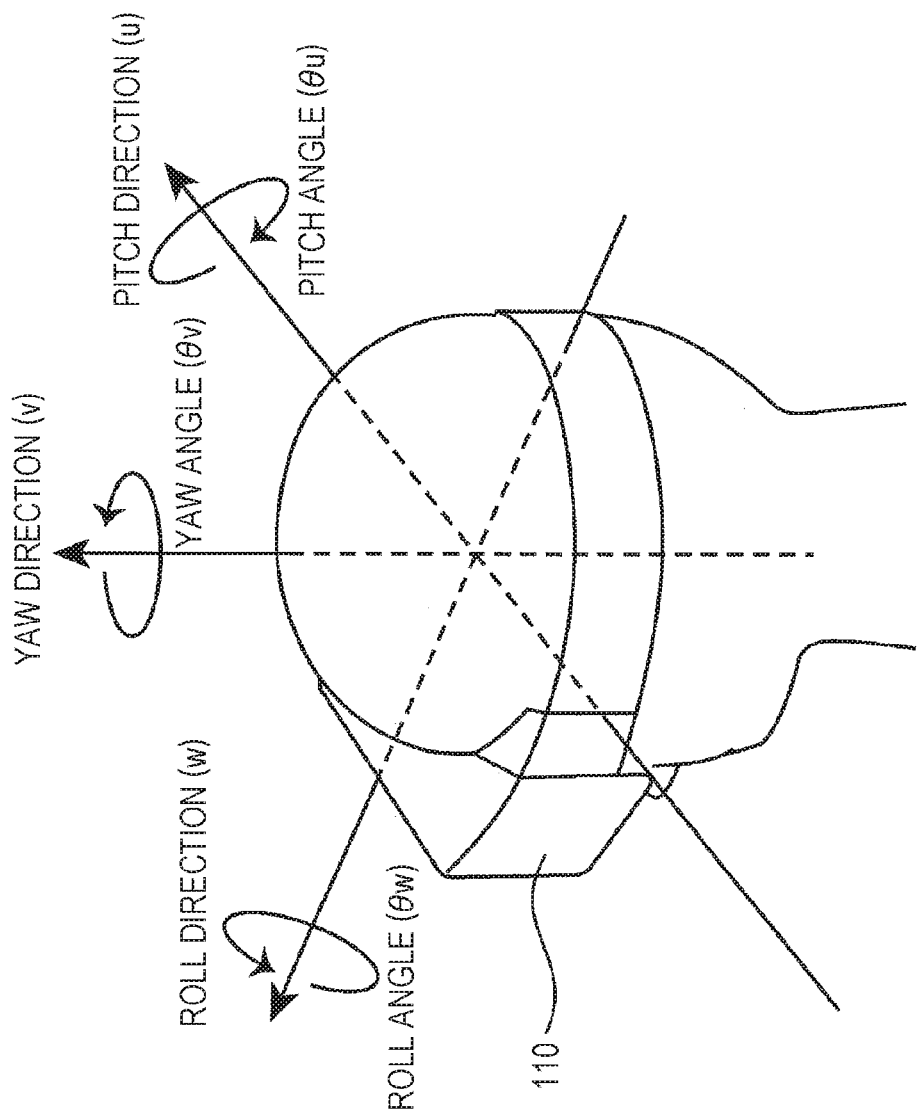
FIG. 3 is a diagram of a visual-field coordinate system to be set in an HMD according to at least one embodiment.

FIG. 3 is a diagram of a UVW visual-field coordinate system to be set in the HMD 110 according to at least one embodiment. The HMD sensor 120 detects the position and the inclination of the HMD 110 in the global coordinate system when the HMD 110 is activated. Then, a three-dimensional UVW visual-field coordinate system based on the detection value of the inclination is set to the HMD 110. As illustrated in FIG. 3, the HMD sensor 120 sets, to the HMD 110, a three-dimensional UVW visual-field coordinate system defining the head of the user wearing the HMD 110 as a center (origin). Specifically, new three directions obtained by inclining the lateral direction, the vertical direction, and the front-rear direction (x axis, y axis, and z axis), which define the global coordinate system, about the respective axes by the inclinations about the respective axes of the HMD 110 in the global coordinate system are set as a pitch direction (u axis), a yaw direction (v axis), and a roll direction (w axis) of the UVW visual-field coordinate system in the HMD 110.

As illustrated in FIG. 3, when the user wearing the HMD 110 is standing upright and is visually recognizing the front side, the HMD sensor 120 sets the UVW visual-field coordinate system that is parallel to the global coordinate system to the HMD 110. In this case, the lateral direction (x axis), the vertical direction (y axis), and the front-rear direction (z axis) of the global coordinate system directly match with the pitch direction (u axis), the yaw direction (v axis), and the roll direction (w axis) of the UVW visual-field coordinate system in the HMD 110.

After the UVW visual-field coordinate system is set to the HMD 110, the HMD sensor 120 can detect the inclination (change amount of the inclination) of the HMD 110 in the UVW visual-field coordinate system that is currently set based on the movement of the HMD 110. In at least one embodiment, the HMD sensor 120 detects, as the inclination of the HMD 110, each of a pitch angle ($\theta u$), a yaw angle ($\theta v$), and a roll angle ($\theta w$) of the HMD 110 in the uvw visual-field coordinate system that is currently set. The pitch angle ($\theta u$) is an inclination angle of the HMD 110 about the pitch direction in the UVW visual-field coordinate system. The yaw angle ($\theta v$) is an inclination angle of the HMD 110 about the yaw direction in the UVW visual-field coordinate system. The roll angle (θw) is an inclination angle of the HMD 110 about the roll direction in the UVW visual-field coordinate system.

The HMD sensor 120 newly sets, based on the detection value of the inclination of the HMD 110, the UVW visual-field coordinate system of the HMD 110 obtained after the movement to the HMD 110. The relationship between the HMD 110 and the UVW visual-field coordinate system of the HMD 110 is always constant regardless of the position and the inclination of the HMD 110. When the position and the inclination of the HMD 110 change, the position and the inclination of the UVW visual-field coordinate system of the HMD 110 in the global coordinate system similarly change in synchronization therewith.

The HMD sensor 120 may specify the position of the HMD 110 in the real space as a position relative to the HMD sensor 120 based on the light intensity of the infrared ray or a relative positional relationship between a plurality of detection points (for example, a distance between the detection points), which is acquired by the infrared sensor. Further, the origin of the UVW visual-field coordinate system of the HMD 110 in the real space (global coordinate system) maybe determined based on the specified relative position. Further, the HMD sensor 120 may detect the inclination of the HMD 110 in the real space based on the relative positional relationship between the plurality of detection points, and further determine the direction of the UVW visual-field coordinate system of the HMD 110 in the real space (global coordinate system) based on the detection value of the inclination.

Figure 4:
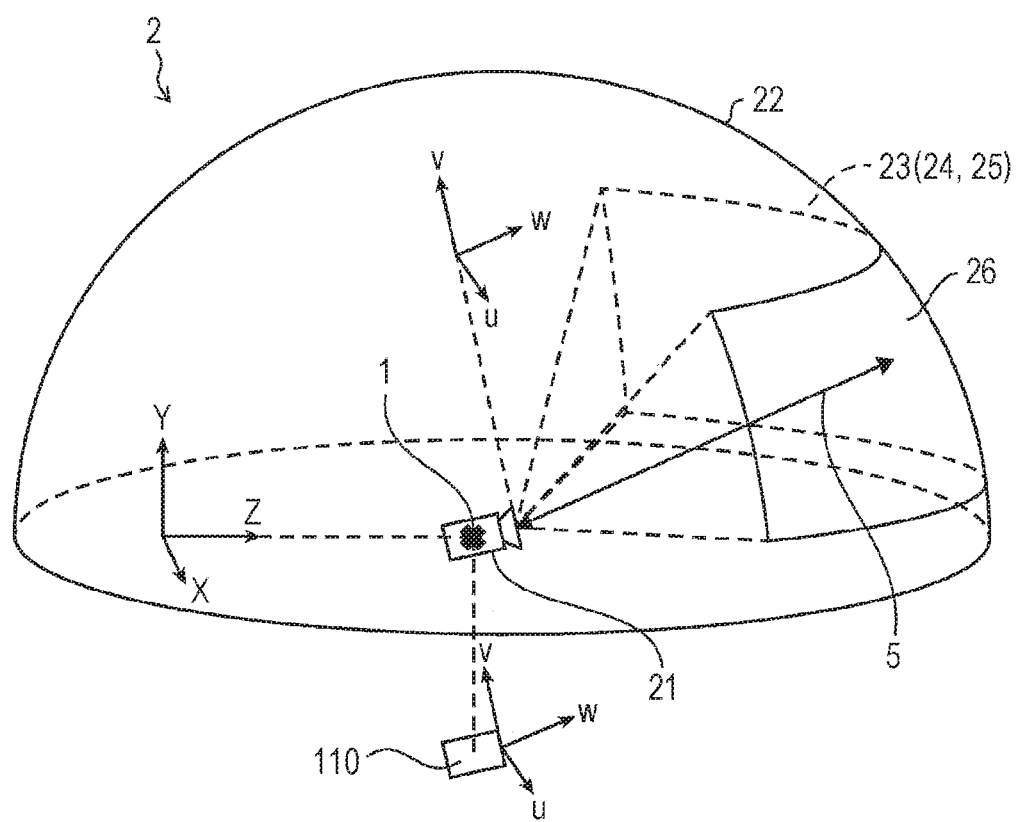
FIG. 4 is a diagram of an overview of a virtual space to be provided to a user according to at least one embodiment.

FIG. 4 is a diagram of an overview of a virtual space 2 to be provided to the user according to at least one embodiment. As illustrated in FIG. 4, the virtual space 2 has a structure with an entire celestial sphere shape covering a center 21 in all 360-degree directions. In FIG. 4, only the upper-half celestial sphere of the entire virtual space 2 is illustrated for the sake of clarity. One of ordinary skill in the art would recognize that a lower-half celestial sphere is also part of the virtual space 2. A plurality of substantially-square or substantially-rectangular mesh sections are associated with the virtual space 2. The position of each mesh section in the virtual space 2 is defined in advance as coordinates in a spatial coordinate system (XYZ coordinate system) defined in the virtual space 2. The control circuit unit 200 associates each partial image forming content (for example, still image or moving image) that can be developed in the virtual space 2 with each corresponding mesh section in the virtual space 2, to thereby provide, to the user, the virtual space 2 in which a virtual space image 22 that can be visually recognized by the user is developed.

In the virtual space 2, an XYZ spatial coordinate system having the center 21 as the origin is defined. The XYZ coordinate system is, for example, parallel to the global coordinate system. The XYZ coordinate system is one type of the point-of-view coordinate system, and hence the lateral direction, the vertical direction (up-down direction), and the front-rear direction of the XYZ coordinate system are referred to as an X axis, a Y axis, and a Z axis, respectively. That is, the X axis (lateral direction) of the XYZ coordinate system is parallel to the x axis of the global coordinate system, the Y axis (up-down direction) of the XYZ coordinate system is parallel to the y axis of the global coordinate system, and the Z axis (front-rear direction) of the XYZ coordinate system is parallel to the z axis of the global coordinate system.

When the HMD 110 is activated (in an initial state), a virtual camera 1 is arranged at the center 21 of the virtual space 2. In synchronization with the movement of the HMD 110 in the real space, the virtual camera 1 similarly moves in the virtual space 2. With this, the change in position and direction of the HMD 110 in the real space is reproduced similarly in the virtual space 2.

The UVW visual-field coordinate system is defined in the virtual camera 1 similarly to the HMD 110. The UVW visual-field coordinate system of the virtual camera 1 in the virtual space 2 is defined so as to change to the UVW visual-field coordinate system of the HMD 110 in the real space (global coordinate system). Therefore, when the inclination of the HMD 110 changes, the inclination of the virtual camera 1 also changes in synchronization therewith. The virtual camera 1 is also able to move in the virtual space 2 in synchronization with the movement of the user wearing the HMD 110 in the real space.

The direction of the virtual camera 1 in the virtual space 2 is determined based on the position and the inclination of the virtual camera 1 in the virtual space 2. With this, a line of sight (reference line of sight 5) serving as a reference when the user visually recognizes the virtual space image 22 developed in the virtual space 2 is determined. The control circuit unit 200 determines a field-of-view region 23 in the virtual space 2 based on the reference line of sight 5. The field-of-view region 23 is a region corresponding to a field of view of the user wearing the HMD 110 in the virtual space 2.

Figure 5A:
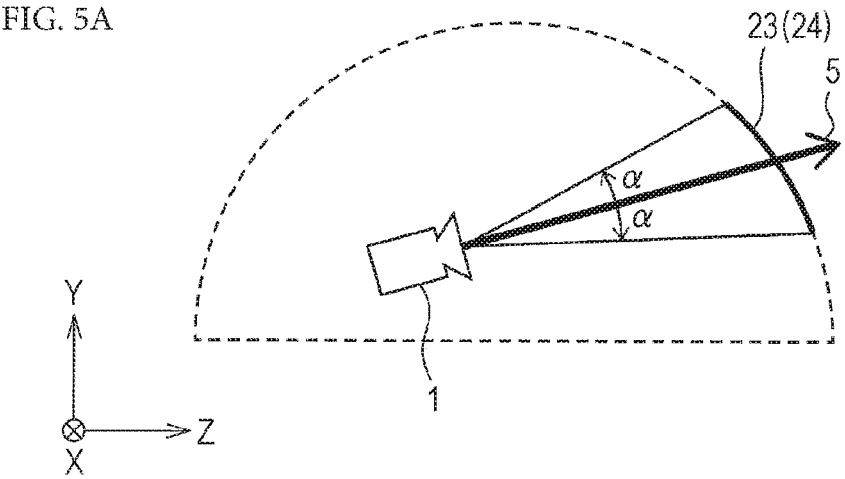
FIG. 5A is a diagram of a cross section of a field-of-view region in a Y-Z plane according to at least one embodiment.
Figure 5B:
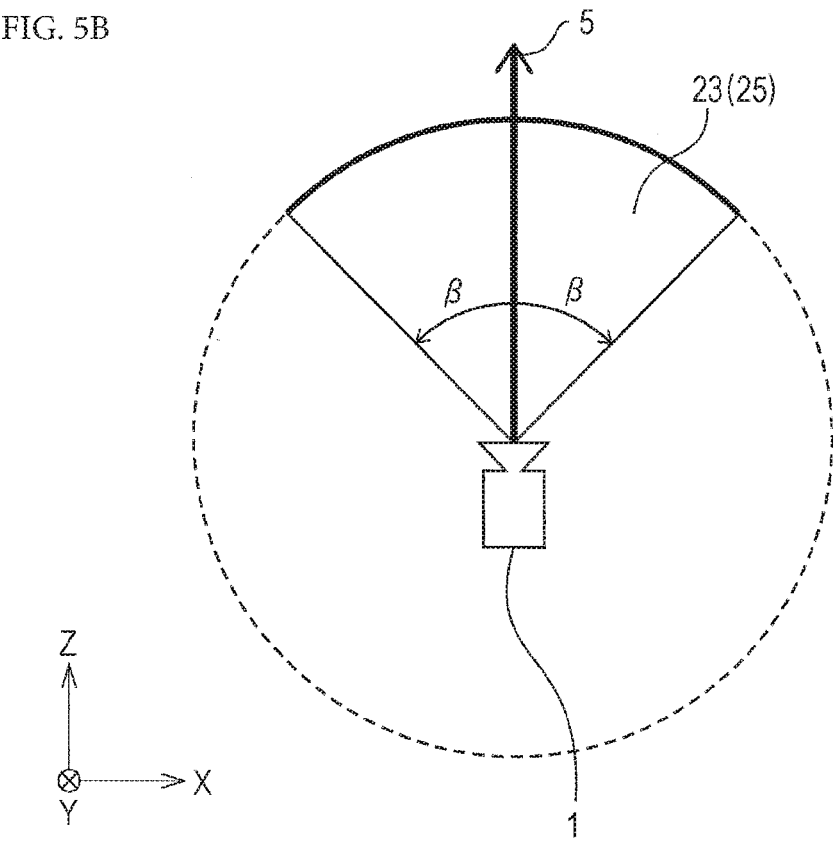
FIG. 5B is a diagram of a cross section of a field-of-view region in a X-Z plane according to at least one embodiment.

FIG. 5A is a diagram of a YZ cross section of the field-of-view region 23 as viewed from an X direction in the virtual space 2 according to at least one embodiment. FIG. 5B is a diagram of an XZ cross section of the field-of-view region 23 as viewed from a Y direction in the virtual space 2 according to at least one embodiment. The field-of-view region 23 has a first region 24 (see FIG. 5A) that is a range defined by the reference line of sight 5 and the YZ cross section of the virtual space 2, and a second region 25 (see FIG. 5B) that is a range defined by the reference line of sight 5 and the XZ cross section of the virtual space 2. The control circuit unit 200 sets, as the first region 24, a range of a polar angle α or more from the reference line of sight 5 serving as the center in the virtual space 2. Further, the control circuit unit 200 sets, as the second region 25, a range of an azimuth β or more from the reference line of sight 5 serving as the center in the virtual space 2.

The HMD system 100 provides the virtual space 2 to the user by displaying a field-of-view image 26, which is a part of the virtual space image 22 superimposing with the field-of-view region 23, on the display 112 of the HMD 110. When the user moves the HMD 110, the virtual camera 1 also moves in synchronization therewith. As a result, the position of the field-of-view region 23 in the virtual space 2 changes. In this manner, the field-of-view image 26 displayed on the display 112 is updated to an image that is superimposed with a portion (=field-of-view region 23) of the virtual space image 22 to which the user faces in the virtual space 2. Therefore, the user can visually recognize a desired portion of the virtual space 2.

The user cannot see the real world while wearing the HMD 110, and is able to visually recognize only the virtual space image 22 developed in the virtual space 2. Therefore, the HMD system 100 can provide a high sense of immersion in the virtual space 2 to the user.

The control circuit unit 200 may move the virtual camera 1 in the virtual space 2 in synchronization with the movement of the user wearing the HMD 110 in the real space. In at least one embodiment, the control circuit unit 200 specifies the field-of-view region 23 to be visually recognized by the user by being projected on the display 112 of the HMD 110 in the virtual space 2 based on the position and the direction of the virtual camera 1 in the virtual space 2.

In at least one embodiment, the virtual camera 1 includes a right-eye virtual camera configured to provide a right-eye image and a left-eye virtual camera configured to provide a left-eye image. Further, in at least one embodiment, an appropriate parallax is set for the two virtual cameras so that the user can recognize the three-dimensional virtual space 2. In at least one embodiment, as a representative of those virtual cameras, only such a virtual camera 1 that the roll direction (w) generated by combining the roll directions of the two virtual cameras is adapted to the roll direction (w) of the HMD 110 is illustrated and described.

The eye gaze sensor 130 has an eye tracking function of detecting directions (line-of-sight directions) in which the user's right and left eyes are directed. As the eye gaze sensor 130, a known sensor having the eye tracking function can be employed. In at least one embodiment, the eye gaze sensor 130 includes a right-eye sensor and a left-eye sensor. For example, the eye gaze sensor 130 may be a sensor configured to irradiate each of the right eye and the left eye of the user with infrared light to receive reflection light from the cornea and the iris with respect to the irradiation light, to thereby detect a rotational angle of each eyeball. The eye gaze sensor 130 can detect the line-of-sight direction of the user based on each detected rotational angle.

The line-of-sight direction of the user detected by the eye gaze sensor 130 is a direction in the point-of-view coordinate system obtained when the user visually recognizes an object. As described above, the uvw visual-field coordinate system of the HMD 110 is equal to the point-of-view coordinate system used when the user visually recognizes the display 112. Further, the uvw visual-field coordinate system of the virtual camera 1 is synchronized with the uvw visual-field coordinate system of the HMD 110. Therefore, in the HMD system 100, the user's line-of-sight direction detected by the eye gaze sensor 130 can be regarded as the user's line-of-sight direction in the uvw visual-field coordinate system of the virtual camera 1.

Figure 6:
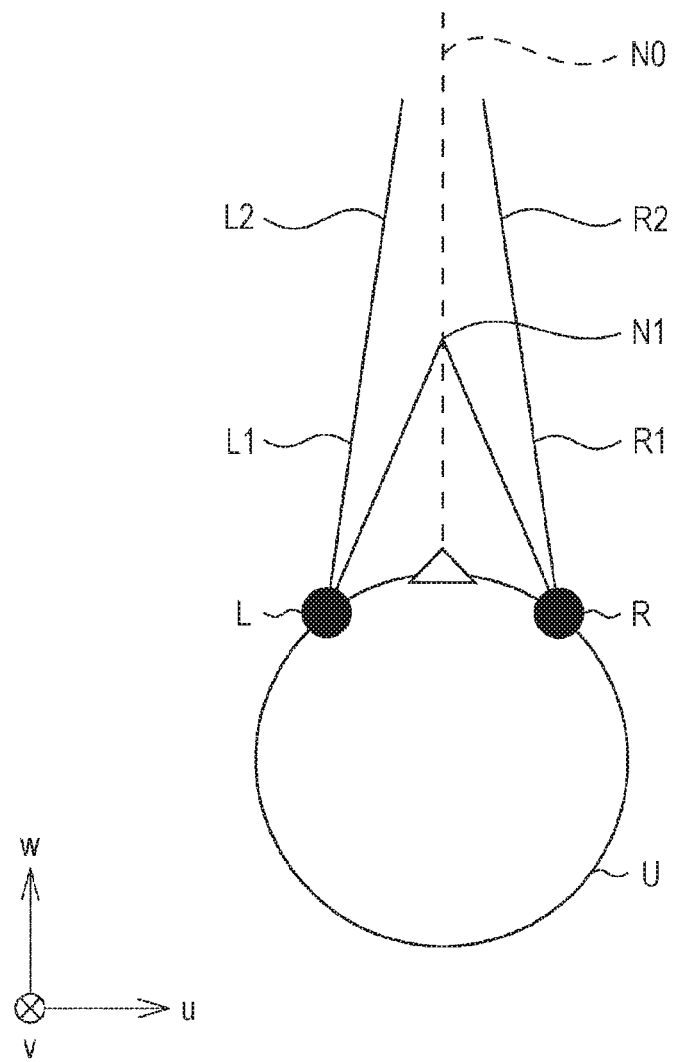
FIG. 6 is a diagram of a method of determining a line-of-sight direction of the user according to at least one embodiment.

FIG. 6 is a diagram of a method of determining the line-of-sight direction of the user according to at least one embodiment. As illustrated in FIG. 6, the eye gaze sensor 130 detects lines of sight of a right eye and a left eye of a user U. When the user U is looking at a near place, the eye gaze sensor 130 detects lines of sight R1 and L1 of the user U. When the user is looking at a far place, the eye gaze sensor 130 specifies lines of sight R2 and L2, which form smaller angles with respect to the roll direction (w) of the HMD 110 as compared to the lines of sight R1 and L1 of the user. The eye gaze sensor 130 transmits the detection values to the control circuit unit 200.

When the control circuit unit 200 receives the lines of sight R1 and L1 as the detection values of the lines of sight, the control circuit unit 200 specifies a point of gaze N1 being an intersection of both the lines of sight R1 and L1. Meanwhile, even when the control circuit unit 200 receives the lines of sight R2 and L2, the control circuit unit 200 specifies a point of gaze N1 (not shown) being an intersection of both the lines of sight R2 and L2. The control circuit unit 200 detects a line-of-sight direction N0 of the user U based on the specified point of gaze N1. The control circuit unit 200 detects, for example, an extension direction of a straight line that passes through the point of gaze N1 and a midpoint of a straight line connecting a right eye R and a left eye L of the user U to each other as the line-of-sight direction N0. The line-of-sight direction N0 is a direction in which the user U actually directs his or her lines of sight with both eyes. The line-of-sight direction N0 is also a direction in which the user U actually directs his or her lines of sight with respect to the field-of-view region 23.

The HMD system 100 may include microphones and speakers in any element constructing the HMD system 100. With this, the user can issue an instruction with sound to the virtual space 2. Further, the HMD system 100 may include a television receiver in any element in order to receive broadcast of a television program in a virtual television in the virtual space. Further, the HMD system 100 may have a communication function or the like in order to display an electronic mail or the like sent to the user.

The controller 300 is a device capable of transmitting various instructions based on the operation performed by the user to the control circuit unit 200. The controller 300 may be a portable terminal capable of performing wired or wireless communication. The controller 300 is able to be implemented by, for example, a smartphone, a personal digital assistant (PDA), a tablet computer, a game console, or a general-purpose personal computer (PC). In at least one embodiment, the controller 300 is a device including a touch panel, and there may be employed any terminal including a touch panel in which a processor, a memory, a storage, a communication unit, a display unit, and an input unit, which are connected to each other via a bus, are integrally constructed. The user can input various touch operations including tapping, swiping, and holding to the touch panel of the controller 300, to thereby affect a user interface (UI) or various objects arranged in the virtual space 2.

Figure 7:
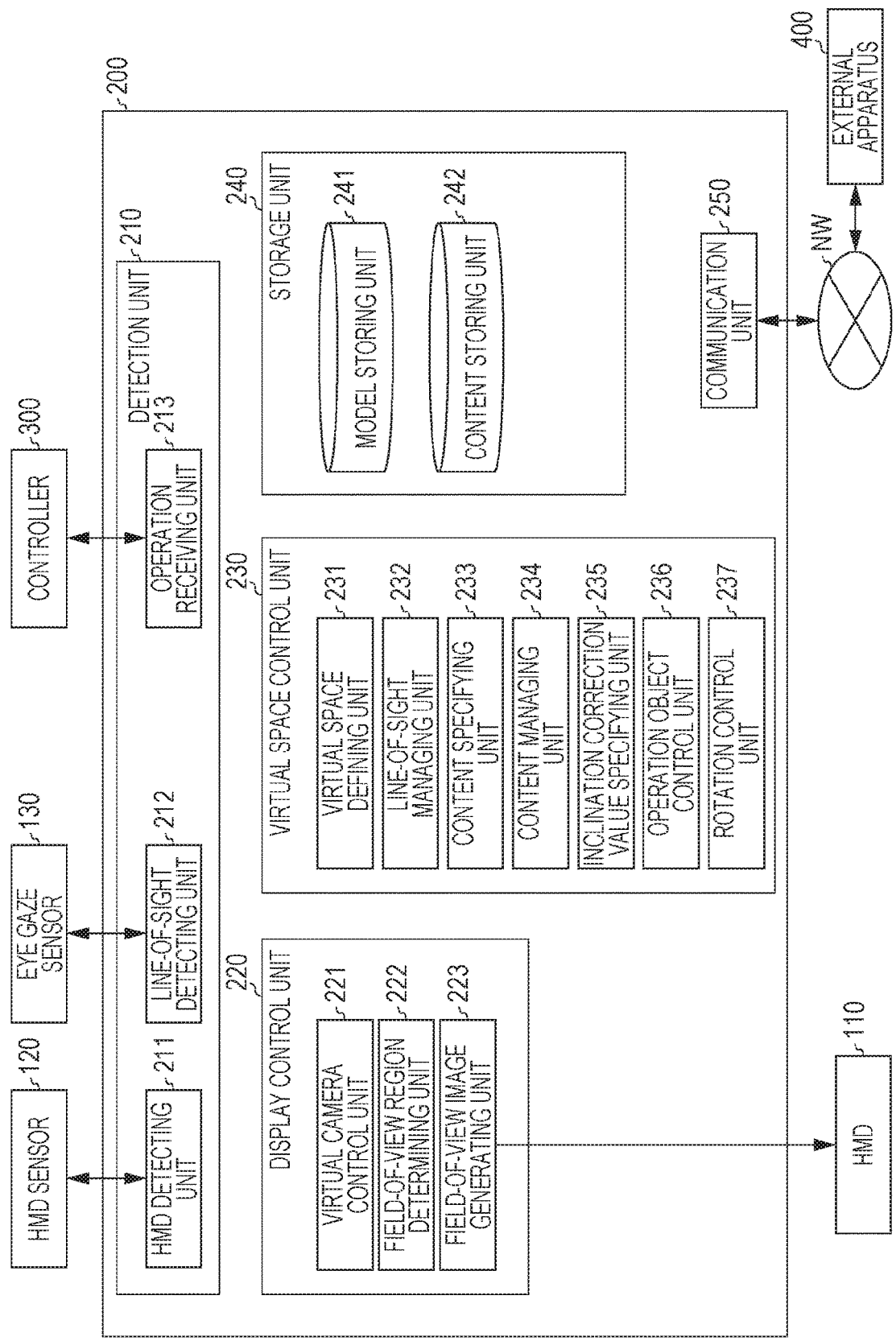
FIG. 7 is a block diagram of a functional configuration of a control circuit unit according to at least one embodiment.

FIG. 7 is a block diagram of a functional configuration of the control circuit unit 200 according to at least one embodiment. The control circuit unit 200 is configured to use various types of data received from the HMD sensor 120, the eye gaze sensor 130, and the controller 300 to control the virtual space 2 to be provided to the user, and to control the image display on the display 112 of the HMD 110. As illustrated in FIG. 7, the control circuit unit 200 includes a detection unit 210, a display control unit 220, a virtual space control unit 230, a storage unit 240, and a communication unit 250. The control circuit unit 200 functions as the detection unit 210, the display control unit 220, the virtual space control unit 230, the storage unit 240, and the communication unit 250 through cooperation between each piece of hardware illustrated in FIG. 2. The detection unit 210, the display control unit 220, and the virtual space control unit 230 are able to implement functions through cooperation between the processor and the memory. The storage unit 240 are able to implement functions through cooperation between the memory and the storage. The communication unit 250 is able to implement functions through cooperation between the processor and the communication interface.

The detection unit 210 is configured to receive the detection values from various sensors (for example, the HMD sensor 120) connected to the control circuit unit 200. Further, the detection unit 210 is configured to execute predetermined processing using the received detection values as necessary. The detection unit 210 includes an HMD detecting unit 211, a line-of-sight detecting unit 212, and an operation receiving unit 213. The HMD detecting unit 211 is configured to receive a detection value from each of the HMD 110 and the HMD sensor 120. The line-of-sight detecting unit 212 is configured to receive a detection value from the eye gaze sensor 130. The operation receiving unit 213 is configured to receive an instruction transmitted based on the operation performed by the user on the controller 300, to thereby receive the operation.

The display control unit 220 is configured to control the image display on the display 112 of the HMD 110. The display control unit 220 includes a virtual camera control unit 221, a field-of-view region determining unit 222, and a field-of-view image generating unit 223. The virtual camera control unit 221 is configured to arrange the virtual camera 1 in the virtual space 2, and to control the behavior of the virtual camera 1 in the virtual space 2. The field-of-view region determining unit 222 is configured to determine the field-of-view region 23. The field-of-view image generating unit 223 is configured to generate the field-of-view image 26 to be displayed on the display 112 based on the determined field-of-view region 23.

The virtual space control unit 230 is configured to control the virtual space 2 to be provided to the user. The virtual space control unit 230 includes a virtual space defining unit 231, a line-of-sight managing unit 232, a content specifying unit 233, a content managing unit 234, an inclination correction value specifying unit 235, an operation object control unit 236, and a rotation control unit 237. The virtual space defining unit 231 is configured to generate virtual space data representing the virtual space 2 to be provided to the user, to thereby define the virtual space 2 in the HMD system 100. The line-of-sight managing unit 232 is configured to manage the line of sight of the user in the virtual space 2. The content specifying unit 233 is configured to specify the content to be played in the virtual space 2. The content managing unit 234 is configured to synthesize advertisement content with moving image content. The content managing unit 234 is configured to specify the content to be played in the virtual space 2. The content managing unit 234 is configured to recognize a temporal position of the content played in the virtual space 2, to thereby determine whether or not to display the advertisement on a temporal basis. The inclination correction value specifying unit 235 is configured to specify an inclination correction value defined in advance for the content played in the virtual space 2. The operation object control unit 236 is configured to control an operation object 28 in the virtual space 2. The rotation control unit 237 is configured to control the rotation of the virtual camera 1 or the virtual space 2 based on the operation on the operation object 28.

The storage unit 240 stores various types of data to be used by the control circuit unit 200 to provide the virtual space 2 to the user. The storage unit 240 includes a model storing unit 241 and a content storing unit 242. The model storing unit 241 stores various types of model data. The content storing unit 242 stores various types of content.

The model data is data representing the model of the virtual space 2. The model data includes spatial structure data that defines the spatial structure of the virtual space 2. The spatial structure data is data that defines, for example, the spatial structure of the entire celestial sphere of 360° about the center 21. The model data further includes data that defines the XYZ coordinate system of the virtual space 2. The model data further includes coordinate data that specifies the position of each mesh section forming the celestial sphere in the XYZ coordinate system. Further, the model data further includes a flag for representing whether or not the object can be arranged in the virtual space 2.

The content is content that can be played in the virtual space 2. Examples of the content include platform content and viewing content.

The platform content is content relating to an environment (platform) for enabling the user to select the viewing content that the user desires to view in the virtual space 2. When the platform content is played in the virtual space 2, a platform for selecting content is provided to the user. The platform content at least includes a background image and data for defining an object.

The viewing content is, for example, still image content or moving image content. The still image content includes a background image. The moving image content includes at least an image (still image) of each frame to be sequentially displayed. The moving image content may further include sound data.

The moving image content is, for example, content generated by an omnidirectional camera. The omnidirectional camera is a camera capable of taking images of all directions of the real space about a lens of the camera at one time, to thereby generate an omnidirectional image at one time. Each image forming the moving image content obtained by the omnidirectional camera is distorted, but when the moving image content is played in the virtual space 2, the distortion of each image is eliminated by using a lens forming the display 112 of the HMD 110. Therefore, when the moving image content is played, the user can visually recognize a natural image without distortion in the virtual space 2.

In each piece of content, an initial direction directed to an image to be shown to the user in an initial state (at the time of activation) of the HMD 110 is defined in advance. The initial direction defined for the moving image content generated by the omnidirectional camera generally matches with a predetermined photographing direction defined for the omnidirectional camera used for taking images of the moving image content. The initial direction may be changed to a direction different from the photographing direction. Specifically, after images are taken by the omnidirectional camera, the obtained moving image content may be edited as appropriate so that a direction shifted from the photographing direction may be defined as the initial direction in the moving image content.

In each piece of content, a predetermined inclination correction value is defined in advance, in some instances. The inclination correction value is defined for the content based on a posture of the user assumed when the user views the content. For example, content that is assumed to be viewed by a user in a sitting posture has an inclination correction value defined based on the sitting posture. Meanwhile, content that is assumed to be viewed by a user in a supine posture has an inclination correction value defined based on the supine posture. The inclination correction value is used for correcting the inclination of the virtual camera 1 with respect to the HMD 110 in the global coordinate system. Alternatively, the inclination correction value is used for correcting the inclination of the XYZ coordinate system of the virtual space 2 with respect to the global coordinate system.

For example, when the content is assumed to be viewed by a user in a sitting posture or a standing posture, the inclination correction value defined for the content is 0°. Many of the content are assumed to be viewed by a user in a sitting posture. The user actually views this type of content in a sitting state or a standing state in order to enhance the sense of reality in the virtual space 2 in which this type of content is played.

Meanwhile, when the content is suitable to be viewed by a user in a lying state facing obliquely upward in the vertical direction (supine posture), the inclination correction value defined for the content is, for example, 60°. Examples of this type of content include moving image content for presenting to the user a video to be visually recognized by the user when the user himself or herself uses someone's lap as a pillow. The initial direction defined in advance for such moving image content is directed to a portion of the entire celestial sphere image to be visually recognized by the user in a lying state. The user views this type of moving image content while actually lying on the ground in order to enhance the sense of reality in the virtual space 2 in which this type of moving image content is played.

The above-mentioned inclination correction value is merely an example. Any value based on the posture of the user assumed when the content is viewed may be set to the content as the inclination correction value. For example, when the content is assumed to be viewed by a user facing directly above in the vertical direction, 90° is defined for the content as the inclination correction value. Meanwhile, when the content is assumed to be viewed by a user facing directly below in the vertical direction, −90° is defined for the content as the inclination correction value.

Many of the content are assumed to be viewed by a user in a sitting posture or a standing posture, and hence such content may not have the inclination correction value defined in advance. When no inclination correction value is defined for the content, the inclination correction value specifying unit 235 assumes that the inclination correction value of 0° is defined for the content.

The communication unit 250 is configured to transmit or receive data to or from an external apparatus 400 (for example, a server) via the network NW.

Figure 8:
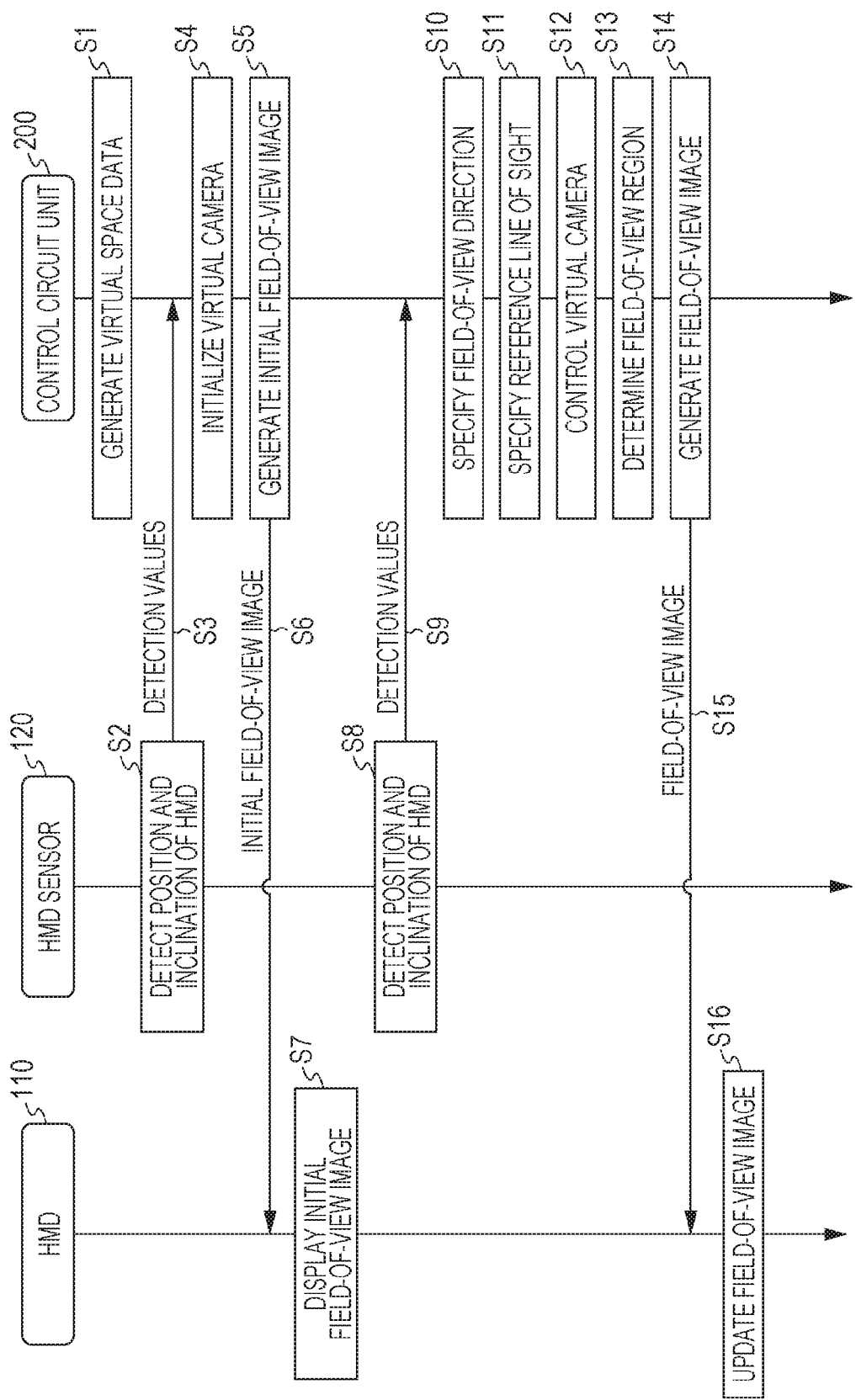
FIG. 8 is a sequence diagram of a method of processing performed by an HMD system to provide the virtual space to the user according to at least one embodiment.

FIG. 8 is a sequence diagram of a flow of processing performed by the HMD system 100 to provide the virtual space 2 to the user according to at least one embodiment. The virtual space 2 is basically provided to the user through cooperation between the HMD 110 and the control circuit unit 200. When the processing illustrated in FIG. 8 is started, first, in Step S1, the virtual space defining unit 231 generates virtual space data representing the virtual space 2 to be provided to the user, to thereby define the virtual space 2. The procedure of generating the virtual space is as follows. First, the virtual space defining unit 231 acquires model data of the virtual space 2 from the model storing unit 241, to thereby define the original form of the virtual space 2. The virtual space defining unit 231 further acquires content to be played in the virtual space 2 from the content storing unit 242. The virtual space defining unit 231 adapts the acquired content to the acquired model data, to thereby generate the virtual space data that defines the virtual space 2. The virtual space defining unit 231 associates as appropriate each partial image forming the background image included in the content with management data of each mesh section forming the celestial sphere of the virtual space 2 in the virtual space data. In at least one embodiment, the virtual space defining unit 231 associates each partial image with each mesh section so that the initial direction defined for the content matches with the Z direction in the XYZ coordinate system of the virtual space 2.

In at least one embodiment, the virtual space defining unit 231 further adds the management data of each object included in the content to the virtual space data. At this time, coordinates representing the position at which the corresponding object are arranged in the virtual space 2 are set to the management data. With this, each object is arranged at a position of the coordinates in the virtual space 2.

After that, when the HMD 110 is activated by the user, in Step S2, the HMD sensor 120 detects the position and the inclination of the HMD 110 in the initial state, and in Step S3, outputs the detection values to the control circuit unit 200. The HMD detecting unit 211 receives the detection values. After that, in Step S4, the virtual camera control unit 221 initializes the virtual camera 1 in the virtual space 2.

The procedure of initializing the virtual camera is as follows. First, the virtual camera control unit 221 arranges the virtual camera 1 at the initial position in the virtual space 2 (for example, the center 21 in FIG. 4). Next, the direction of the virtual camera 1 in the virtual space 2 is set. At this time, the virtual camera control unit 221 may specify the uvw visual-field coordinate system of the HMD 110 in the initial state based on the detection values from the HMD sensor 120, and set, for the virtual camera 1, the UVW visual-field coordinate system that matches with the UVW visual-field coordinate system of the HMD 110, to thereby set the direction of the virtual camera 1. When the virtual camera control unit 221 sets the uvw visual-field coordinate system for the virtual camera 1, the roll direction (w axis) of the virtual camera 1 is adapted to the Z direction (Z axis) of the XYZ coordinate system. Specifically, the virtual camera control unit 221 matches the direction obtained by projecting the roll direction of the virtual camera 1 on an XZ plane with the Z direction of the XYZ coordinate system, and matches the inclination of the roll direction of the virtual camera 1 with respect to the XZ plane with the inclination of the roll direction of the HMD 110 with respect to a horizontal plane. Such adaptation processing enables adaptation of the roll direction of the virtual camera 2 in the initial state to the initial direction of the content, and hence the horizontal direction in which the user first faces after the playing of the content is started can be matched with the initial direction of the content.

After the initialization processing of the virtual camera 1 is ended, the field-of-view region determining unit 222 determines the field-of-view region 23 in the virtual space 2 based on the UVW visual-field coordinate system of the virtual camera 1. Specifically, the roll direction (w axis) of the uvw visual-field coordinate system of the virtual camera 1 is specified as the reference line of sight 5 of the user, and the field-of-view region 23 is determined based on the reference line of sight 5. In Step S5, the field-of-view image generating unit 223 processes the virtual space data, to thereby generate (render) the field-of-view image 26 corresponding to the part of the entire virtual space image 22 developed in the virtual space 2 to be projected on the field-of-view region 23 in the virtual space 2. In Step S6, the field-of-view image generating unit 223 outputs the generated field-of-view image 26 as an initial field-of-view image to the HMD 110. In Step S7, the HMD 110 displays the received initial field-of-view image on the display 112. With this, the user is able to visually recognize the initial field-of-view image.

After that, in Step S8, the HMD sensor 120 detects the current position and inclination of the HMD 110, and in Step S9, outputs the detection values thereof to the control circuit unit 200. The HMD detecting unit 211 receives each detection value. The virtual camera control unit 221 specifies the current UVW visual-field coordinate system in the HMD 110 based on the detection values of the position and the inclination of the HMD 110. Further, in Step S10, the virtual camera control unit 221 specifies the roll direction (w axis) of the UVW visual-field coordinate system in the XYZ coordinate system as a field-of-view direction of the HMD 110.

In at least one embodiment, in Step S11, the virtual camera control unit 221 specifies the specified field-of-view direction of the HMD 110 as the reference line of sight 5 of the user in the virtual space 2. In Step S12, the virtual camera control unit 221 controls the virtual camera 1 based on the specified reference line of sight 5. The virtual camera control unit 221 maintains the position and the direction of the virtual camera 1 when the position (origin) and the direction of the reference line of sight 5 are the same as those in the initial state of the virtual camera 1. Meanwhile, when the position (origin) and/or the direction of the reference line of sight 5 is changed from those in the initial state of the virtual camera 1, the position and/or the inclination of the virtual camera 1 in the virtual space 2 are/is changed to the position and/or the inclination based on the reference line of sight 5 obtained after the change. Further, the UVW visual-field coordinate system is reset with respect to the virtual camera 1 subjected to control.

In Step S13, the field-of-view region determining unit 222 determines the field-of-view region 23 in the virtual space 2 based on the specified reference line of sight 5. After that, in Step S14, the field-of-view image generating unit 223 processes the virtual space data to generate (render) the field-of-view image 26 that is a part of the entire virtual space image 22 developed in the virtual space 2 to be projected onto (superimposed with) the field-of-view region 23 in the virtual space 2. In Step S15, the field-of-view image generating unit 223 outputs the generated field-of-view image 26 as a field-of-view image for update to the HMD 110. In Step S16, the HMD 110 displays the received field-of-view image 26 on the display 112 to update the field-of-view image 26. With this, when the user moves the HMD 110, the field-of-view image 26 is updated in synchronization therewith.

In at least one embodiment, the HMD system 100 provides, to the user, the environment (platform) for enabling the user to select, in the virtual space 2, the content that the user desires to view in the virtual space 2. When the user selects the content that the user desires to view through the platform developed in the virtual space 2, the control circuit unit 200 starts playing of the selected content in the virtual space 2. Now, details of provision of the platform and processing of playing the content are described.

Figure 10A:
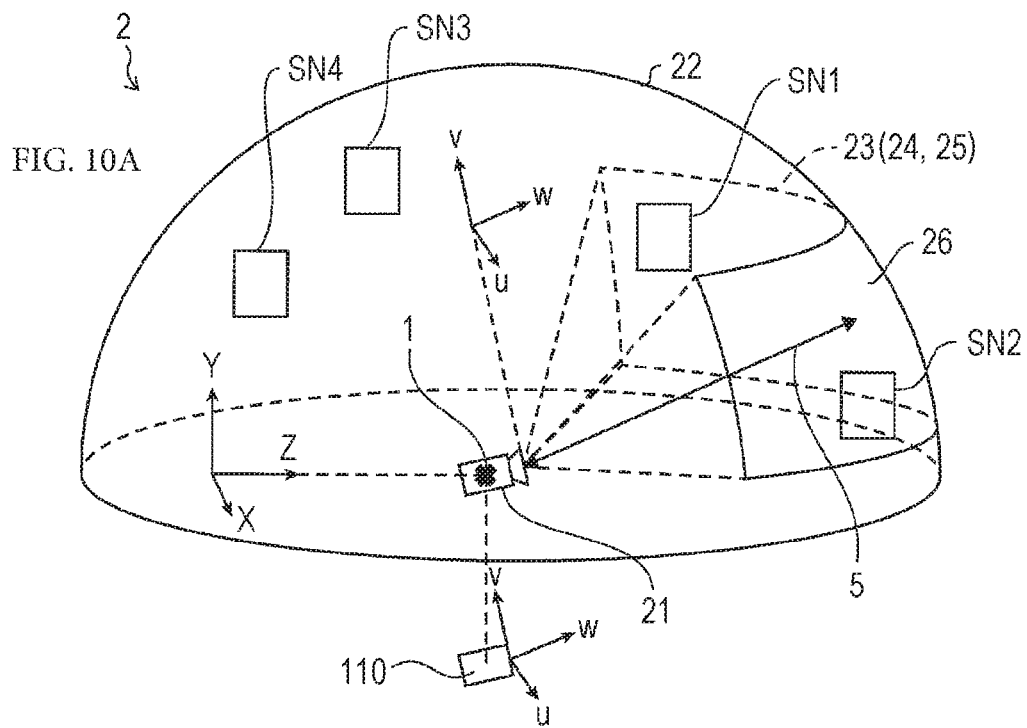
FIG. 10A is a diagram of a virtual space for playing moving image content via a platform according to at least one embodiment.
Figure 10B:
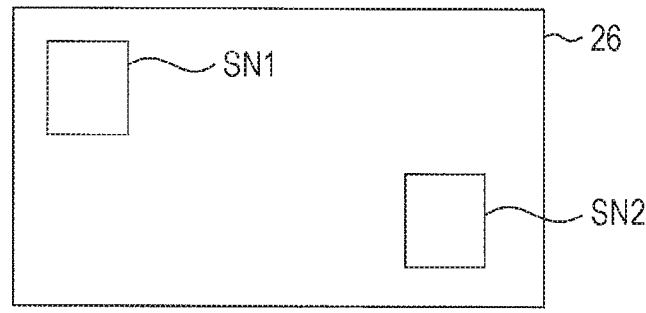
FIG. 10B is a diagram of a field-of-view image of a platform according to at least one embodiment.
Figure 10C:
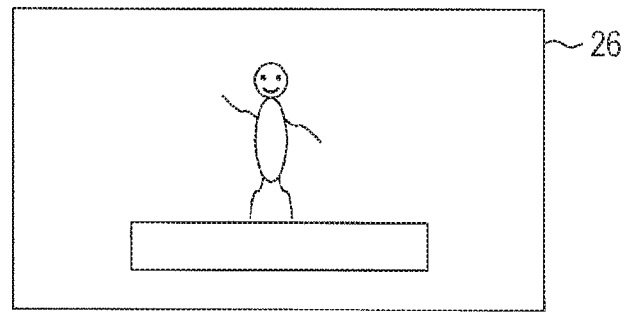
FIG. 10C is a diagram of a field-of-view image of moving image content according to at least one embodiment.

FIG. 9 is a sequence diagram of a flow of processing performed by the HMD system 100 to play, in the virtual space 2, moving image content selected by the user via a platform in the virtual space 2 according to at least one embodiment. FIGS. 10A-10C are diagrams for illustrating how to select and play the moving image content via the platform in the virtual space 2 according to at least one embodiment. When the processing illustrated in FIG. 9 is started, first, in Step S21, the virtual space defining unit 231 generates virtual space data representing the virtual space 2 for providing the platform, to thereby define the virtual space 2 for providing the platform. The procedure of the generation is as follows. First, the virtual space defining unit 231 acquires the model data of the virtual space 2 corresponding to the platform from the model storing unit 241. In at least one embodiment, model data in which an object can be used is acquired.

The virtual space defining unit 231 further acquires platform content relating to the platform to be provided in the virtual space 2 from the content storing unit 242. The virtual space defining unit 231 adapts the acquired platform content to the acquired model data, to thereby generate the virtual space data that defines the virtual space 2 for providing the platform. The virtual space defining unit 231 associates as appropriate each partial image forming the background image included in the platform content with management data of each mesh section forming the celestial sphere of the virtual space 2 in the virtual space data.

The virtual space defining unit 231 further adds the management data of each object included in the platform content to the virtual space data. With this, each object is arranged at a predetermined position in the virtual space 2 that provides the platform. The virtual space defining unit 231 next acquires a certain number of overview images (thumbnails) of viewing content (in this case, moving image content) stored in the content storing unit 242. The virtual space defining unit 231 associates each acquired thumbnail with the management data of a certain object in the virtual space data. With this, each object arranged in the virtual space 2 is associated with the thumbnail. In the following, for the sake of convenience in description, an object associated with the thumbnail and arranged in the virtual space 2 is sometimes simply expressed as "thumbnail".

Each piece of viewing content in which a corresponding thumbnail is associated with an object is a candidate of moving image content (candidate moving image content) that can be selected by the user to be played in the virtual space 2. The user can select corresponding candidate moving image content through selection of the thumbnail. The control circuit unit 200 specifies the candidate moving image content selected by the user in the platform as the moving image content to be played in the virtual space 2.

FIG. 10A is a diagram of the virtual space 2 for providing the platform according to at least one embodiment. FIG. 10A is an illustration of the virtual space 2 for providing the platform in which four thumbnails SN1 to SN4 are arranged according to at least one embodiment. Those thumbnails SN1 to SN4 are each an object associated with an overview image (thumbnail) of corresponding moving image content.

After the virtual space data representing the virtual space illustrated in FIG. 10A is generated, in Step S22, the field-of-view image generating unit 223 generates the field-of-view image 26 based on the reference line of sight 5 of the user. The generation method is the same as the method described with reference to FIG. 8. In this case, the field-of-view image 26 corresponding to the platform is generated. In FIG. 10A, among the thumbnails SN1 to SN4, the thumbnails SN1 and SN2 are arranged in the field-of-view region 23 defined by the reference line of sight 5 of the user. Meanwhile, the thumbnails SN3 and SN4 are arranged outside of the field-of-view region 23. Therefore, the field-of-view image generating unit 223 generates the field-of-view image 26 including the thumbnails SN1 and SN2.

In Step S23, the field-of-view image generating unit 223 outputs the generated field-of-view image 26 to the HMD 110. In Step S24, the HMD 110 displays the received field-of-view image on the display 112. The user visually recognizes the field-of-view image 26 of the platform. In a case where an object associated with a thumbnail is included in the field-of-view image 26, when the field-of-view image 26 is displayed, the thumbnail associated with the object is displayed on the display 112. With this, the user visually recognizes the field-of-view image 26 including the thumbnail. FIG. 10B is a diagram of a field-of-view image 26 of the platform according to at least one embodiment. The field-of-view image 26 illustrated in FIG. 10B includes the thumbnails SN1 and N2, and hence the user visually recognizes the thumbnails SN1 and SN2 in the virtual space 2.

Although not shown in FIG. 9, when the user moves the HMD 110 after that, the field-of-view image 26 is updated in synchronization with the movement. For example, when the user moves the HMD 110 and the position of the field-of-view region 23 changes to a position including the thumbnails SN1 and SN3, the field-of-view image 26 including the thumbnails SN1 and SN3 is displayed on the display 112. Therefore, the user moves the HMD 110 as appropriate so that the thumbnail of the moving image content that the user desires to view can fall within his or her field of view.

After the field-of-view image 26 of the platform is displayed, in Step S25, the eye gaze sensor 130 detects each of the line of sight of the right eye and the line of sight of the left eye of the user, and in Step S26, transmits the detection values to the control circuit unit 200. The line-of-sight detecting unit 212 receives the detection values. In Step S27, the line-of-sight detecting unit 212 uses the received detection values to specify the line-of-sight direction NO of the user in the UVW visual-field coordinate system of the virtual camera 1.

In Step S28, the line-of-sight managing unit 232 determines whether or not the line of sight of the user has hit a specific thumbnail included in the field-of-view image 26 for a defined time period or more based on the line-of-sight direction NO and each thumbnail included in the field-of-view region 23. More specifically, the line-of-sight managing unit 232 determines whether or not an intersection point of the line-of-sight direction NO in the field-of-view region 23 is included in a display range (arrangement range) of the specific thumbnail included in the field-of-view region 23. When the result of the determination is YES, the line of sight is determined to have hit the specific thumbnail included in the field-of-view image 26, and when the result of the determination is NO, the line of sight is determined to not have hit the specific thumbnail.

In the case of NO in Step S28, the processing of FIG. 9 is returned to the beginning of Step S25. After that, until YES is obtained in Step S28, the processing of Step S25 to Step S28 is repeated. Meanwhile, in the case of YES in Step S28, in Step S29, the content specifying unit 233 specifies the content corresponding to the thumbnail determined to be hit by the line of sight for the defined time period or more. For example, when the user hits his or her line of sight to the thumbnail SN1 for the defined time period or more, the moving image content associated with the management data of the thumbnail SN1 is specified as the content corresponding to the thumbnail SN1.

After that, in Step S30, the virtual space defining unit 231 generates the virtual space data for playing the specified moving image content, to thereby define the virtual space 2 for playing the moving image content. The procedure of the generation is as follows. First, the virtual space defining unit 231 acquires the model data of the virtual space 2 corresponding to the moving image content from the model storing unit 241.

The virtual space defining unit 231 acquires the moving image content specified by the content specifying unit 233 from the content storing unit 242. The virtual space defining unit 231 adapts the acquired moving image content to the acquired model data, to thereby generate the virtual space data that defines the virtual space 2 for playing the moving image content. The virtual space defining unit 231 associates as appropriate each partial image forming an image of the first frame included in the moving image content with the management data of each mesh section forming the celestial sphere of the virtual space 2 in the virtual space data.

In the virtual space 2 defined by the virtual space data generated here, arrangement of objects is not assumed. Further, the moving image content does not include the management data that defines the object. Therefore, in Step S30, the virtual space defining unit 231 generates the virtual space data not including the management data of the object.

After the generation of the virtual space data representing the virtual space 2 for playing the moving image content, in Step S31, the field-of-view image generating unit 223 generates the field-of-view image 26 based on the reference line of sight 5 of the user. In at least one embodiment, the generation method is the same as the method described with reference to FIG. 8. In at least one embodiment, the field-of-view image 26 of the moving image content is generated. In Step S32, the field-of-view image generating unit 223 outputs the generated field-of-view image 26 to the HMD 110. In Step S33, the HMD 110 displays the received field-of-view image 26 on the display 112 to update the field-of-view image 26. With this, the playing of the moving image content is started in the virtual space 2, and the user visually recognizes the field-of-view image 26 of the moving image content.

Although not shown in FIG. 9, in response to the user moving the HMD 110, the field-of-view image 26 is updated in synchronization with the movement. Therefore, the user can move the HMD 110 as appropriate to visually recognize a partial image (field-of-view image 26) at a desired position in the entire celestial sphere image of each frame forming the moving image content.

FIG. 10C is a diagram of the field-of-view image 26 of the moving image content according to at least one embodiment. The field-of-view image 26 illustrated in FIG. 10C is a field-of-view image 26 of the moving image content corresponding to the thumbnail SN1 selected by the user. As described above, when the user selects the thumbnail SN1 by the line of sight while visually recognizing the field-of-view image 26 of the platform illustrated in FIG. 10B, the field-of-view image 26 of the platform displayed on the display 112 is updated to the field-of-view image 26 of the moving image content illustrated in FIG. 10C. That is, the user can select the thumbnail SN1 through movement of the line of sight in the virtual space 2 to view the moving image content corresponding to the thumbnail SN1 in the virtual space 2.

As described above, the user can select the moving image content that the user desires to view in the virtual space 2 through the platform for selecting the moving image content in the virtual space 2. Therefore, the user does not need to select the moving image content that the user desires to view in the virtual space 2 while visually recognizing another general display connected to the control circuit unit 200 in the real space before wearing the HMD 110. With this, the user's sense of immersion in the virtual space 2 can be further enhanced.

Further, when the user performs a predetermined operation on the HMD system 100 (for example, through the controller 300) while the moving image content is played, the control circuit unit 200 finishes providing to the user the virtual space 2 in which the moving image content is played, and then provides again to the user the virtual space 2 in which the platform for selecting the moving image content is developed. With this, the user can select another thumbnail to view other moving image content in the virtual space 2. The user is able to switch the moving image content to be viewed without removing HMD 110, and hence the user's sense of immersion in the virtual space 2 can be further enhanced.

At least one mode of a method of displaying advertisement content on a part of a display region of the moving image content is described with reference to FIG. 11 and FIG. 12. In at least one embodiment, synthetic content in which the moving image content and advertisement content SC1 are synthesized is played so that the details of the advertisement content SC1 are displayed in a defined display region of the moving image content. The display region is herein defined by information at least including a temporal position and a spatial position of the moving image content. When the moving image content is played, predetermined frames are successively displayed for each defined time period. The temporal position may also be said as information representing which frame is the frame to be displayed. Further, the spatial position represents the location in one frame. Further, in at least one embodiment, the information representing the viewing direction of the user, which is used in the processing performed by the control circuit unit 200, for example, the line-of-sight managing unit 232, may be information representing the line-of-sight direction NO or information representing the field-of-view direction.

Figure 11:
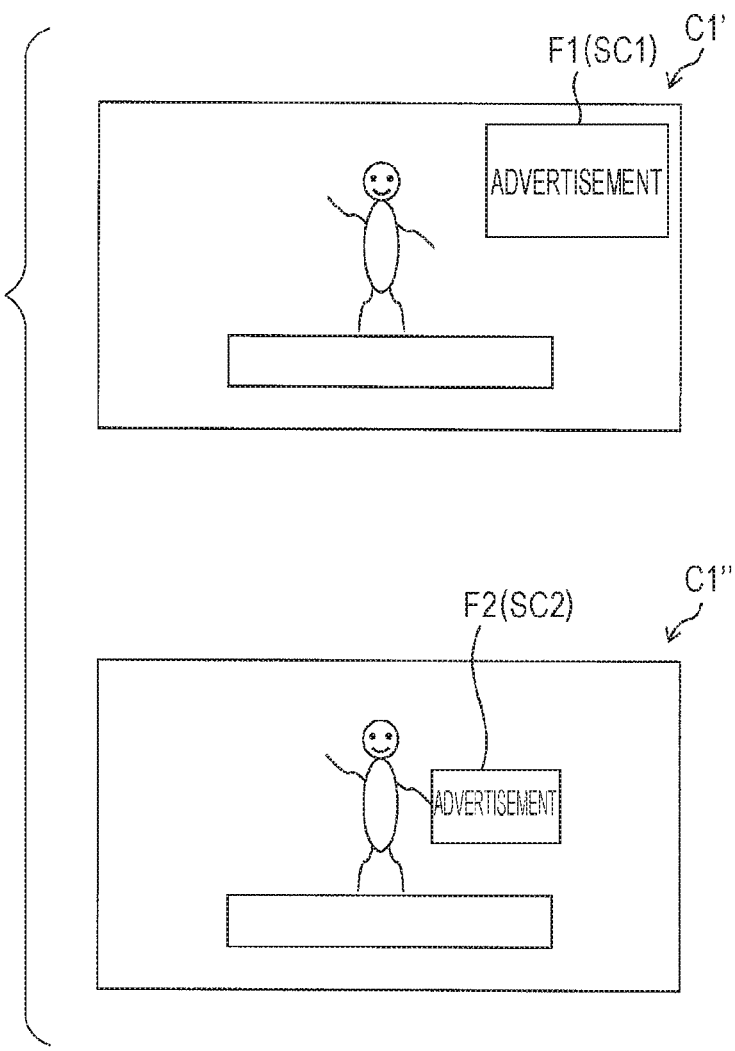
FIG. 11 is a diagram of a visual-field image displayed when a field-of-view image generating unit plays synthetic content according to at least one embodiment.

FIG. 11 is diagram of visual-field images of scenes for displaying the details of the advertisement content SC1 or SC2 in the visual-field image displayed by playing the synthetic content by the field-of-view image generating unit 223 according to at least one embodiment. That is, the field-of-view image generating unit 223 displays, in a scene C1', a visual-field image obtained by synthesizing the advertisement content SC1 in a display region F1 of the moving image content, and further displays, in a scene C1", a visual-field image obtained by synthesizing the advertisement content SC2 in a display region F2 of the moving image content. In other words, the field-of-view image generating unit 223 performs processing of synthesizing the moving image content and the advertisement content SC1 so that the advertisement content SC1 is displayed in the display region F1 in the scene C1', and processing of synthesizing the moving image content and the advertisement content SC2 so that the advertisement content SC2 is displayed in the display region F2 in the scene C1". The advertisement content SC1 and SC2 may be a moving image or a still image.

With use of the control circuit unit 200 synthesizing the moving image content and the advertisement content as described above, the advertisement can be displayed without reducing the user's sense of immersion. The reason for this is because the creator of the moving image content can create the moving image content so that an object which seems natural when an advertisement is displayed may be arranged in the display region F1 or the display region F2. For example, in the indoor scene C1', a screen of a television that is actually placed indoors may be set as the object for displaying the advertisement. Further, the content may be created so that the screen is arranged in the display region F1. With this, the advertisement content SC1 can be displayed as if the content is actually played on the television of the scene C1'. Similarly, in the indoor scene C1", the content may be created so that a screen of a smartphone terminal held by a person that is actually on board is located in the display region F2. With this, the advertisement content SC2 can be displayed as if the content is actually displayed on the smartphone of the scene C1". In this manner, when the advertisement is displayed in a portion in which displaying the advertisement in the moving image content is natural, the advertisement can be displayed without reducing the user's sense of immersion. Further, a position at which displaying of the advertisement is natural can be specified when the advertisement content is synthesized without specifying in advance the spatial position and the temporal position of the display region F1 and the display region F2 when the moving image content is created. Further, when the spatial position of the display region for displaying the advertisement is determined in advance, the creator of the moving image content is able to only arrange an object that seems natural when an advertisement is displayed at the spatial position, and hence the advertisement can be displayed without reducing the user's sense of immersion. Other examples of the object that seems natural when an advertisement is displayed include digital signage, posters, and electronic signage. The display region may be set as appropriate in accordance with the scene, for example, the display region may be set to digital signage in the case of outdoors or inside of a large-scale facility.

Figure 12:
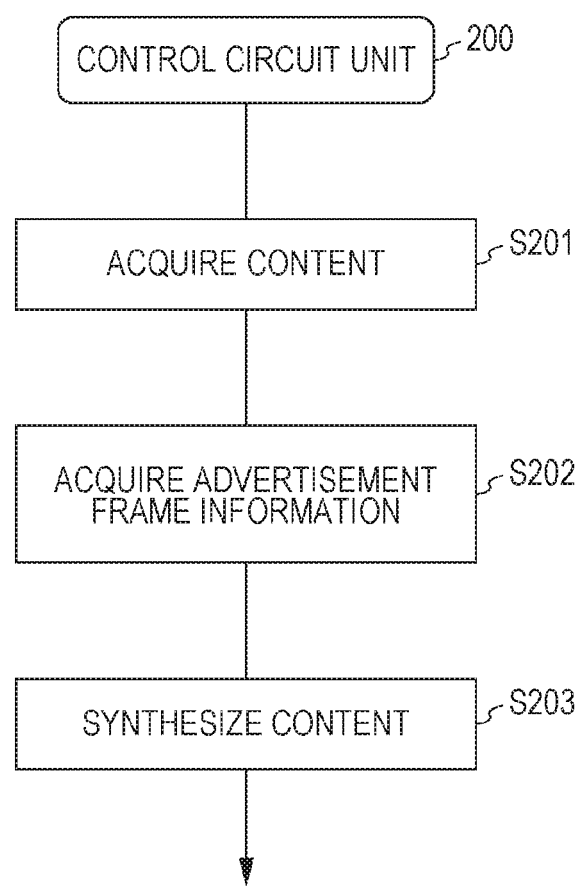
FIG. 12 is a flow chart of processing performed by a control circuit unit to synthesize moving image content and advertisement content according to at least one embodiment.

FIG. 12 is a flow chart of the processing performed by the control circuit unit 200 to synthesize the moving image content and the advertisement content SC1 according to at least one embodiment. First, in Step S201, the communication unit 250 receives the moving image content. The timing at which the communication unit 250 acquires the moving image content is not particularly limited, but, for example, the operation receiving unit 213 may receive the operation performed by the user with use of the controller 300 to issue an instruction to acquire the moving image content so that the communication unit 250 may acquire the moving image content. Further, the communication unit 250 may determine whether or not the moving image content not stored in the storage unit 240 is stored in the external apparatus 400 at a predetermined time with reference to the external apparatus 400 so as to automatically acquire the moving image content that has not been stored yet.

The communication unit 250 stores the acquired moving image content in the storage unit 240. The content managing unit 234 recognizes that new moving image content is stored in the storage unit 240. Next, in Step S202, the content managing unit 234 acquires advertisement frame information from the moving image content (advertisement frame information acquisition step). The advertisement frame information includes information representing the temporal position of the scene including the display region of the advertisement content, and the spatial position of the display region. When the creator of the moving image content creates the moving image content, the creator associates the advertisement frame information with the moving image content.

In Step S203, the content managing unit 234 synthesizes the moving image content and the advertisement content SC1 based on the advertisement frame information (synthetic content generation step). For example, the content managing unit 234 performs processing of attaching an image of the advertisement content SC1 to an image of a frame forming a scene including a display region in the moving image content. The size and the shape of the advertisement content may be adjusted as appropriate based on the spatial position, the temporal position, and the size of the advertisement frame. For example, when the object that displays the advertisement is visible at a far place, the size of the advertisement content SC1 may be reduced, and when the object is visible from an oblique direction, the shape of the advertisement content SC1 may be processed into a trapezoidal shape. After the synthesis, the content managing unit 234 stores the moving image content subjected to synthesis in the content storing unit 242. The procedure of selecting the moving image content stored in the content storing unit 242 by the user to play the moving image content (playing step) is as described above.

In at least one embodiment, description is given above of a mode in which the moving image content and the advertisement content SC1 are synthesized in advance to be stored in the content storing unit 242, but this disclosure is not limited to such a mode. For example, the synthetic content maybe generated by the field-of-view image generating unit 223 generating the field-of-view image so that the advertisement content SC1 is displayed in superimposition with a predetermined display region when the moving image content is displayed on the HMD 110.

Further, in at least one embodiment, description is given of a mode in which the HMD system 100 generates the synthetic content, but the HMD system 100 may acquire synthetic content generated by the external apparatus 400, for example, a server.

A user viewing the moving image content with the head mounted display is immersed deeper in the world of the moving image content than a user viewing the moving image content with a stationary television or the like. In view of this, when an advertisement can be displayed on the head mounted display playing the moving image content, high advertising effectiveness can be expected. However, when the advertisement is displayed at a position that easily comes into the sight of the user, there is a concern that the user's sense of immersion in the virtual space is reduced.

This disclosure provides a method of displaying content, for example, an advertisement while reducing a risk of interfering with the user's sense of immersion even when another piece of content, for example, an advertisement is displayed while moving image content is played on the head mounted display.

At least one mode of a method of displaying advertisement content in a part of the display region of the moving image content is described with reference to FIG. 13 and FIG. 12. In at least one embodiment, the control circuit unit 200 displays the advertisement content in a display region on the rear side of the initial direction among the display regions of the moving image content. The display region is herein defined by information including at least the temporal position and the spatial position of the moving image content. When the moving image content is played, predetermined frames are successively displayed for each defined time period. The temporal position may be also said to be information representing which frame is the frame to be displayed. Further, the spatial position represents the location in one frame. Further, in at least one embodiment, the information representing the viewing direction of the user, which is used in the processing performed by the control circuit unit 200, for example, the line-of-sight managing unit 232, may be information representing the line-of-sight direction NO or information representing the field-of-view direction.

Figure 13:
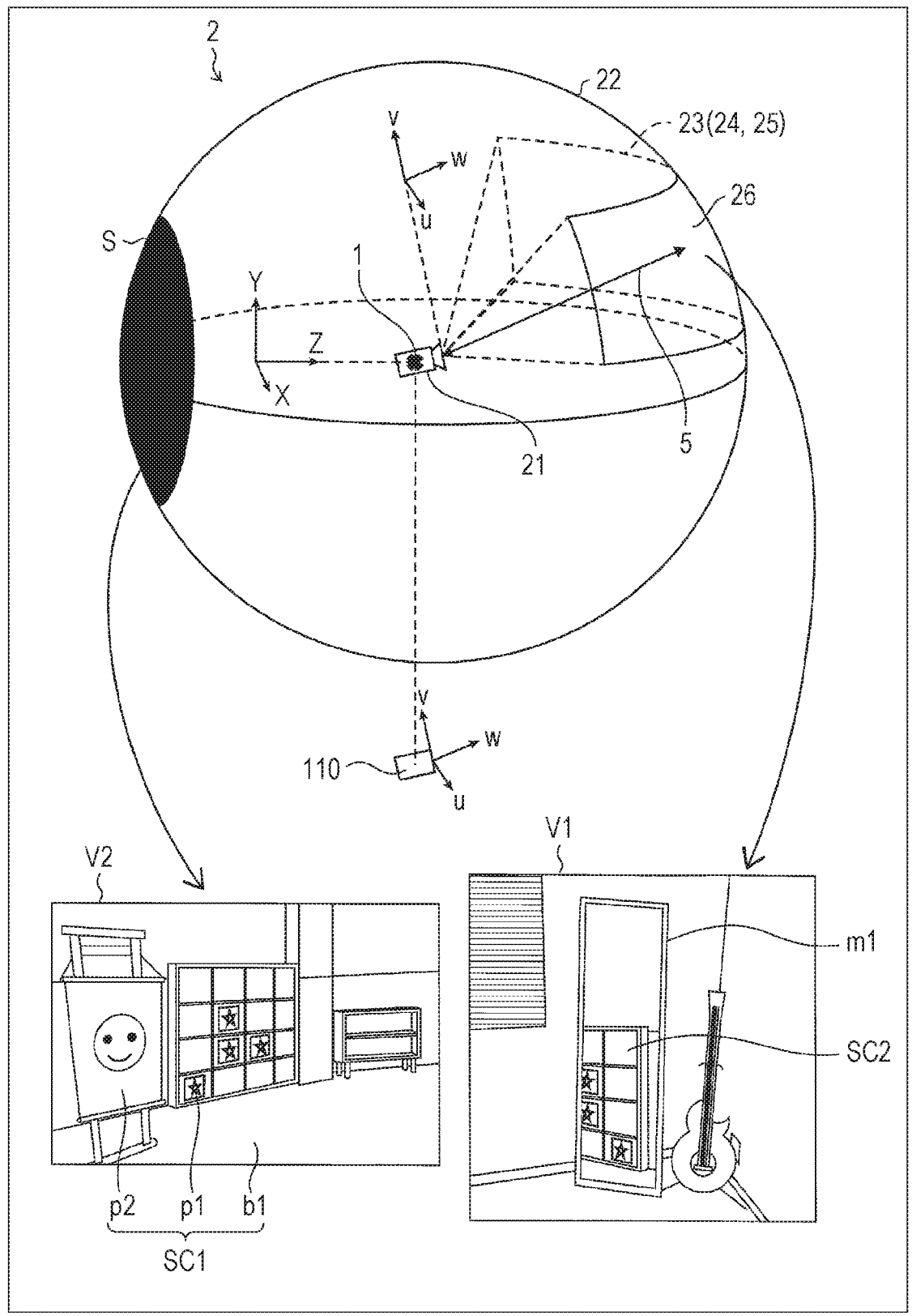
FIG. 13 is a diagram of a visual-field image displayed when the field-of-view image generating unit plays the synthetic content according to at least one embodiment.

FIG. 13 is a diagram of a relationship among the visual-field image that displays the advertisement content SC1 (first sub-content), the visual-field image that displays the advertisement content SC2 (second sub-content) for guiding the line of sight to the advertisement content SC1, and the position in the virtual space 2 according to at least one embodiment. A visual-field image v1 is a part of the virtual space image 22 generated while the moving image content is played. Further, the visual-field image v1 is a part of the visual-field image that is displayed based on the reference line of sight when the user faces the front side in the virtual space 2. In at least one embodiment, the "front side" may be a positive direction (−90° or more and +90° or less) in the horizontal direction with the initial direction serving as a reference, and is preferred to be in the vicinity of the initial direction, for example. Further, the "rear side" is a negative direction (range of more than 90° and 180° or less, and less than −90° and −180° or more) in the horizontal direction with the initial direction serving as a reference.

The field-of-view image generating unit 223 displays a part of a bookshelf of the advertisement content SC1 in a mirror m1 of the visual-field image v1 (second sub-content display step). The image of the part of the bookshelf is the advertisement content SC2 for guiding the line of sight to the advertisement content SC1 positioned on the rear side as viewed from the user facing the front side to view the moving image content. The advertisement content SC2 is content for notifying the user of the presence of notable content even on the rear side of the initial direction. While the moving image content is played, the user tends to mainly view the front side close to the initial direction. Therefore, when the control circuit unit 200 displays the advertisement content on the rear side of the initial direction, the user's sense of immersion is not reduced. However, the rear side is less viewed by the user, and hence there is a problem of low advertising effectiveness. In view of this, in at least one embodiment, not only the rear-side advertisement content SC1 but also the advertisement content SC2 for guiding the user's line of sight is displayed. With this, the user's line of sight can be guided to the rear side, and thus the advertisement content SC1 can be seen by the user. Thus, in at least one embodiment, the effectiveness of the advertisement displayed on the rear side can be enhanced without reducing the user's sense of immersion.

In a case of a mode in which the advertisement content SC1 is not always played, the field-of-view image generating unit 223 displays the advertisement content SC2 at a temporal position at which the advertisement content SC1 is displayed if the field of view is directed on the rear side, in at least one embodiment. That is, in at least one embodiment the advertisement content SC2 is displayed on the mirror m1 based on the spatial position and the temporal position of the advertisement content SC1. The timing to display the advertisement content SC1 and the timing to display the advertisement content SC2 are synchronized with each other, and thus the user's line of sight can be effectively guided to the advertisement content SC1.

Further, the method of displaying the advertisement content SC2 is not limited to the mode of displaying a part of the advertisement content SC1 on the mirror as described above. This description includes other modes which naturally reflect a part of the rear-side content on the front side of the virtual space image 22. For example, in at least one embodiment, when an image having some kind of reflective surface is displayed on the front side of the virtual space image 22, an image representing at least a part of the advertisement content SC1 on this part is displayed. Therefore, when a person appearing in the moving image content opens a window, a part of the advertisement content SC1 may be rendered on the window as if a part of the rear-side advertisement content SC1 can be seen in the window. The field-of-view image generating unit 223 may always display the advertisement content SC2, or may display the advertisement content SC2 only at the predetermined temporal position. For example, the field-of-view image generating unit 223 may display the advertisement content SC2 when the main character of the moving image content is looking into the mirror or when the main character opens a curtain on the window. Further, in at least one embodiment, description is given of a case where a still image is used as the content for guiding the line of sight, but a moving image or sound may be used instead.

When the field-of-view image generating unit 223 recognizes that the user has turned to the rear side, the field-of-view image generating unit 223 displays a visual-field image v2. That is, the field-of-view image generating unit 223 updates the field-of-view image based on the direction of the HMD 110, to thereby generate the visual-field image v2. The visual-field image v2 is a part of the virtual space image 22 generated while the moving image content is played. Further, the visual-field image v2 is a part of the visual-field image displayed based on the reference line of sight when the user is facing the rear side in the virtual space 2. The advertisement content SC1 is included in the visual-field image v2. The advertisement content SC1 includes advertisement images p1 and p2 and an advertisement background image b1. The advertisement background image b1 covers a joint region S to be described later. The advertisement images p1 and p2 are displayed on the advertisement background image b1. As described above, the virtual space image 22 including the advertisement content SC1 is generated on the rear side of the initial direction serving as a reference, and thus a chance to view the advertisement can be provided without reducing the user's sense of immersion. The advertisement content SC1 may be a moving image or a still image.

The joint region S is a location where, among joints of a plurality of images, joints that cause a mismatch among the images are collected. In at least one embodiment, the joint region S is located on the negative side (rear side) of the initial direction. In at least one embodiment, the moving image content is taken by an omnidirectional camera. When an image is displayed to be adapted to a celestial sphere or a part of a sphere, for example, a hemisphere, like content taken by the omnidirectional camera, an image is generated by connecting separated images. The separated images may be a plurality of images separated from each other or a part of one image being separated. In this case, among the joints of the images, joints that may cause a mismatch among the images may have a space in which an image is distorted or an image is disconnected to display nothing. When the advertisement content is synthesized at such a location, not only the advertisement can be displayed, but also the image that may cause reduction of the user's sense of immersion may be covered. That is, in at least one embodiment, the joint region S is covered by arranging the advertisement content SC1 to be superimposed on the joint region S. Therefore, the user does not visually recognize the space in which a distorted image or nothing is displayed, and hence the user's sense of immersion is not reduced.

FIG. 12 is a flow chart of a flow of processing performed by the control circuit unit 200 to synthesize the moving image content, the advertisement content SC1, and the advertisement content SC2 according to at least one embodiment. First, in Step S201, the communication unit 250 receives the moving image content. The timing at which the communication unit 250 acquires the moving image content is not particularly limited, but, for example, the operation receiving unit 213 may receive the operation performed by the user with use of the controller 300 to issue an instruction to acquire the moving image content so that the communication unit 250 may acquire the moving image content. Further, the communication unit 250 may determine whether or not the content not stored in the storage unit 240 is stored in the external apparatus 400 at a predetermined time with reference to the external apparatus 400 so as to automatically acquire the moving image content that has not been stored yet.

The communication unit 250 stores the acquired moving image content in the storage unit 240. The content managing unit 234 recognizes that new moving image content is stored in the storage unit 240. Next, in Step S202, the content managing unit 234 acquires line-of-sight guidance frame information (frame information) from the moving image content (second sub-content frame information acquisition step). The line-of-sight guidance frame information includes information representing the temporal position of the scene including the display region of the advertisement content SC2, and the spatial position of the display region. When the creator of the moving image content creates the content, the creator associates the line-of-sight guidance frame information with the content. The creator of the moving image content can specify a portion at which displaying the advertisement content SC2, for example, the above-mentioned mirror, in a video displayed in the moving image content is natural. Thus, the image for guiding the line of sight can be displayed without reducing the user's sense of immersion.

In Step S203, the content managing unit 234 synthesizes the moving image content, the advertisement content SC1, and the advertisement content SC2. As described above, the spatial position at which the advertisement content SC1 is synthesized is located at the joint region S of the images with which the moving image content is synthesized. Such a position is often located completely opposite to the initial direction. The reason for this is because the position is located to be farthest from the initial direction so as not to reduce the user's sense of immersion. Therefore, the content managing unit 234 may recognize the initial direction without recognizing the position of the joint region S of the images for every moving image content, to thereby synthesize the advertisement content SC1 so as to be superimposed at a position completely opposite to the direction. This disclosure is not limited to such a mode, and the content managing unit 234 may analyze the moving image content to synthesize the advertisement content SC1 while recognizing the position of the joint region S.

Further, the content managing unit 234 synthesizes the advertisement background image b1 and the virtual space image 22 of the moving image content with continuity. The content managing unit 234 synthesizes a wall and a floor of the advertisement image b1 so as to be continuous with a wall and a floor near the joint region S of the virtual space image 22. The advertisement images p1 and p2 are images representing the details of the advertisement. The advertisement background image b1 includes a bookshelf and a poster stand so that natural display can be achieved even when the details of the advertisement are displayed. The content managing unit 234 synthesizes the advertisement images p1 and p2 on the shelf of the bookshelf and the poster stand. With this, the advertisement images p1 and p2 are displayed like objects that are originally present in the bookshelf or a poster itself, and hence the user's sense of immersion is not reduced.

Further, the content managing unit 234 synthesizes the advertisement content SC2 at the defined spatial position and temporal position based on the line-of-sight guidance frame information.

The method of synthesizing the advertisement content SC1 and SC2 in the moving image content is not particularly limited, but, for example, processing of attaching an image of advertisement content or the like to an image of a frame of the moving image content is performed. Further, the size and the shape of the image may be adjusted as appropriate. For example, when the object to which the image is attached, for example, the bookshelf or the mirror, is visible at a far place, the size of the image may be reduced, and when the object is visible from an oblique direction, the shape of the image may be processed into a trapezoidal shape.

After the content managing unit 234 ends the synthesis of the content, the content managing unit 234 stores the moving image content subjected to synthesis in the content storing unit 242. The procedure of selecting the moving image content stored in the content storing unit 242 by the user to play the moving image content is as described above.

In at least one embodiment, description is given above of at least one mode in which the moving image content, the advertisement content SC1, and the advertisement content SC2 are synthesized in advance to be stored in the content storing unit 242, but this disclosure is not limited to such a mode. For example, the synthetic content may be generated by the field-of-view image generating unit 223 generating the field-of-view image so that the advertisement content SC1 and the advertisement content SC2 are displayed in superimposition with predetermined display regions when the moving image content is displayed on the HMD 110.

Further, in at least one embodiment, description is given of at least one mode in which the HMD system 100 generates the synthetic content, but the HMD system 100 may acquire synthetic content generated by the external apparatus 400, for example, a server. Further, the external apparatus 400 may perform processing of covering the joint region S with an image corresponding to the advertisement background image, and the HMD system 100 may perform processing of synthesizing the advertisement image on the advertisement background image.

Figure 14:
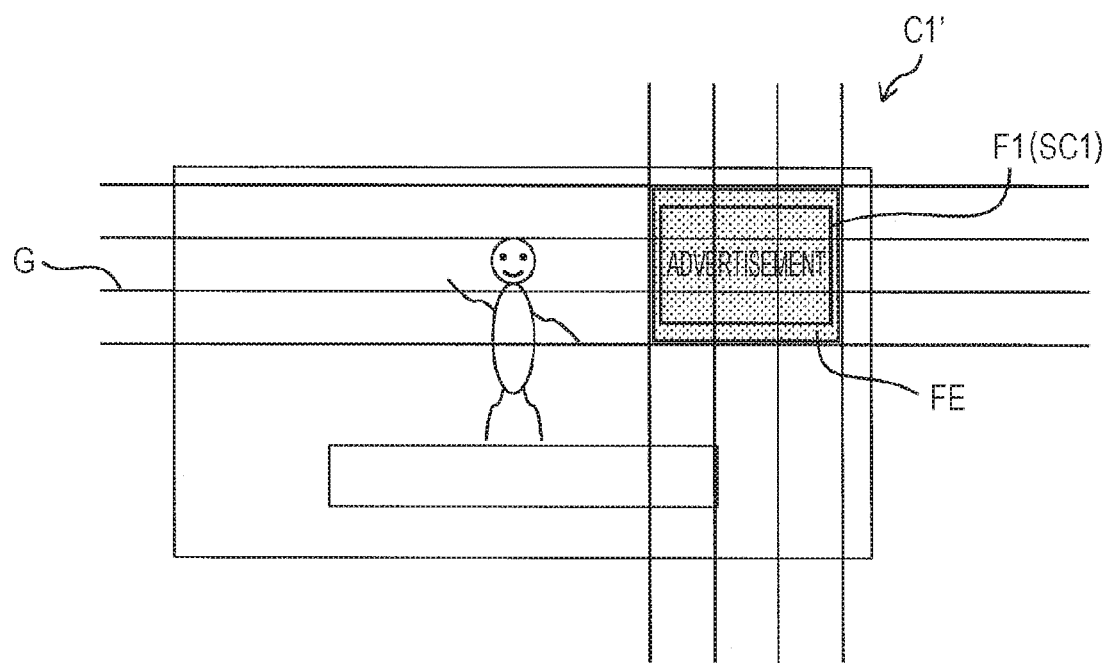
FIG. 14 is a schematic diagram of a relationship between a grid and a position of advertisement content in a field-of-view image according to at least one embodiment.

Next, description is given of the relationship between the position of the advertisement content SC1 to be synthesized with the moving image content and a line-of-sight information collection section FE. FIG. 14 is a schematic diagram of a relationship between a grid and the position of the advertisement content according to at least one embodiment. A grid G is associated with the virtual space data generated by the control circuit unit 200 when the moving image content is played. More specifically, the grid G is associated with the model data being a part of the virtual space data.

The line-of-sight information collection section FE is one of the sections formed by the grid G, and is set at a defined portion in the celestial sphere surface forming the virtual space 2. A function of determining whether or not the user's line of sight (field-of-view direction or line-of-sight direction NO) intersects with the line-of-sight information collection section FE is allocated to the line-of-sight information collection section FE. More specifically, the line-of-sight information collection section FE is associated with the model data for generating the virtual space data. When the virtual space data is generated with use of the model data, the line-of-sight information collection section FE is set in the virtual space 2. When an object is arranged to provide the virtual space as in a game or the like, the object may have the function of collecting the line-of-sight information, and hence ease of collecting information representing whether or not the object has been paid attention is increased. However, in the case of moving image content in which no object is used, collecting the information on the line of sight is difficult. However, when the defined section has the function of collecting the line-of-sight information as in at least one embodiment, the information on the line of sight can be collected.

Further, the model data may be created so that the line-of-sight information collection section FE is superimposed on the joint region S, and the virtual space data may be created with use of the model data in a plurality of pieces of moving image content. Changing the position of the line-of-sight information collection section for each piece of moving image content is not necessary, and hence the line-of-sight information with respect to the advertisement can be effectively collected even when the number of pieces of moving image content increases. Also in content in which no object is used or the number of the objects is limited if used, information representing the attention to the advertisement is efficiently and easily collected in a large number of pieces of moving image content.

Figure 15:
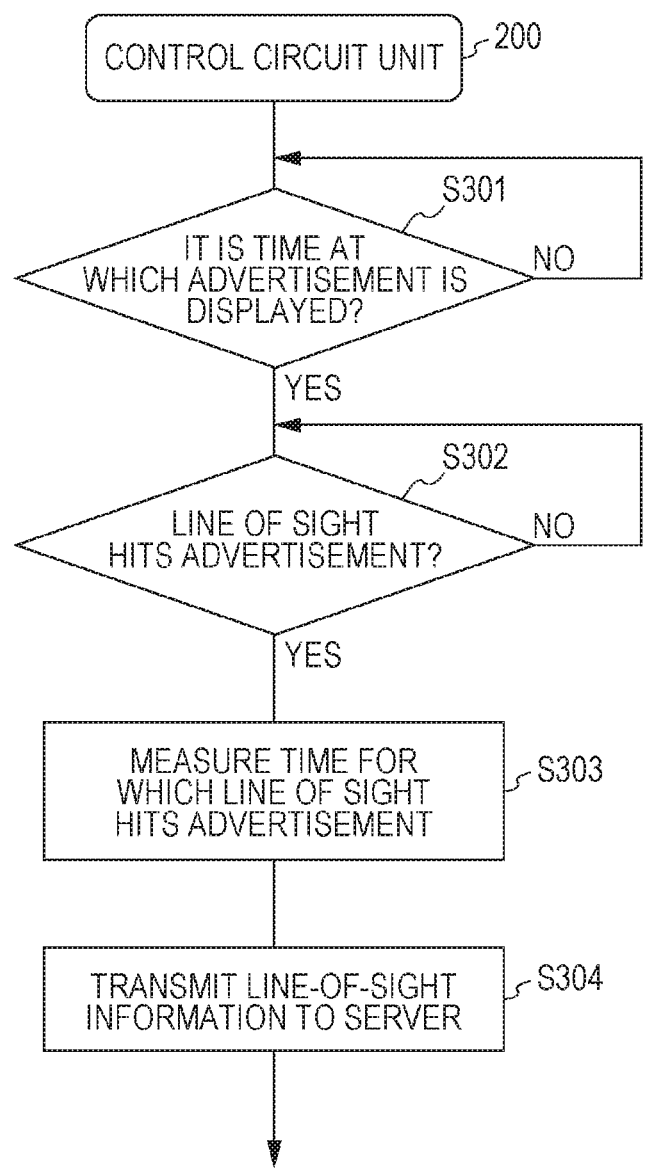
FIG. 15 is a flowchart of processing performed by a control circuit unit to collect line-of-sight information according to at least one embodiment.

Next, description is given of the flow of the processing of collecting the line-of-sight information with use of the line-of-sight information collection section FE. FIG. 15 is a chart of a flow of the processing of collecting the line-of-sight information according to at least one embodiment. First, when the playing of the moving image content is started, in Step S301, the content managing unit 234 determines whether or not it is the time to display the advertisement content SC1. Specifically, the content managing unit 234 refers to the information representing the temporal position in the advertisement frame information, and performs the above-mentioned determination by checking the information against the temporal position of the moving image content that is played by the content managing unit 234. In the case of NO in Step S301, that is, when it is not the time to display the advertisement content SC1, the determination of Step S301 is continued until YES is obtained in Step S301. The playing of the moving image content may be started through selection by the user of the moving image content from the above-mentioned platform.

In the case of YES in Step S301, in Step S302, the line-of-sight managing unit 232 determines whether or not the user's line of sight intersects with the line-of-sight information collection section FE corresponding to the portion on which the advertisement content SC1 is displayed. In the case of NO in Step S302, the determination on whether or not the line of sight intersects with the line-of-sight information collection section FE is continued. In the case of YES in Step S302, in Step S303, the line-of-sight managing unit 232 measures the time for which the line of sight intersects with the line-of-sight information collection section FE (line-of-sight information collection step). When the line of sight deviates from the line-of-sight information collection section FE, the line-of-sight managing unit 232 ends the measurement. After the measurement ends, the line-of-sight managing unit 232 creates the line-of-sight information by associating the temporal position obtained when the measurement is started, the temporal position obtained when the measurement is ended, and, when a plurality of line-of-sight information collection sections FE are set, information representing which line-of-sight information collection section FE is subjected to the measurement. Further, the line-of-sight managing unit 232 also associates, with the line-of-sight information, information representing which advertisement content SC1 is synthesized at the position corresponding to the line-of-sight information collection section FE. The information representing which advertisement content SC1 is synthesized with the line-of-sight information collection section FE may be transmitted by the communication unit 250 to the external apparatus 400 at any timing after the moving image content and the advertisement content SC1 are synthesized in Step S203 described above.

In Step S304, the communication unit 250 transmits the line-of-sight information to the external apparatus 400. The administrator of the external apparatus 400 can evaluate to which advertisement the line of sight is directed and how much line of sight is directed to the advertisement based on the line-of-sight information. Further, the administrator of the external apparatus 400 can evaluate the degree of interest that the user has in the advertisement depending on the details of the moving image content. For example, when the scene displayed when the user sees the advertisement is, for example, a climax scene or an exciting scene in the moving image content, the user can be evaluated as expressing a high interest in the advertisement. Further, for example, when the scene displayed when the user sees the advertisement is not a climax scene or an exciting scene in the moving image content, the user can be evaluated as expressing a low interest in the advertisement. The temporal position in the moving image content and the information representing the situation of the scene, for example, whether or not the scene is the climax may be associated with each other. Thus, the above-mentioned analysis on the user's interest is facilitated. As described above, in at least one embodiment, the effectiveness of the advertisement displayed in the moving image content played on the head mounted display can be efficiently recognized.

The information representing which advertisement content SC1 is synthesized with the line-of-sight information collection section FE may be transmitted by the communication unit 250 to the external apparatus 400 at any timing after the moving image content and the advertisement content SC1 are synthesized in Step S203 described above. Further, the external apparatus 400 may manage which advertisement content SC1 is synthesized with which moving image content, and the control circuit unit 200 may synthesize the content in accordance with the instruction from the external apparatus 400. In this case, associating, with the line-of-sight information, the information representing which advertisement content SC1 is synthesized at the position corresponding to the line-of-sight information collection section FE is not necessary, and the external apparatus 400 can evaluate in which advertisement the user has interest and how much interest the user has.

Further, in Step S201 to Step S203 described above, the content managing unit 234 may associate a plurality of pieces of advertisement content with the line-of-sight information collection section FE at the same location to synthesize the moving image content and the advertisement content so that the advertisement content to be displayed changes in accordance with the elapse of time. In this case, the content managing unit 234 may associate, with the line-of-sight information, the information representing the advertisement content corresponding to the temporal position of the moving image content being played. The degree of interest that the user has in a plurality of advertisements can be evaluated with use of one line-of-sight information collection section. The information representing at which temporal position the advertisement content is displayed and which advertisement content is displayed may be stored in the external apparatus 400. Further, the line-of-sight information may include the temporal position at which the line of sight has intersected with the line-of-sight information collection section FE. The external apparatus 400 can evaluate to which advertisement the line of sight is directed and how much line of sight is directed to the advertisement.

In the above-mentioned at least one embodiment, description is given of a mode in which the line-of-sight information is collected with use of one line-of-sight information collection section FE in one moving image content, but this disclosure is not limited to such a mode. For example, the model data having the line-of-sight information collection section FE may be used in common by the virtual space data used when a plurality of pieces of moving image content are played. In other words, the advertisement content may be synthesized at the same spatial position in the plurality of pieces of moving image content, and the line-of-sight information collection section FE may be used to collect the line-of-sight information. In the case of such a mode, the plurality of pieces of moving image content may be created so that an object that seems natural when an advertisement is displayed may be located at the same spatial position. Changing the position of the line-of-sight information collection section for each piece of moving image content is not necessary. Thus, even when there are a large number of pieces of moving image content, the degree of interest that the user has in the advertisement can be efficiently evaluated.

A plurality of line-of-sight information collection sections FE may be set for one piece of model data, and further, the size may vary in each line-of-sight information collection section FE. The information on the line-of-sight information collection section FE is provided to the creator of the moving image content, and the creator of the moving image content can select as appropriate in which line-of-sight information collection section FE and when the advertisement is displayed. The information representing to which line-of-sight information collection section FE at a certain spatial position and at which temporal position the advertisement is displayed may be associated with the moving image content as the advertisement frame information.

Further, the size of the line-of-sight information collection section FE may be set as appropriate, but the size is preferred to be set so that the line-of-sight information collection section FE is larger than the display region F1 in both of the vertical direction and the horizontal direction, and a difference in horizontal width between the line-of-sight information collection section FE and the display region F1 is smaller than a difference in vertical width therebetween. Thus, the adjustment of the initial direction in the vertical direction in the virtual space 2 can be reduced. For example, when the moving image content is taken by the omnidirectional camera, the initial direction (front side) and the initial image in the virtual space are automatically determined based on the photographing direction of the omnidirectional camera. However, the degree of freedom of the spatial position of the object that displays the advertisement described above is limited by the object to be photographed and the photographing environment. Therefore, the initial direction may also be edited when the moving image content is edited so that the spatial position of the object that displays the advertisement is superimposed on the line-of-sight information collection section FE. In at least one embodiment, when an adjustment of moving the initial direction in the vertical direction is performed, the ground on which the user stands is inclined in the virtual space. The user may feel sick in this case. However, when the vertical width of the line-of-sight information collection section FE is set to be large in advance, the need to adjust the initial direction in the vertical direction can be reduced. Meanwhile, from the viewpoint of more accurately evaluating whether or not the line of sight is directed to the advertisement, the difference in size between the line-of-sight information collection section FE and the display region F1 is small, in at least one embodiment. In view of this, the difference in horizontal width between the line-of-sight information collection section FE and the display region F1 is set to be smaller than the difference in vertical width therebetween. Thus, the need to adjust the initial direction in the vertical direction can be reduced while reducing the difference in size between the line-of-sight information collection section FE and the display region F1.

In the related art, the content assumed to be viewed by a user in a sitting posture is played. However, content to be played in the virtual space includes content that is assumed to be viewed by a user in a supine posture. In the above-mentioned related art, no consideration is given to the fact that the user actually visually recognizes such content in the supine posture. Therefore, when such content is played, the user visually recognizes an unnatural video while in the supine posture. In this disclosure, various types of content that are assumed to be viewed in different postures are suitably played in the virtual space in accordance with the posture of the user.

In each piece of content that can be played in the virtual space 2, an inclination correction value is defined in advance in accordance with the details of the content. When the playing of the content is started, the control circuit unit 200 corrects the inclination of the virtual camera 1 as appropriate in accordance with the inclination correction value. With this, various types of content that are assumed to be viewed in different postures can be suitably played in the virtual space 2 in accordance with the posture of the user. Therefore, when the user views the content in a posture based on the content, the user can visually recognize a natural video. Now, detailed description is given of the case where the control circuit unit 200 corrects the inclination of the virtual camera 1 in accordance with the inclination correction value of the content.

FIG. 16 is a sequence diagram of a flow of processing performed by the HMD system 100 to provide the virtual space 2 in which the inclination of the virtual camera 1 is corrected to the user according to at least one embodiment. The processing illustrated in FIG. 16 is processing at the time of start of playing the corresponding moving image content after the user selects one thumbnail through the platform. After the moving image content corresponding to the thumbnail selected by the user is specified, in Step S41, the virtual space defining unit 231 generates the virtual space data for playing the moving image content. Details of this step are similar to the details of Step S21 of FIG. 9. Therefore, the virtual space defining unit 231 generates the virtual space data without consideration of the inclination correction value defined for the moving image content to be played. That is, in the example of FIGS. 10A-10C, the XYZ coordinate system of the virtual space 2 defined by the generated virtual space data is always parallel to the global coordinate system because the XYZ coordinate system of the virtual space 2 is not corrected based on the inclination correction value defined for the content.

After the virtual space data is generated, the virtual camera control unit 221 initializes the virtual camera 1 in the virtual space 2. The procedure of the initialization performed at this time differs from the procedure of the initialization described with reference to FIG. 8, and the inclination correction value of the content is taken into consideration. The procedure of the initialization is as follows. First, in Step S42, the virtual camera control unit 221 arranges the virtual camera 1 at the initial position in the virtual space 2 (for example, the center 21 of FIG. 4). Next, in Step S43, the HMD sensor 120 detects the current position and inclination of the HMD 110, and in Step S44, outputs the detection values of the position and the inclination to the control circuit unit 200. The HMD detecting unit 211 receives the detection values.

Next, in Step S45, the inclination correction value specifying unit 235 specifies the inclination correction value defined for the moving image content to be played (moving image content specified by the content specifying unit 233) based on the moving image content. When no inclination correction value is defined for the moving image content, the inclination correction value specifying unit 235 specifies 0° as the inclination correction value.

Next, in Step S46, the virtual camera control unit 221 inclines the virtual camera 1 by the inclination correction value with respect to the HMD 110 in the global coordinate system, to thereby set the direction of the virtual camera 1 in the virtual space 2. Details of the setting are as follows. First, the virtual camera control unit 221 specifies the current uvw visual-field coordinate system in the HMD 110 based on the detection values of the position and the inclination of the HMD 110. Further, the virtual camera control unit 221 calculates the UVW visual-field coordinate system by inclining the uvw visual-field coordinate system of the HMD 110 by the inclination correction value in the global coordinate system, and sets this visual-field coordinate system to the virtual camera 1. For example, when the inclination of the HMD 110 with respect to the horizontal direction in the global coordinate system matches with the inclination correction value defined for the moving image content, the virtual camera control unit 221 sets the direction of the virtual camera 1 to be parallel to the XY plane in the virtual space 2. The virtual camera control unit 221 specifies the roll direction (w axis) of the UVW visual-field coordinate system set to the virtual camera 1 as the reference line of sight 5 of the user.

After that, in Step S47, the field-of-view image generating unit 223 generates the field-of-view image 26 based on the direction of the virtual camera 1, and in Step S48, outputs the field-of-view image 26 to the HMD 110. In Step S49, the HMD 110 displays the received field-of-view image 26 on the display 112 to update the field-of-view image 26.

Figure 17A:
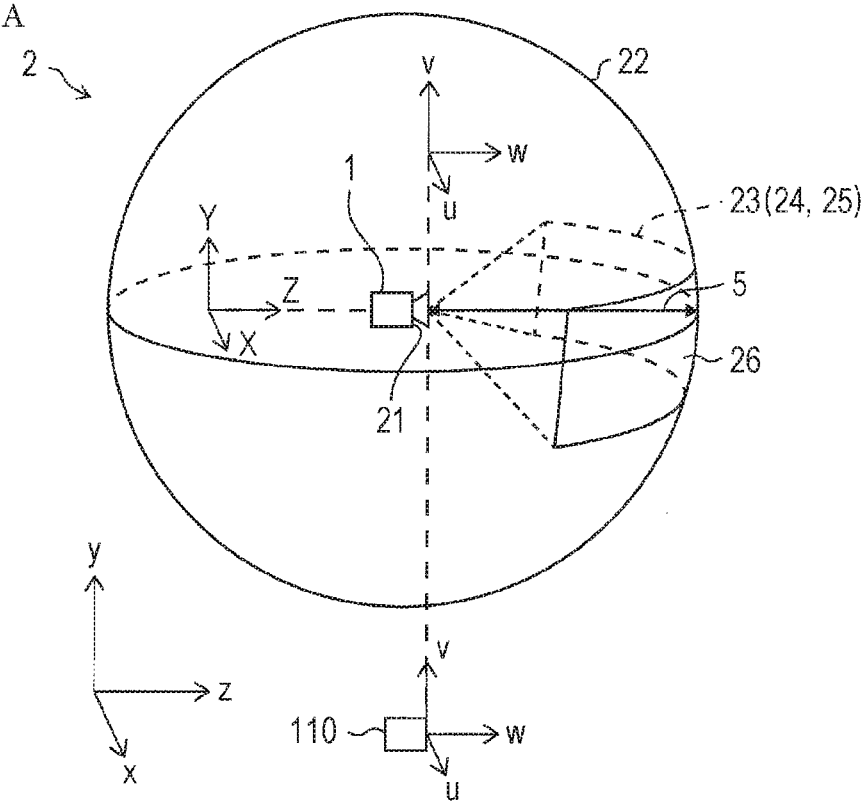
FIG. 17A is a diagram of an inclination of a virtual camera with respect to an HMD based on content of a virtual space according to at least one embodiment.
Figure 17B:
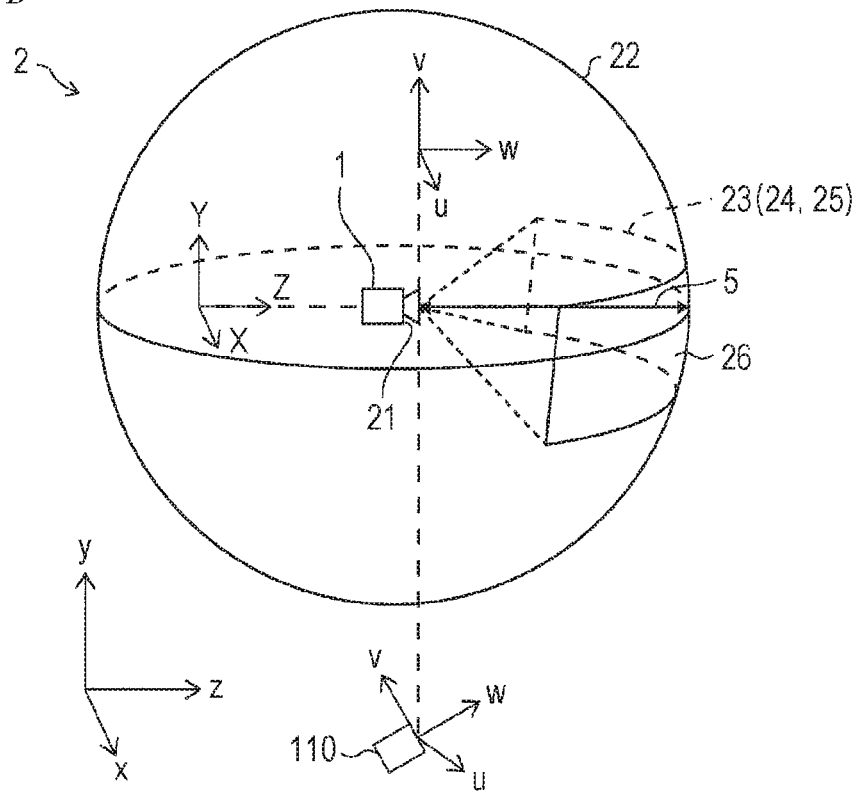
FIG. 17B is a diagram of an inclination of a virtual camera with respect to an HMD based on content of a virtual space according to at least one embodiment.

FIGS. 17A-17B are diagrams of an inclination of the virtual camera 1 with respect to the HMD 110 varies depending on the content according to at least one embodiment. FIG. 17A is a diagram of the virtual space 2 in which moving image content that is assumed to be viewed by a user in a sitting posture is played according to at least one embodiment. Meanwhile, FIG. 17B is a diagram of the virtual space 2 in which content that is assumed to be viewed by a user in a supine posture is played according to at least one embodiment.

In FIG. 17A, the inclination correction value defined for the moving image content to be played in the virtual space 2 is 0°. Therefore, after the virtual space 2 is defined, the inclination of the virtual camera 1 is not corrected. That is, the inclination of the virtual camera 1 in the global coordinate system matches with the inclination of the HMD 110 in the global coordinate system. The XYZ coordinate system of the virtual space 2 is parallel to the global coordinate system, and hence the inclination of the virtual camera 1 in the XYZ coordinate system matches with the inclination of the HMD 110 in the global coordinate system. That is, the direction of the virtual camera 1 is set in the virtual space 2 so that the virtual camera 1 is inclined in synchronization with the inclination of the HMD 110.

For example, as illustrated in FIG. 17A, when the user visually recognizes the horizontal direction in the sitting posture, the inclination of the HMD 110 with respect to the horizontal plane in the global coordinate system is 0° (parallel to the horizontal plane). At this time, similarly, the inclination of the virtual camera 1 with respect to the XY plane in the XYZ coordinate system is also 0° (parallel to the XZ plane). Therefore, when the content that is assumed to be viewed by a user in a sitting posture is started to be played under a state in which the user visually recognizes the horizontal direction, the field-of-view image 26 corresponding to the initial direction defined for the moving image content is displayed on the display 112. With this, the user in the sitting posture can actually visually recognize a video that looks natural when the user visually recognizes the video in the sitting posture.

Meanwhile, in FIG. 17B, the inclination correction value defined for the moving image content to be played in the virtual space 2 is 60°. Therefore, after the virtual space 2 is defined, the inclination of the virtual camera 1 is corrected based on the inclination correction value. Specifically, the virtual camera 1 in the global coordinate system is inclined by 60° relatively to the HMD 110. The XYZ coordinate system of the virtual space 2 is parallel to the global coordinate system, and hence the inclination of the virtual camera 1 with respect to the XZ plane in the XYZ coordinate system is an inclination obtained by correcting the inclination of the HMD 110 with respect to the horizontal plane in the global coordinate system by 60°. That is, the virtual camera is inclined by an inclination obtained by correcting the inclination of the HMD 110 by 60°, and thus the direction of the virtual camera 1 in the virtual space 2 is set.

For example, as illustrated in FIG. 17B, when the user is viewing obliquely upward by 60° in the vertical direction in a lying state, the inclination of the HMD 110 in the global coordinate system is 60° (the HMD 110 is inclined by 60° with respect to the horizontal plane). At this time, the inclination of the virtual camera 1 in the XYZ coordinate system is 0°, which is a value obtained by correcting 60° being the inclination of the HMD 110 by the inclination correction value. That is, the roll direction (w axis) of the virtual camera 1 is parallel to the XY plane.

Therefore, when the content that is assumed to be viewed by a user in a supine posture is started to be played under a state in which the user is actually lying down, the field-of-view image 26 corresponding to the initial direction defined for the moving image content is displayed on the display 112. With this, the user in the supine posture can actually visually recognize a video that looks natural when the user visually recognizes the video in the supine posture.

The HMD system 100 corrects the inclination of the virtual camera 1 based on the inclination correction value defined for the moving image content, to thereby unify the position of the functional section with respect to the display position of the advertisement included in the moving image content regardless of the details of the moving image content to be played. This point is described below.

Figure 18A:
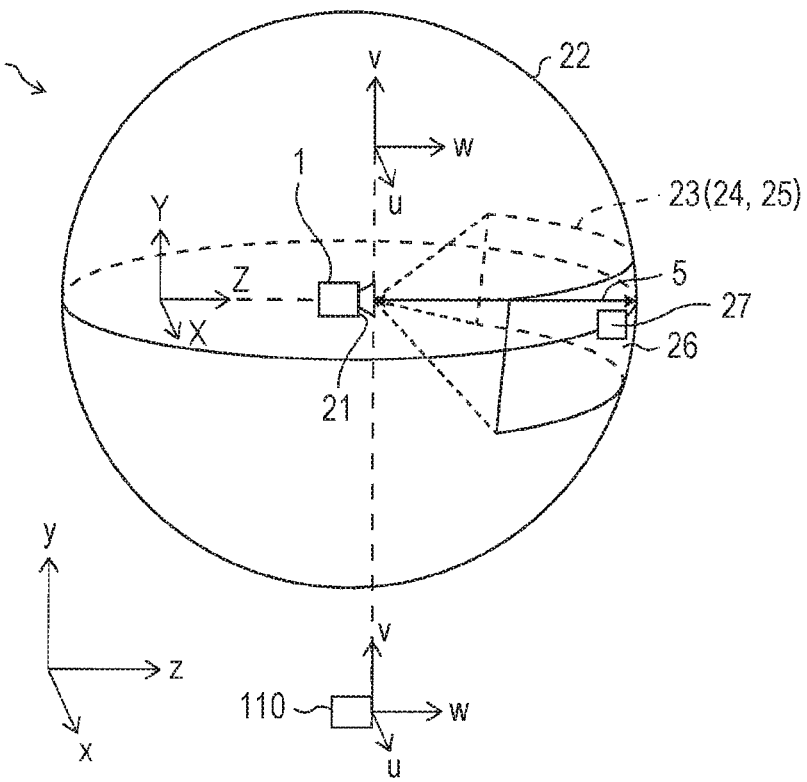
FIG. 18A is a diagram of a position of a functional section when content is play which is assumed to be viewed by a user in a sitting position according to at least one embodiment.
Figure 18B:
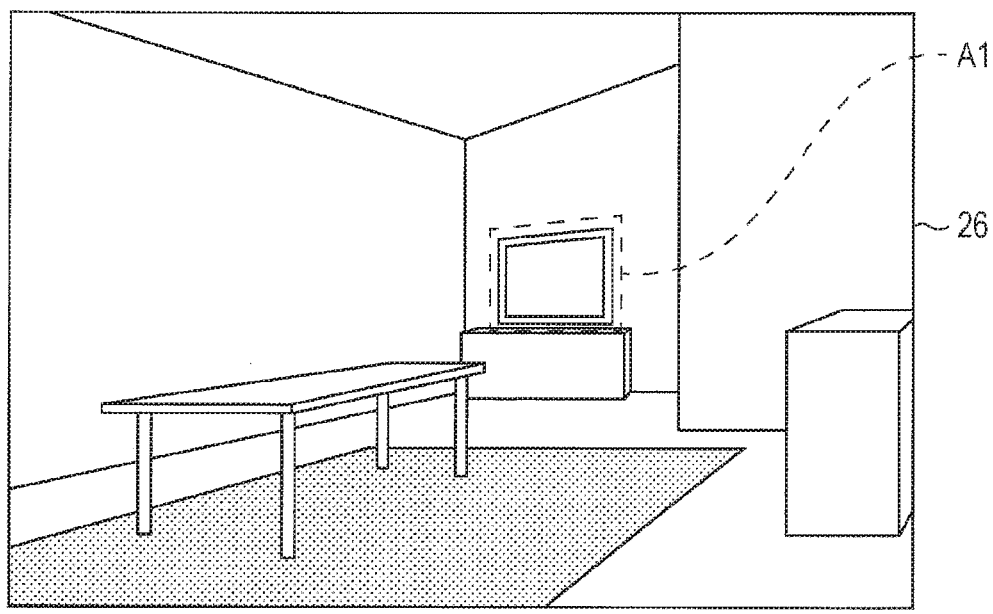
FIG. 18B is a diagram of a position of a functional section when content is play which is assumed to be viewed by a user in a sitting position according to at least one embodiment.

FIGS. 18A-18B are diagrams of a position of a functional section when content that is assumed to be viewed by a user in a sitting posture is played according to at least one embodiment. FIG. 18A is a diagram of the virtual space 2 in which a functional section 27 is defined according to at least one embodiment. In the example of FIG. 18A, the functional section 27 is defined in advance near a position at which a positive direction of the Z axis (right direction in FIG. 18A) intersects with the celestial sphere surface forming the virtual space 2. The functional section 27 is a region to which a predetermined function can be allocated. In at least one embodiment, a function of detecting whether or not the user's line of sight (field-of-view direction or line-of-sight direction NO) has hit the functional section 27 is allocated to the functional section 27. Further, a function of detecting the time at which the user's line of sight has hit the functional section 27 is also allocated to the functional section 27.

The moving image content that is assumed to be viewed by a user in a sitting posture, which is played in the virtual space illustrated in FIG. 18A, includes an advertisement. The advertisement is merely a part of an image of each frame forming the moving image content, and the moving image content does not further include separate advertisement data. The position of the advertisement in the moving image content is defined in advance so that, when the moving image content is played in the virtual space 2, the advertisement included in the moving image content is arranged at the position of the functional section 27 in the virtual space 2. Specifically, when each partial image of the moving image content is associated with each mesh section of the virtual space 2 so that the initial direction of the moving image content matches with the direction in the XYZ coordinate system of the virtual space 2, the partial image including the advertisement is associated with the mesh section corresponding to the position of the functional section 27 in the virtual space 2.

FIG. 18A is a diagram of the virtual space 2 defined in the initial state (immediately after the user selects the moving image content). In this example, the user faces the horizontal direction, and hence the virtual camera 1 is arranged in parallel to the XZ plane. Therefore, the reference line of sight 5 matches with the Z direction (initial direction of the moving image content), and hence the field-of-view region 23 including the functional section 27 is determined. With this, the field-of-view image 26 including the partial image superimposed on the functional section 27 (that is, the portion in which the advertisement is displayed) is generated.

FIG. 18B is a diagram of an example of the field-of-view image including an advertisement A1 according to at least one embodiment. In at least one example, when playing of the moving image content that is assumed to be viewed by a user in a sitting posture is started, the field-of-view image 26 including the advertisement A1 is displayed on the display 112 as the initial field-of-view image 26. The advertisement A1 in the virtual space 2 is located to be superimposed on the functional section 27 in the celestial sphere surface. Therefore, the line-of-sight managing unit 232 can detect that the line of sight has hit the functional section 27, to thereby detect that the user has hit his or her line of sight to the advertisement A1. With this, the HMD system 100 can measure the degree of interest that the user has in the advertisement A1 when the user views the moving image content.

Figure 19A:
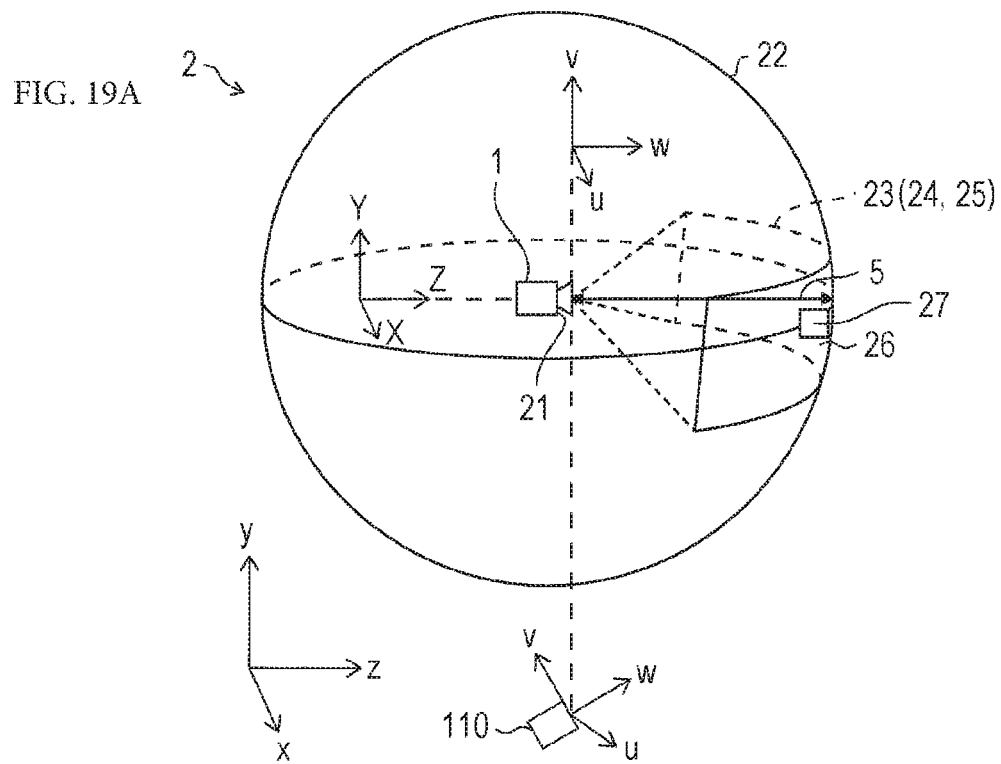
FIG. 19A is a diagram of a position of a functional section when content is play which is assumed to be viewed by a user in a supine position according to at least one embodiment.
Figure 19B:
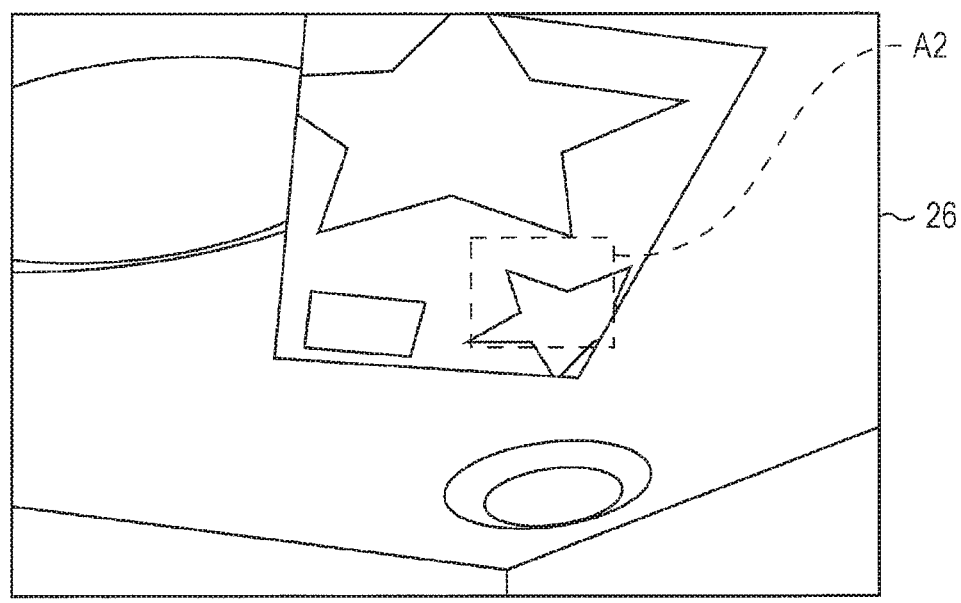
FIG. 19B is a diagram of a position of a functional section when content is play which is assumed to be viewed by a user in a supine position according to at least one embodiment.

FIGS. 19A-19B are diagrams of a position of a functional section when content that is assumed to be viewed by a user in a supine posture is played according to at least one embodiment. FIG. 19A is a diagram of the virtual space 2 in which the functional section 27 is defined according to at least one embodiment. Also in at least the example of FIG. 19B, similarly to the example of FIG. 19A, the functional section 27 is defined in advance near a position at which a positive direction of the Z axis (right direction in FIG. 19A) intersects with the celestial sphere surface forming the virtual space 2. That is, the position of the functional section 27 in the virtual space 2 is unified to that in the case of FIG. 18B. With this, the same model data can be used in the case where the virtual space 2 illustrated in FIG. 19A is to be defined and the case where the virtual space 2 illustrated in FIG. 18A is to be defined.

The moving image content that is assumed to be viewed by a user in a supine posture, which is played in the virtual space 2 illustrated in FIG. 19A, also includes an advertisement. The position of the advertisement in the moving image content is defined in advance so that, when the moving image content is played, the advertisement included in the moving image content is arranged at the position of the functional section 27 in the virtual space 2.

FIG. 19A is a diagram of the virtual space 2 defined in the initial state, that is, immediately after the user selects the moving image content according to at least one embodiment. In at least one example, the user is viewing obliquely upward by 60° in the vertical direction in a lying state, and hence the inclination of the virtual camera 1 is corrected by an inclination correction value of 60° to be arranged in parallel to the XZ plane. Therefore, the reference line of sight 5 matches with the Z direction (initial direction of the moving image content), and hence the field-of-view region 23 including the functional section 27 is determined. With this, the field-of-view image 26 including the partial image superimposed on the functional section 27 (that is, the portion in which the advertisement is displayed) is generated.

FIG. 19B is a diagram of an example of the field-of-view image including an advertisement A2 according to at least one embodiment. In at least one example, when playing of the moving image content that is assumed to be viewed by a user in a supine posture is started, the field-of-view image 26 including the advertisement A2 is displayed on the display 112 as the initial field-of-view image 26. The advertisement A2 in the virtual space 2 is located to be superimposed on the functional section 27 in the celestial sphere surface. Therefore, the line-of-sight managing unit 232 can detect that the line of sight has hit the functional section 27, to thereby detect that the user has hit his or her line of sight to the advertisement A2. With this, the HMD system 100 can measure the degree of interest that the user has in the advertisement A2.

As illustrated in FIGS. 18A-18B and FIGS. 19A-19B, the inclination of the virtual camera 1 is corrected with use of the inclination correction value defined for each piece of content, and thus the position of the functional section 27 with respect to the advertisement of each piece of content can be easily unified. With this, changing the instructions for defining the function of the functional section 27 for each piece of content is not necessary. That is, a common program can be used to collect the line-of-sight information relating to the user's line of sight to the advertisement in each piece of content. As a result, the playing of the moving image content with use of the platform can be efficiently performed.

The control circuit unit 200 may use the inclination correction value defined for the content to correct not the inclination of the virtual camera 1 but the inclination of the XYZ coordinate system of the virtual space 2. This example is described below.

In at least one example, when the virtual space defining unit 231 defines the virtual space 2, the virtual space defining unit 231 corrects the inclination of the XYZ coordinate system with respect to the global coordinate system with use of the inclination correction value defined for the content. Specifically, the virtual space defining unit 231 inclines the XYZ coordinate system relatively to the global coordinate system by the inclination correction value specified by the inclination correction value specifying unit 235. For example, when the inclination correction value is 60°, the virtual space defining unit 231 inclines the XYZ coordinate system with respect to the global coordinate system so that an angle formed between the XZ plane of the XYZ coordinate system and the horizontal plane of the global coordinate system is 60°.

The virtual space defining unit 231 processes the data that defines the XYZ coordinate system of the virtual space 2 included in the model data with use of the inclination correction value, to thereby generate data that defines the XYZ coordinate system subjected to the inclination correction to add the data to the virtual space data. The position of each mesh section in the virtual space 2 is defined in the management data of each mesh section as coordinates of the XYZ coordinate system, and hence each mesh section is similarly inclined with respect to the global coordinate system when the XYZ coordinate system is inclined with respect to the global coordinate system. Meanwhile, after the virtual camera control unit 221 arranges the virtual camera 1 in the virtual space 2, the virtual camera control unit 221 matches the inclination of the virtual camera 1 in the global coordinate system with the inclination of the HMD 110, to thereby set the direction of the virtual camera 1 in the virtual space 2. That is, the inclination of the virtual camera 1 with respect to the HMD 110 is not corrected. For example, when the inclination of the HMD 110 with respect to the horizontal direction in the global coordinate system matches with the inclination correction value defined for the moving image content, the virtual camera control unit 221 sets the direction of the virtual camera 1 so as to be parallel to the XY plane in the virtual space 2.

In at least one example, when the content that is assumed to be viewed by a user in a sitting posture is played in the virtual space 2, the XYZ coordinate system is parallel to the global coordinate system, and the inclination of the virtual camera 1 is synchronized with the inclination of the HMD 110. Therefore, when the user in the sitting posture visually recognizes the horizontal direction (the HMD 110 is directed in the horizontal direction), the direction of the virtual camera 1 is parallel to the XZ plane of the virtual space 2. In this manner, the field-of-view image 26 corresponding to the reference line of sight 5 that is parallel to the XZ plane is displayed on the display 112, and hence the user can visually recognize a natural video in the sitting posture.

Meanwhile, in at least one example, when the content that is assumed to be viewed by a user in a supine posture is played in the virtual space 2, the XYZ coordinate system of the virtual space 2 is inclined by 60° with respect to the global coordinate system, and the inclination of the virtual camera 1 in the global coordinate system is synchronized with the inclination of the HMD 110. Therefore, when the user in a lying state is viewing obliquely upward by 60° in the vertical direction (the HMD 110 is inclined by 60° from the horizontal direction), the direction of the virtual camera 1 is parallel to the XZ plane of the virtual space 2. With this, the field-of-view image 26 corresponding to the reference line of sight 5 that is parallel to the XZ plane is displayed on the display 112. As a result, the user can visually recognize a natural video in a lying state.

In related art, when the user moves the HMD, a portion to be visually recognized by the user in the virtual space can be changed, and hence the user's sense of immersion in the virtual space can be enhanced. Meanwhile, there is a demand for a device for further enhancing the operability in the virtual space so that any portion in the virtual space can be more easily visually recognized by the user while enhancing the sense of immersion in the virtual space. This disclosure further enhances the operability in the virtual space.

Figure 20A:
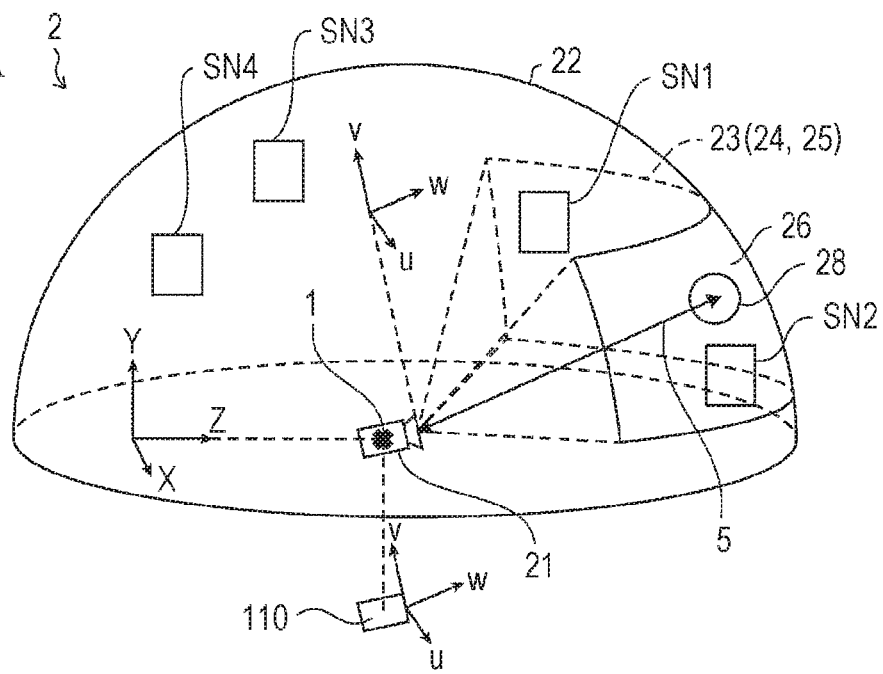
FIG. 20A is a diagram of a virtual space for playing moving image content via a platform according to at least one embodiment.

FIG. 20A is a diagram of an example of the virtual space 2 for providing the platform according to at least one embodiment. FIG. 20A is a diagram of the virtual space 2 for providing the platform in which one operation object 28 and four thumbnails SN1 to SN4 are arranged. Those thumbnails SN1 to SN4 are each an object associated with an overview image (thumbnail) of corresponding moving image content. The operation object 28 is used for rotating the virtual camera 1 or the virtual space 2. The operation object 28 basically has a circular shape. Details are described later, but the operation object 28 is elastically deformed (extended) in accordance with an operation performed by the user on the operation object 28.

After the virtual space data representing the virtual space illustrated in FIG. 20A is generated, in Step S22, the field-of-view image generating unit 223 generates the field-of-view image 26 based on the reference line of sight 5 of the user. The generation method is similar to the method described with reference to FIG. 8. In at least one embodiment, the field-of-view image 26 corresponding to the platform is generated. In FIG. 20A, the operation object 28 and the thumbnails SN1 and SN2 among the thumbnails SN1 to SN4 are arranged in the field-of-view region 23 defined by the reference line of sight 5 of the user. Meanwhile, the thumbnails SN3 and SN4 are arranged outside of the field-of-view region 23. Therefore, the field-of-view image generating unit 223 generates the field-of-view image 26 including the operation object 28 and the thumbnails SN1 and SN2. Details are described later, but the field-of-view image generating unit 223 further generates the field-of-view image 26 including a point of gaze 29. The point of gaze 29 is information representing to which position the user hits his or her line of sight in the field-of-view image 26.

In Step S23, the field-of-view image generating unit 223 outputs the generated field-of-view image 26 to the HMD 110. In Step S24, the HMD 110 displays the received field-of-view image on the display 112. The user visually recognizes the field-of-view image 26 of the platform. In a case where an object associated with a thumbnail is included in the field-of-view image 26, when the field-of-view image 26 is displayed, the thumbnail associated with the object is displayed on the display 112. With this, the user visually recognizes the field-of-view image 26 including the thumbnail. Further, when the operation object 28 is included in the field-of-view image 26, the operation object 28 is displayed on the display 112 at the time of the display of the field-of-view image 26. With this, the user visually recognizes the field-of-view image 26 including the operation object 28.

Figure 20B:
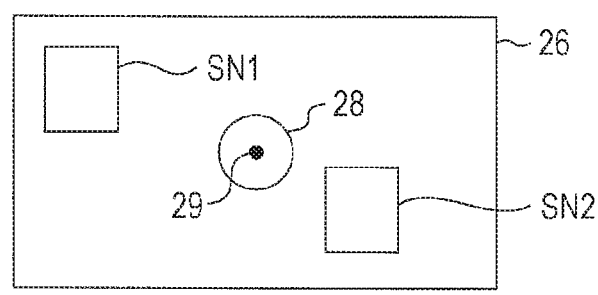
FIG. 20B is a diagram of a field-of-view image of a platform according to at least one embodiment.

FIG. 20B is a diagram of an example of the field-of-view image 26 of the platform according to at least one embodiment. The field-of-view image 26 illustrated in FIG. 20B includes the operation object 28, the point of gaze 29, the thumbnail SN1, and the thumbnail SN2. Therefore, the user is able to visually recognize the operation object 28, the point of gaze 29, the thumbnail SN1, and the thumbnail SN2 in the virtual space 2.

The field-of-view image generating unit 223 determines the position of the point of gaze 29 in the field-of-view image 26 based on the reference line of sight 5 and the line-of-sight direction NO. When the user visually recognizes the front side, that is, when the reference line of sight 5 matches with the line-of-sight direction NO, at the time of generating the field-of-view image 26, the field-of-view image generating unit 223 arranges the point of gaze 29 at the center of the field-of-view image 26 based on the reference line of sight 5. When the user does not change his or her line of sight while visually recognizing the front side, the reference line of sight 5 matches with the line-of-sight direction NO, and hence the point of gaze 29 is always arranged at the center of the field-of-view image 26.

Meanwhile, when the user moves his or her line of sight and thus the line-of-sight direction NO is deviated from the reference line of sight 5, the field-of-view image generating unit 223 determines the position of the point of gaze 29 in the field-of-view image 26 based on the current line-of-sight direction NO. Specifically, the field-of-view image generating unit 223 specifies the intersection at which the line-of-sight direction NO intersects with the field-of-view region 23, and then generates the field-of-view image 26 in which the point of gaze 29 is hit to the position corresponding to the intersection in the field-of-view image 26.

When the user does not move the HMD 110 but moves only the line of sight (while the reference line of sight 5 is fixed), the position of the point of gaze 29 in the field-of-view image 26 is changed so as to follow the movement of the line of sight. With this, the field-of-view image 26 is updated so that the point of gaze 29 is displayed at the position at which the user hits his or her line of sight in the field-of-view image 26. In other words, the user can freely move the point of gaze 29 in the field-of-view image 26 through the movement of the line of sight. Therefore, the user can confirm the point of gaze 29 to accurately recognize to which position of the field-of-view image 26 the line of sight is hit.

Although not shown in FIG. 9, when the user moves the HMD 110 after that, the field-of-view image 26 is updated in synchronization with the movement. For example, when the user moves the HMD 110 and the position of the field-of-view region 23 changes to a position including the thumbnails SN1 and SN3, the field-of-view image 26 including the thumbnails SN1 and SN3 is displayed on the display 112. Therefore, the user moves the HMD 110 as appropriate so that the thumbnail of the moving image content that the user desires to view can fall within his or her field of view.

After the field-of-view image 26 of the platform is displayed, in Step S25, the eye gaze sensor 130 detects each of the line of sight of the right eye and the line of sight of the left eye of the user, and in Step S26, transmits the detection values to the control circuit unit 200. The line-of-sight detecting unit 212 receives the detection values. In Step S27, the line-of-sight detecting unit 212 uses the received detection values to specify the line-of-sight direction NO of the user in the uvw visual-field coordinate system of the virtual camera 1.

In Step S28, the line-of-sight managing unit 232 determines whether or not the line of sight of the user (point of gaze 29) has hit a specific thumbnail included in the field-of-view image 26 for a defined time period or more based on the line-of-sight direction NO and each thumbnail included in the field-of-view region 23. More specifically, the line-of-sight managing unit 232 determines whether or not an intersection point of the line-of-sight direction NO in the field-of-view region 23 is included in a display range (arrangement range) of the specific thumbnail included in the field-of-view region 23. When the result of the determination is YES, the line of sight is determined to have hit the specific thumbnail included in the field-of-view image 26, and when the result of the determination is NO, the line of sight is determined not to have hit the specific thumbnail.

In the case of NO in Step S28, the processing of FIG. 9 is returned to the beginning of Step S25. After that, until YES is obtained in Step S28, the processing of Step S25 to Step S28 is repeated. Meanwhile, in the case of YES in Step S28, in Step S29, the content specifying unit 233 specifies the content corresponding to the thumbnail determined to be hit by the line of sight for the defined time period or more. For example, when the user hits his or her line of sight to the thumbnail SN1, the point of gaze 29 is superimposed on the thumbnail SN1 in the field-of-view image 26. Further, when the user hits his or her line of sight to the thumbnail SN1 for a defined time period or more, the moving image content associated with the management data of the thumbnail SN1 is specified as the content corresponding to the thumbnail SN1.

After that, in Step S30, the virtual space defining unit 231 generates the virtual space data for playing the specified moving image content, to thereby define the virtual space 2 for playing the moving image content. The procedure of the generation is as follows. First, the virtual space defining unit 231 acquires the model data of the virtual space 2 corresponding to the moving image content from the model storing unit 241.

The virtual space defining unit 231 acquires the moving image content specified by the content specifying unit 233 from the content storing unit 242. The virtual space defining unit 231 adapts the acquired moving image content to the acquired model data, to thereby generate the virtual space data that defines the virtual space 2 for playing the moving image content. The virtual space defining unit 231 associates as appropriate each partial image forming an image of the first frame included in the moving image content with the management data of each mesh section forming the celestial sphere of the virtual space 2 in the virtual space data.

In the virtual space 2 defined by the virtual space data generated here, arrangement of objects is not assumed. Further, the moving image content does not include the management data that defines the object. Therefore, in Step S30, the virtual space defining unit 231 generates the virtual space data not including the management data of the object.

After the generation of the virtual space data representing the virtual space 2 for playing the moving image content, in Step S31, the field-of-view image generating unit 223 generates the field-of-view image 26 based on the reference line of sight 5 of the user. The generation method is the same as the method described with reference to FIG. 8. In this case, the field-of-view image 26 of the moving image content is generated. In Step S32, the field-of-view image generating unit 223 outputs the generated field-of-view image 26 to the HMD 110. In Step S33, the HMD 110 displays the received field-of-view image 26 on the display 112 to update the field-of-view image 26. With this, the playing of the moving image content is started in the virtual space 2, and the user visually recognizes the field-of-view image 26 of the moving image content.

Although not shown in FIG. 9, when the user moves the HMD 110 after that, the field-of-view image 26 is updated in synchronization with the movement. Therefore, the user can move the HMD 110 as appropriate to visually recognize a partial image (field-of-view image 26) at a desired position in the entire celestial sphere image of each frame forming the moving image content.

Figure 20C:
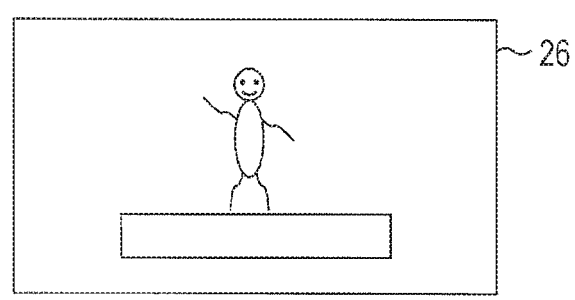
FIG. 20C is a diagram of a field-of-view image of moving image content according to at least one embodiment.

FIG. 20C is a diagram of an example of the field-of-view image 26 of the moving image content according to at least one embodiment. The field-of-view image 26 illustrated in FIG. 20C is a field-of-view image 26 of the moving image content corresponding to the thumbnail SN1 selected by the user. As described above, when the user selects the thumbnail SN1 by the line of sight while visually recognizing the field-of-view image 26 of the platform illustrated in FIG. 20B, the field-of-view image 26 of the platform displayed on the display 112 is updated to the field-of-view image 26 of the moving image content illustrated in FIG. 20C. That is, the user can select the thumbnail SN1 through movement of the line of sight in the virtual space 2 to view the moving image content corresponding to the thumbnail SN1 in the virtual space 2.

As described above, the user can select the moving image content that the user desires to view in the virtual space 2 through the platform for selecting the moving image content in the virtual space 2. Therefore, the user does not need to select the moving image content that the user desires to view in the virtual space 2 while visually recognizing another general display connected to the control circuit unit 200 in the real space before wearing the HMD 110. With this, the user's sense of immersion in the virtual space 2 can be further enhanced.

Further, when the user performs a predetermined operation on the HMD system 100 (for example, through the controller 300) while the moving image content is played, the control circuit unit 200 ends providing to the user the virtual space 2 in which the moving image content is played, and then provides again to the user the virtual space 2 in which the platform for selecting the moving image content is developed. With this, the user can select another thumbnail to view other moving image content in the virtual space 2. The user is able to switch the moving image content to be viewed without removing HMD 110, and hence the user's sense of immersion in the virtual space 2 can be further enhanced.

The control circuit unit 200 of at least one embodiment operates in a normal mode (first mode) or a rotation mode (second mode). The normal mode and the rotation mode differ from each other in the method of controlling the virtual camera 1 by the control circuit unit 200. In the normal mode, the control circuit unit 200 controls the inclination of the virtual camera 1 in the virtual space 2 in synchronization with the inclination of the HMD 110. Therefore, when the user inclines the HMD 110 in the normal mode, the virtual camera 1 is also inclined in synchronization therewith, and the field-of-view image 26 is displayed on the HMD 110 in accordance with the inclination.

In the rotation mode, the control circuit unit 200 does not control the inclination of the virtual camera 1 in the virtual space 2 in synchronization with the inclination of the HMD 110. Therefore, even when the user inclines the HMD 110 in the rotation mode, the virtual camera 1 is not inclined in synchronization therewith. Instead, the control circuit unit 200 rotates the virtual camera 1 in the virtual space 2 in accordance with the operation performed by the user on the operation object 28. In at least one embodiment, the user can operate the operation object 28 through the movement of the HMD 110. Therefore, in the rotation mode, the control circuit unit 200 rotates the virtual camera 1 in accordance with the inclination of the HMD 110.

In the normal mode, when the user stops the movement of the HMD 110, the movement of the virtual camera 1 also stops. Therefore, the update of the field-of-view image 26 also stops. Meanwhile, in the rotation mode, the rotation of the virtual camera 1 does not stop even when the user stops the movement of the HMD 110. That is, the virtual camera 1 continues to rotate as long as the user continues to maintain a state in which the HMD 110 is further inclined from the state at the time of the start of the rotation. With this, the field-of-view image 26 is also continuously updated.

FIG. 21 is a sequence diagram of a flow of processing performed by the HMD system 100 to transition to a rotation mode according to at least one embodiment. In the following, description is given of at least one example of a case where the virtual space 2 in which the platform is played is provided to the user.

After the field-of-view image 26 of the platform is displayed, in Step S41-1, the HMD sensor 120 detects the position and the inclination of the HMD 110, and in Step S42-1, outputs the detection values to the control circuit unit 200. The HMD detecting unit 211 receives the detection values. The virtual camera control unit 221 specifies the reference line of sight 5 by the above-mentioned procedure based on the detection values of the position and the inclination of the HMD 110. The virtual camera control unit 221 controls the virtual camera 1 based on the specified reference line of sight 5.

Next, in Step S43-1, the operation object control unit 236 determines whether or not the reference line of sight 5 has hit the operation object 28 for a defined time period or more in the virtual space 2. In the case of NO in Step S43-1, the field-of-view region determining unit 222 determines the field-of-view region 23 in the virtual space 2 based on the specified reference line of sight 5. After that, in Step S44-1, the field-of-view image generating unit 223 generates the field-of-view image 26, and in Step S45-1, outputs the field-of-view image 26 to the HMD 110. In Step S46-1, the HMD 110 displays the received field-of-view image 26 on the display 112 to update the field-of-view image 26. With this, in the normal mode, when the user moves the HMD 110, the field-of-view image 26 is updated in synchronization therewith.

When the user moves the HMD 110 and the operation object 28 is included in the field-of-view region 23, the operation object 28 does not move similarly to other objects. Meanwhile, when the user moves the HMD 110 and the operation object 28 is shifted out of the field-of-view region 23, the operation object 28 moves so as to return into the field-of-view region 23.

This operation is implemented by the following procedure. First, the operation object control unit 236 detects that at least a part of the operation object 28 is positioned outside of the field-of-view region 23. Next, when the operation object control unit 236 detects that at least a part of the operation object 28 is positioned outside of the field-of-view region 23, the operation object control unit 236 moves the operation object 28 into the field-of-view region 23. Specifically, the operation object control unit 236 updates the position (coordinates) of the operation object 28 in the data that defines the operation object 28 to any coordinates in the current field-of-view region 23.

The position at which the operation object 28 returns in the field-of-view region 23 may be any position in the field-of-view region 23. In at least one embodiment, the position has the smallest movement amount when the operation object 28 is moved. For example, when the operation object 28 is positioned on the right side of the field-of-view region 23, the operation object control unit 236 is preferred to move the operation object 28 to the right end of the field-of-view region 23.

With this, in the normal mode, the operation object 28 is always included in the field-of-view region 23, and hence the operation object 28 is also always included in the field-of-view image 26 generated based on the field-of-view region 23. Therefore, when the user desires to select the operation object 28, the user can easily find the operation object 28. Further, when the user selects the operation object 28 by the reference line of sight 5 as described later, the movement control of the HMD 110 for hitting the reference line of sight 5 to the operation object 28 can be minimized.

Meanwhile, in the case of YES in Step S43-1, the operation object control unit 236 detects that the operation object 28 is selected by the user in Step S47-1. In this manner, the user can select the operation object 28 by directing his or her line of sight to the operation object 28. With the selection of the operation object 28 as a trigger, in Step S48-1, the control circuit unit 200 transitions to the rotation mode. With this, the user can cause the control circuit unit 200 to transition to the rotation mode in accordance with his or her own will. After the transition to the rotation mode, the rotation of the virtual camera 1 is started in accordance with the operation performed by the user on the operation object 28.

FIG. 22 is a sequence diagram of a flow of processing performed by the control circuit unit 200 when the rotation of the virtual camera 1 is started in the rotation mode according to at least one embodiment.

After the transition to the rotation mode, in Step S51, the HMD sensor 120 detects the position and the inclination of the HMD 110, and in Step S52, outputs the detection values to the control circuit unit 200. The HMD detecting unit 211 receives the detection values. In Step S53, the operation object control unit 236 determines whether or not the inclination of the HMD 110 has changed. In the case of NO in Step S53, the processing of FIG. 22 is returned to the beginning of Step S51. Therefore, after the operation object 28 is selected, the steps of Step S51 to Step S53 are repeated until the user further inclines the HMD 110.

Meanwhile, in the case of YES in Step S53, in Step S54, the operation object control unit 236 specifies the change amount of the inclination of the HMD 110. In Step S55, the operation object control unit 236 specifies an extension direction (predetermined direction) and an extension amount (predetermined amount) of the operation object 28 designated by the user based on the specified inclination change amount. In Step S56, the operation object control unit 236 extends the operation object 28 by the specified extension amount in the specified extension direction. At this time, the operation object control unit 236 extends the operation object 28 so that the operation object 28 is gradually narrowed from the root of the operation object 28 to the terminal end portion in the extension direction. Further, the display state of the operation object 28 is changed so that the reference line of sight 5 is superimposed on the terminal end portion of the operation object 28 in the extension direction.

After that, in Step S57, the rotation control unit 237 determines the rotational direction of the virtual camera 1 based on the extension direction of the operation object 28, and determines the rotational speed of the virtual camera 1 based on the extension amount of the operation object 28. In at least one embodiment, the operation object control unit 236 specifies a direction parallel to the horizontal component of the extension direction as the rotational direction of the virtual camera 1. With this, the virtual camera 1 rotates only about the Y axis in the virtual space 2. Further, the virtual camera 1 can be prevented from being rotated about the Z axis in the virtual space 2. With this, the user is prevented from visually recognizing a state in which the ground of the virtual space 2 vertically moves when the field-of-view image 26 is updated, and hence the user is prevented from feeling sick in the virtual space 2.

In Step S58, the virtual camera control unit 221 starts the rotation of the virtual camera 1 in the determined rotational direction and at the determined rotational speed. When the virtual camera 1 is rotated, the roll direction of the virtual camera 1 in the virtual space 2 is changed, and hence the field-of-view region 23 is changed. The operation object control unit 236 controls the operation object 28 so that the operation object 28 is always arranged at the center of the field-of-view region 23 when the virtual camera 1 is rotated. Specifically, in the management data of the operation object 28, the coordinates of the operation object 28 are updated to the coordinates at the center of the field-of-view region 23. With this, under a state in which the position of the operation object 28 is fixed in the UVW visual-field coordinate system of the virtual camera 1, both of the virtual camera 1 and the operation object 28 are rotated in the virtual space 2.

The field-of-view region determining unit 222 determines the field-of-view region 23 based on the direction of the virtual camera 1 (roll direction) detected after rotation for a certain time period. Then, in Step S59, the field-of-view image generating unit 223 generates the field-of-view image 26 based on the determined field-of-view region 23, and in Step S60, transmits the field-of-view image 26 to the HMD 110. In Step S61, the HMD 110 displays the received field-of-view image 26 on the display 112 to update the field-of-view image 26. With this, the field-of-view image 26 obtained before the virtual camera 1 is rotated is updated to the field-of-view image 26 obtained after the virtual camera 1 is rotated.

Figure 23A:
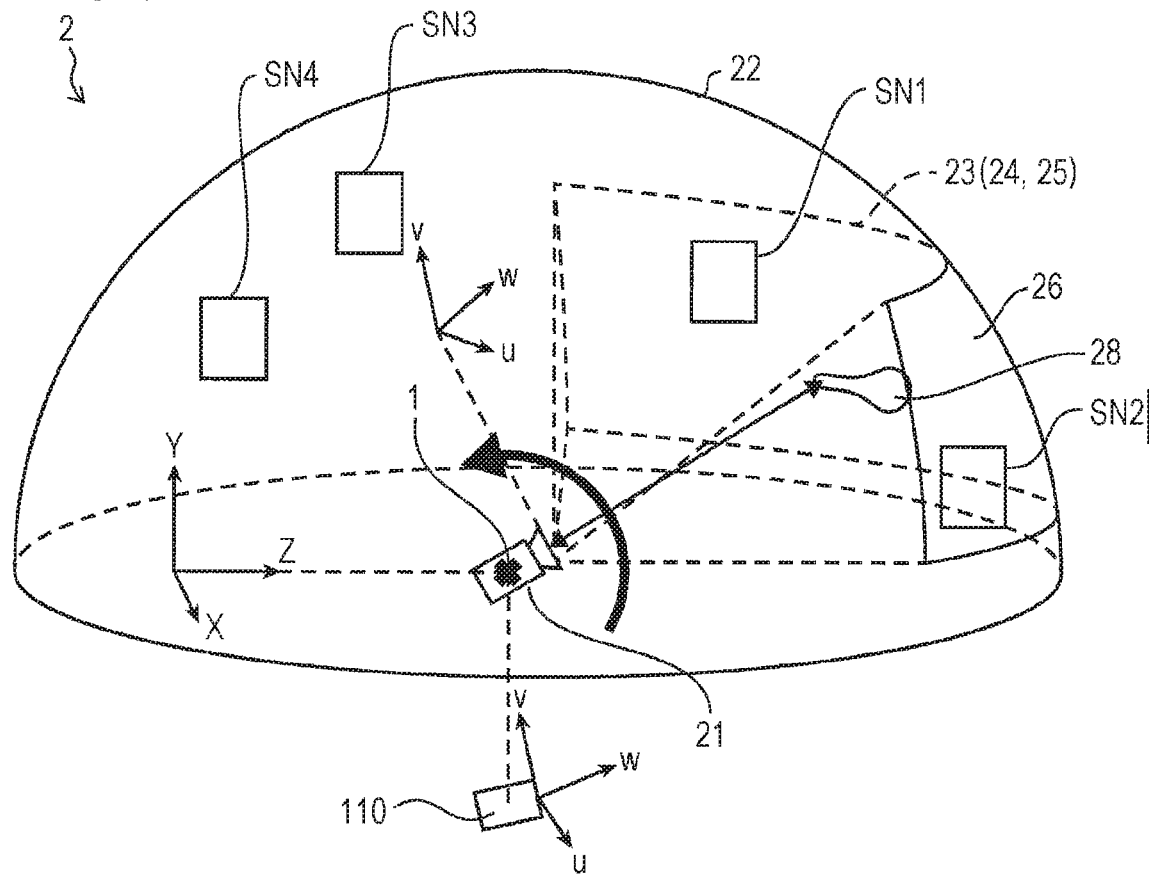
FIG. 23A is a diagram of a virtual space after a virtual camera is rotated according to at least one embodiment.
Figure 23B:
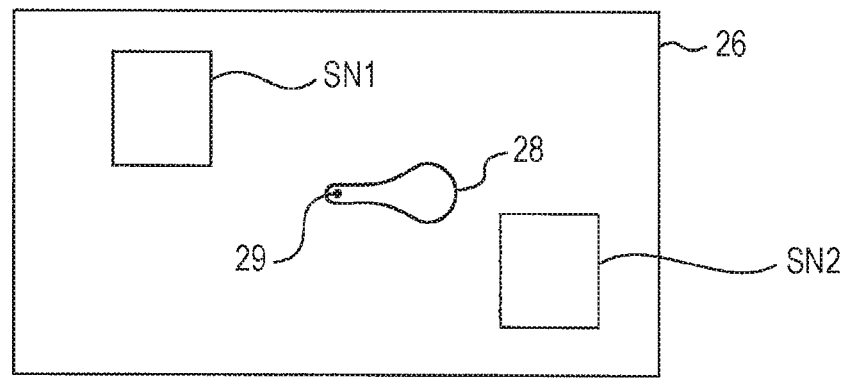
FIG. 23B is a diagram of a field-of-view image after a virtual camera is rotated according to at least one embodiment.

FIGS. 23A-23B are diagrams of a virtual space 2 and the field-of-view image 26 obtained after the virtual camera 1 is rotated according to at least one embodiment. FIG. 23A is a diagram of the virtual space 2, and FIG. 23B is a diagram of the field-of-view image 26 according to at least one embodiment. Now, description is given of at least one example in which, after the operation object 28 is selected, the user twists his or her neck to the left side to subject the operation object 28 to an operation of extending the operation object 28 to the left side. In this case, the extension direction of the operation object 28 is a left direction as viewed from the user, and hence, as the rotational direction of the virtual camera 1, a counterclockwise rotational direction about the Y axis being a rotational axis is determined. Therefore, the virtual camera 1 rotates in the counterclockwise direction about the Y axis serving as the rotational axis.

When the virtual camera 1 rotates in the counterclockwise direction, the position of the field-of-view region 23 is shifted in the counterclockwise direction in the virtual space 2. With this, as illustrated in FIG. 23A, the positions of the thumbnail SN1 and the thumbnail SN2 in the field-of-view region 23 are shifted to the right side relatively to the positions before the start of the rotation. The virtual camera 1 is rotating, and hence the operation object 28 is extending.

As illustrated in FIG. 23B, the field-of-view image 26 that is based on the field-of-view region 23 obtained after the virtual camera 1 is rotated includes the thumbnail SN1 and the thumbnail SN2. The positions of the thumbnail SN1 and the thumbnail SN2 in the field-of-view region 23 are shifted further to the right side than those before the start of the rotation of the virtual camera 1, and hence in accordance therewith, the positions of the thumbnail SN1 and the thumbnail SN2 in the field-of-view image 26 are also shifted further to the right side than those before the start of the rotation of the virtual camera 1. Therefore, the user can recognize that the rotation of the virtual camera 1 in the counterclockwise direction has started.

After the rotation of the virtual camera 1 is started, while the user continuously twists his or her neck to the left side, the virtual camera 1 continuously rotates in the counterclockwise direction. Meanwhile, when the user stops twisting his or her neck and faces the front side, the rotation of the virtual camera 1 is stopped. Now, the flow of this processing is described.

Figure 24:
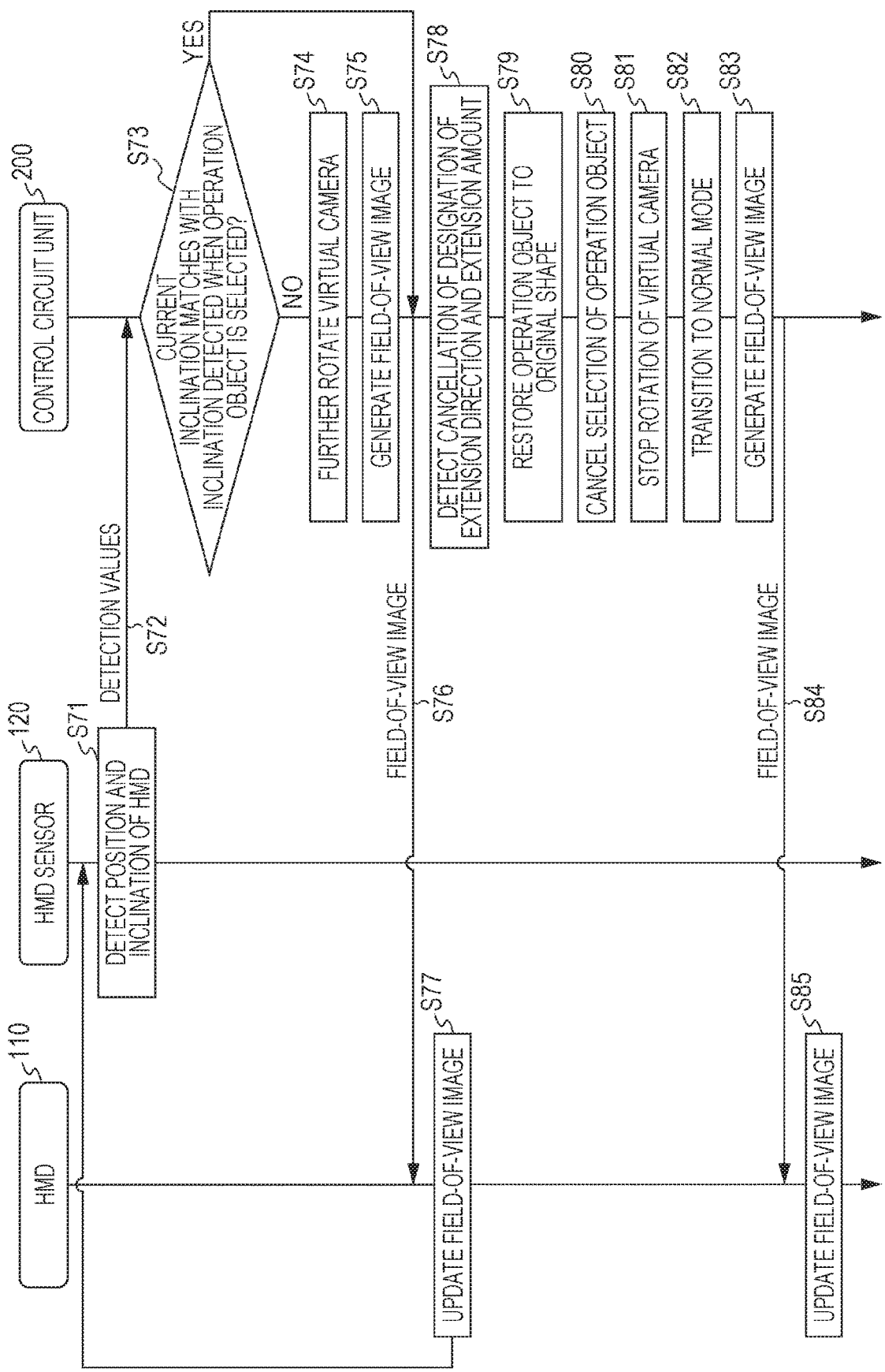
FIG. 24 is a sequence diagram of a flow of processing performed by a control circuit unit to further rotate a virtual camera or stop the rotation of the virtual camera in the rotation mode according to at least one embodiment.

FIG. 24 is a sequence diagram of a flow of processing performed by the control circuit unit 200 to further rotate the virtual camera 1 or stop the rotation of the virtual camera 1 in the rotation mode according to at least one embodiment.

During the rotation of the virtual camera 1, in Step S71, the HMD sensor 120 detects the position and the inclination of the HMD 110, and in Step S72, outputs the detection values to the control circuit unit 200. The HMD detecting unit 211 receives the detection values. In Step S73, the operation object control unit 236 determines whether or not the current inclination of the HMD 110 matches with the inclination of the HMD 110 detected when the operation object 28 is selected. In the case of NO in Step S73, in Step S74, the virtual camera control unit 221 further rotates the virtual camera 1.

After that, the field-of-view region determining unit 222 determines the field-of-view region 23 based on the direction (roll direction) of the virtual camera 1 detected after the rotation for a certain time period. Then, in Step S75, the field-of-view image generating unit 223 generates the field-of-view image 26 based on the determined field-of-view region 23, and in Step S76, transmits the field-of-view image 26 to the HMD 110. In Step S77, the HMD 110 displays the received field-of-view image 26 on the display 112 to update the field-of-view image 26. With this, the field-of-view image 26 obtained after the virtual camera 1 is rotated for a certain time period is updated to the field-of-view image 26 obtained after the virtual camera 1 is further rotated.

After Step S77, the processing illustrated in FIG. 24 is returned to the beginning of Step S71. Therefore, the steps of Step S71 to Step S77 are repeated after the rotation of the virtual camera 1 is started until the user returns the inclination of the HMD 110 to the original inclination (to the inclination detected when the operation object 28 is selected). That is, as long as the operation performed by the user on the operation object 28 is detected, the virtual camera control unit 221 continuously rotates the virtual camera 1.

Figure 25A:
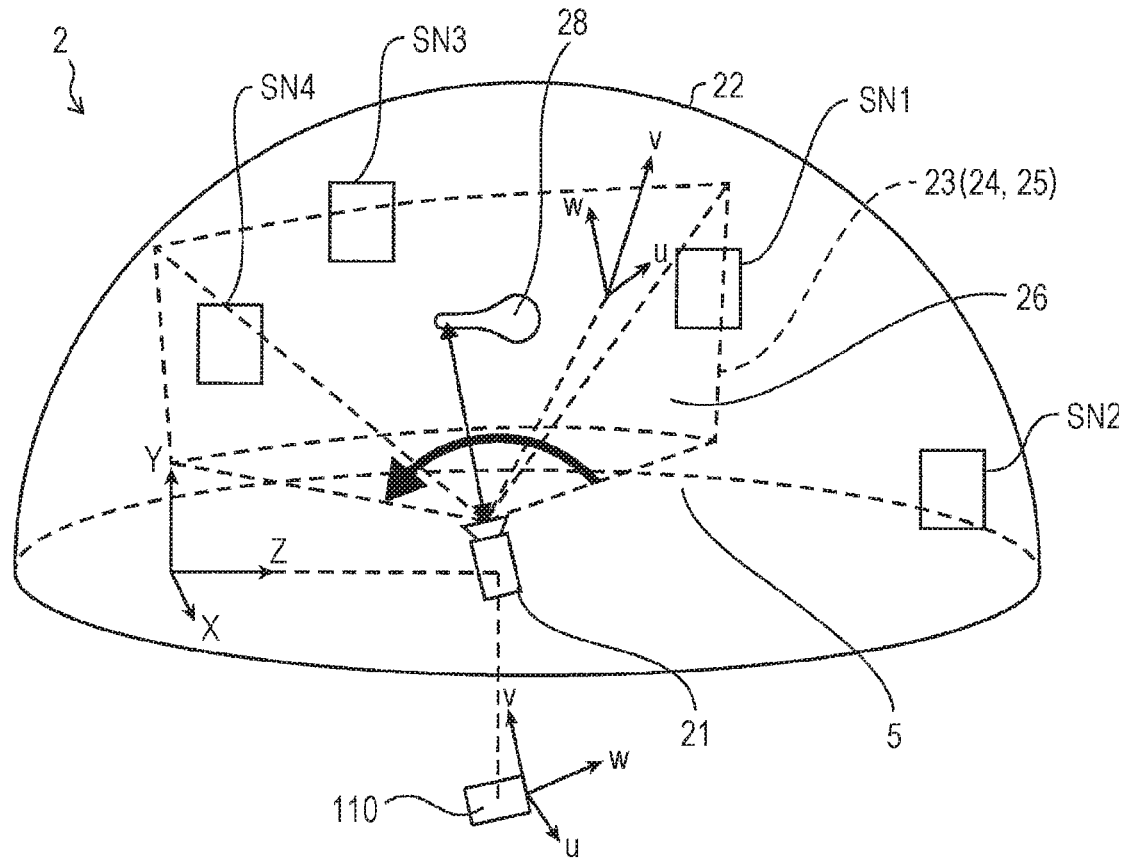
FIG. 25A is a diagram of a virtual space after a virtual camera is further rotated according to at least one embodiment.
Figure 25B:
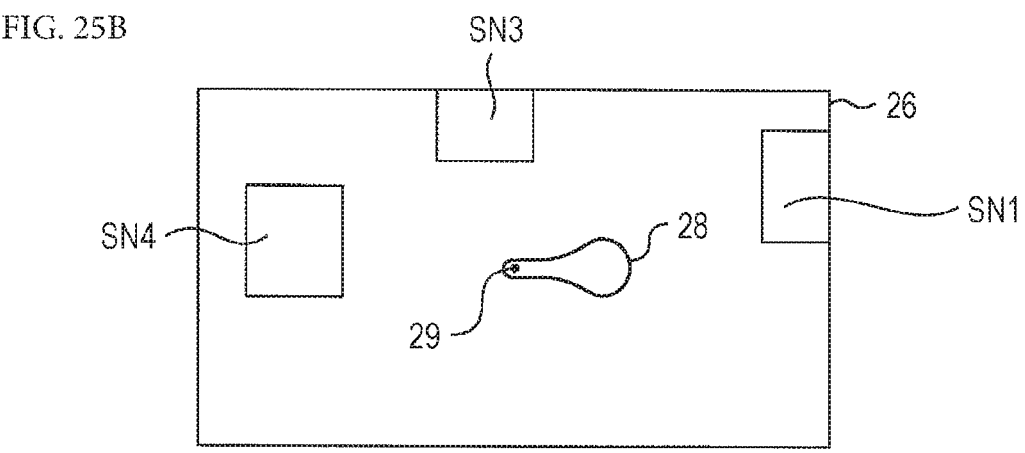
FIG. 25B is a diagram of a field-of-view image after a virtual camera is further rotated according to at least one embodiment.

FIGS. 25A-25B are diagrams of virtual space 2 and the field-of-view image 26 obtained after the virtual camera 1 is further rotated according to at least one embodiment. FIG. 25A is a diagram of the virtual space 2, and FIG. 25B is a diagram of the field-of-view image 26 according to at least one embodiment. When the virtual camera 1 further rotates in the counterclockwise direction, the position of the field-of-view region 23 also further shifts in the counterclockwise direction in the virtual space 2. With this, the field-of-view region 23 is arranged at a position in the virtual space 2 including the thumbnail SN1, the thumbnail SN3, and the thumbnail SN4. The virtual camera 1 is rotating, and hence the operation object 28 is still extending.

As illustrated in FIG. 25B, the field-of-view image 26 that is based on the field-of-view region 23 obtained after the virtual camera 1 is further rotated includes the thumbnail SN1, the thumbnail SN3, and the thumbnail SN4. Therefore, the user recognizes that the thumbnail SN4 has newly entered his or her field of view during the rotation of the virtual camera 1. Now, description is given of an example in which an operation for stopping the rotation of the virtual camera 1 is performed on the operation object 28 at this time point.

In the case of YES in Step S73, in Step S78, the operation object control unit 236 detects that the designation of the extension direction and the extension amount by the user on the operation object 28 has been cancelled. With this, in Step S79, the operation object control unit 236 restores the operation object 28 to the original circular shape. Next, in Step S80, the operation object control unit 236 cancels the selection of the operation object 28. Next, in Step S81, the virtual camera control unit 221 stops the rotation of the virtual camera 1.

After the rotation of the virtual camera 1 is stopped, in Step S82, the control circuit unit 200 transitions to the normal mode. With this, the field-of-view region determining unit 222 specifies the field-of-view region 23 based on the direction of the virtual camera 1 at the time point at which the rotation of the virtual camera 1 is stopped. In Step S83, the field-of-view image generating unit 223 generates the field-of-view image 26 based on the field-of-view region 23, and in Step S84, outputs the field-of-view image 26 to the HMD 110. In Step S85, the HMD 110 displays the received field-of-view image 26 on the display 112 to update the field-of-view image 26.

Figure 26A:
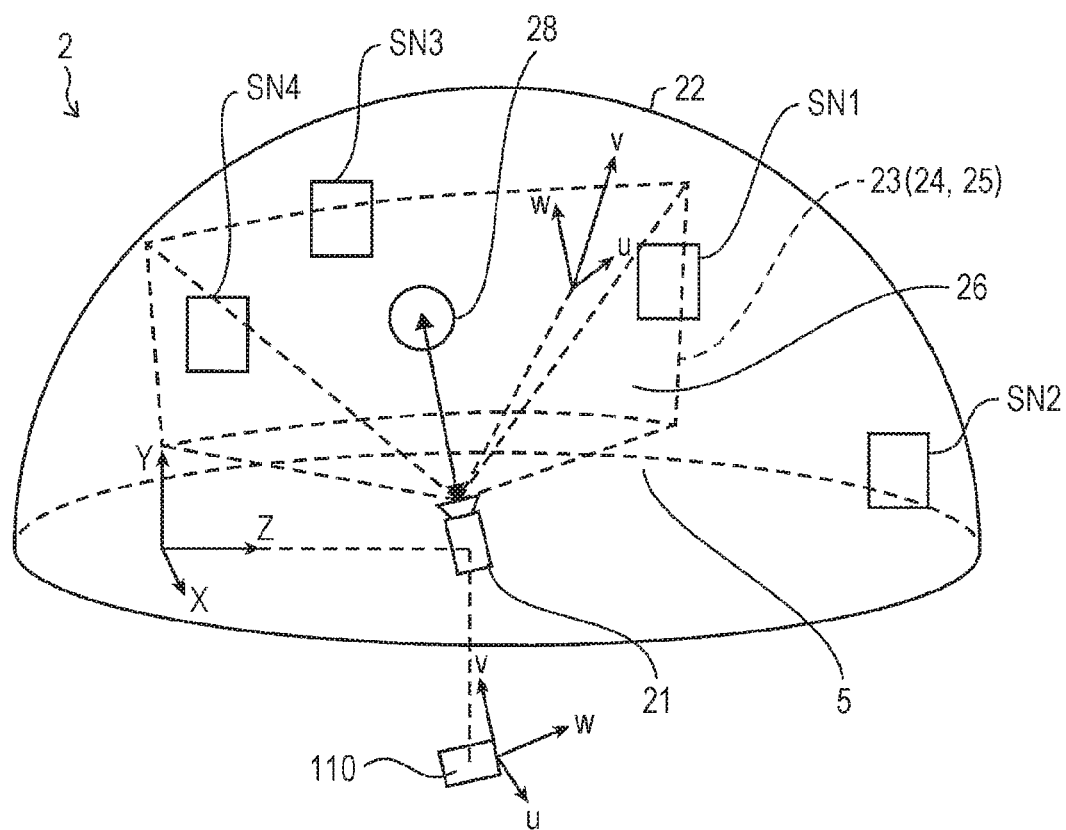
FIG. 26A is a diagram of a virtual space after rotation of a virtual camera is stopped according to at least one embodiment.
Figure 26B:
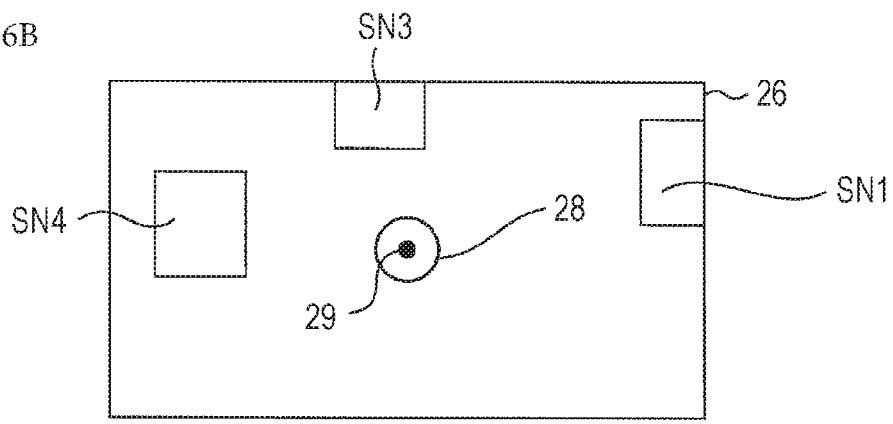
FIG. 26B is a diagram of a field-of-view image after rotation of a virtual camera is stopped according to at least one embodiment.

FIGS. 26A-26B are diagrams of the virtual space 2 and the field-of-view image 26 obtained after the rotation of the virtual camera 1 is stopped according to at least one embodiment. FIG. 26A is a diagram of the virtual space 2, and FIG. 26B is an illustration of the field-of-view image 26 according to at least one embodiment. FIGS. 26A-26B are diagrams of at least one example of a case where the rotation of the virtual camera 1 is stopped immediately after the virtual camera 1 is rotated to the state illustrated in FIGS. 25A-25B. After the rotation of the virtual camera 1 is stopped, the operation object 28 in the virtual space 2 is restored to the original circular shape. In accordance therewith, the operation object 28 included in the field-of-view image 26 is also restored to the original circular shape. The operation object 28 is not selected, and further the control circuit unit 200 is operating in the normal mode. Therefore, the user can move his or her line of sight as usual to select a desired thumbnail in the field-of-view image 26.

The field-of-view image 26 illustrated in FIG. 26 (b) includes the thumbnail SN4 located at a position separated from the thumbnail SN1 in the virtual space 2. Therefore, the user can easily bring the thumbnail SN4 that cannot be visually recognized before the rotation of the virtual camera 1 into the user's field of view with a simple operation. Further, the user can hit his or her line of sight to the thumbnail SN4 to start viewing the moving image content corresponding to the thumbnail SN4.

As described above, the HMD system 100 of this disclosure can enhance the user's sense of immersion in the virtual space 2 in the normal mode. Further, in the rotation mode, the user can visually recognize a desired portion in the virtual space 2 with an operation simpler than that in the normal mode. With the HMD system 100 supporting both of the normal mode and the rotation mode, the operability in the virtual space 2 can be further enhanced while enhancing the user's sense of immersion in the virtual space 2. Further, the respective thumbnails can be arranged in a wide range in the virtual space 2, and hence the virtual space 2 can be more effectively utilized.

The control circuit unit 200 may stop the rotation of the virtual camera 1 when the extension amount of the operation object 28 exceeds a threshold value in the rotation mode. Specifically, in the second mode, when the extension amount of the operation object 28 exceeds a threshold value, the operation object control unit 236 restores the operation object to the original shape and cancels the selection of the operation object. The operation object control unit 236 may change the display state of the operation object 28 so as to cut the extended operation object 28 before the operation object 28 is restored to the original shape. When the extension amount of the operation object 28 exceeds the threshold value, the virtual camera control unit 221 stops the rotation of the virtual camera 1. After that, the control circuit unit 200 transitions to the normal mode. Also in at least one embodiment, the user can stop the virtual camera 1 with a simple operation.

In the rotation mode, the control circuit unit 200 may rotate the virtual space 2 instead of the virtual camera 1 based on the operation performed by the user on the operation object 28. In at least one embodiment, the rotation control unit 237 notifies the virtual space defining unit 231 of the specified rotational direction and rotational speed. The virtual space defining unit 231 rotates the virtual space 2 in the notified rotational direction and at the notified rotational speed. The term "rotation" here means rotation of the virtual space 2 about an axis passing through the center 21 of the virtual space 2 as the rotational axis.

The virtual space defining unit 231 rotates the XYZ coordinate system of the virtual space 2 in the global coordinate system to rotate the virtual space 2. At this time, the data that defines the XYZ coordinate system included in the virtual space data is processed to update the data to data that defines the XYZ coordinate system obtained after the rotation. The position of each mesh section in the virtual space 2 is defined in the management data of each mesh section as coordinates in the XYZ coordinate system, and hence each mesh section similarly rotates in the global coordinate system when the XYZ coordinate system rotates in the global coordinate system. Similarly, the positions of the thumbnails SN1 to SN4 arranged in the virtual space 2 are also defined in the management data of each thumbnail as coordinates in the XYZ coordinate system, and hence the thumbnails SN1 to SN4 also similarly rotate in the global coordinate system when the XYZ coordinate system rotates in the global coordinate system.

When the virtual space defining unit 231 rotates the virtual space 2, the virtual space defining unit 231 does not rotate the virtual camera 1 together with the virtual space 2. That is, the virtual space defining unit 231 rotates the virtual space 2 while fixing the position and the inclination of the virtual camera 1 in the global coordinate system. Therefore, when the virtual space 2 rotates, the roll direction of the virtual camera 1 in the virtual space 2 relatively changes (rotates relatively to the virtual space 2). As a result, the position of the field-of-view region 23 also relatively changes, and hence the field-of-view image 26 that is based on the field-of-view region 23 also changes so as to follow the change of the position of the field-of-view region 23.

When the virtual space 2 rotates in the counterclockwise direction about the vertical direction serving as the rotational axis, the position of the field-of-view region 23 in the virtual space 2 relatively moves in the clockwise direction in the virtual space 2. With this, the field-of-view image 26 is updated so as to flow from the right to the left as viewed from the user. In contrast, when the virtual space 2 rotates in the clockwise direction about the vertical direction serving as the rotational axis, the position of the field-of-view region 23 in the virtual space 2 relatively moves in the counterclockwise direction in the virtual space 2. With this, the field-of-view image 26 is updated so as to flow from the left to the right as viewed from the user.

When the virtual space defining unit 231 rotates the virtual space 2, the virtual space defining unit 231 performs control so as not to rotate the operation object 28 together with the virtual space 2. Specifically, the virtual space defining unit 231 rotates the virtual space 2 while maintaining the positional relationship between the reference line of sight 5 and the operation object in the UVW visual-field coordinate system of the virtual camera 1. In other words, when the virtual space 2 is rotated, the position of the operation object 28 in the virtual space 2 is updated so that the operation object 28 is always arranged at a point at which the reference line of sight 5 intersects with the field-of-view region 23. As a result, the field-of-view image 26 always includes the operation object 28 no matter how much the virtual space 2 is rotated in the rotation mode. The user can always visually recognize the extended operation object 28 while the virtual space 2 is rotated, and thus the user can recognize that the virtual space 2 is currently rotated based on the operation on the operation object 28.

In at least one embodiment, the rotational direction of the virtual space 2 that is based on the extension direction of the operation object 28 designated by the user is opposite to the rotational direction of the virtual camera 1 obtained when the same extension direction is designated. With this, the field-of-view image 26 can be caused to flow in the same direction when the virtual camera 1 is rotated and when the virtual space 2 is rotated. Therefore, regardless of whether the virtual camera 1 or the virtual space 2 is to be rotated, the field-of-view image 26 can be caused to flow in a consistent direction based on the same operation performed by the user on the operation object 28.

In the normal mode, the user may move his or her line of sight instead of the HMD 110 to select and operate the operation object 28. In at least one embodiment, the user directs his or her line of sight to the operation object 28 included in the field-of-view image 26 to hit the point of gaze 29 to the operation object 28 in the field-of-view image 26. The line-of-sight managing unit 232 determines whether or not the point of gaze 29 has hit the operation object 28 for a defined time period or more. When the result of the determination is true, the operation object control unit 236 detects that the operation object 28 has been selected by the user. With this, the control circuit unit 200 transitions to the rotation mode.

After the operation object 28 is selected by the line of sight, the user can operate the operation object 28 by moving his or her line of sight. In at least one embodiment, the user changes his or her line of sight in any direction when the operation object 28 is selected. The line-of-sight managing unit 232 specifies a movement direction and a movement amount of the line-of-sight direction NO based on each line-of-sight direction NO detected before and after the line of sight is changed. The operation object control unit 236 determines the extension direction of the operation object 28 based on the movement direction of the line-of-sight direction NO, and further determines the extension amount of the operation object 28 based on the movement amount of the line-of-sight direction NO. The method of extending the operation object 28 and rotating the virtual camera 1 (or the virtual space 2) after the extension direction and the extension amount are determined is the same as that in the example described above.

In the above-mentioned example, the user changes his or her line of sight (moves his or her eyeballs) without moving the HMD 110, to thereby rotate the virtual camera 1 or the virtual space 2 in a desired direction. For example, when the user moves his or her line of sight to the front right side in the rotation mode, the virtual camera 1 can be rotated in the clockwise direction (the virtual space 2 can be rotated in the counterclockwise direction). Meanwhile, when the user moves his or her line of sight to the front left side in the rotation mode, the virtual camera 1 can be rotated in the counterclockwise direction (the virtual space 2 can be rotated in the clockwise direction). As described above, the user can bring a desired portion in the virtual space 2 into his or her field of view with a simpler operation.

The user can operate the controller 300 to select or operate the operation object 28. In at least one embodiment, in the normal mode, when the user operates the controller 300 to select the operation object 28, the operation object control unit 236 detects that the operation object 28 is selected by the user. Further, in the rotation mode, when the user operates the controller 300 to perform an operation of designating the extension direction and the extension amount of the operation object 28 for the operation object 28, the operation object control unit 236 specifies those extension direction and extension amount. The method of extending the operation object 28 and rotating the virtual camera 1 (or the virtual space 2) after the extension direction and the extension amount are determined is similar to that in the at least one example described above.

In the above-mentioned example, the user can rotate the virtual camera 1 or the virtual space 2 in a desired direction by operating the controller 300 without moving the HMD 110 or changing his or her line of sight. For example, in the rotation mode, when the user operates the controller 300 so as to extend the operation object 28 to the right side, the virtual camera 1 can be rotated in the clockwise direction (the virtual space 2 can be rotated in the counterclockwise direction). Meanwhile, in the rotation mode, when the user operates the controller 300 so as to extend the operation object 28 to the left side, the virtual camera 1 can be rotated in the counterclockwise direction (the virtual space 2 can be rotated in the clockwise direction).

The controller 300 may include a right controller to be held by the right hand of the user, and a left controller to be held by the left hand of the user. In at least one embodiment, the control circuit unit 200 can generate a virtual right hand of the user in the virtual space 2 based on the detection values of the position and the inclination of the right controller, and on the detection result of the depression operation performed by the user on each button included in the right controller. Similarly, the control circuit unit 200 can generate a virtual left hand of the user in the virtual space 2 based on the detection values of the position and the inclination of the left controller, and on the detection result of the depression operation performed by the user on each button included in the left controller. The virtual right hand and the virtual left hand are both objects.

In this mode, the user can select or operate the operation object 28 by applying an action to the operation object 28 with the virtual right hand or the virtual left hand. For example, when the user moves his or her right hand to bring the virtual right hand into contact with the operation object 28, the operation object control unit 236 detects that the operation object 28 has been selected by the user. After that, when the user operates the controller 300 to pinch the operation object 28 with the virtual right hand (for example, depress any button on the right controller), and moves his or her right hand to drag the operation object 28 in the predetermined direction with the virtual right hand, the operation object control unit 236 specifies the extension direction and the extension amount of the operation object 28 based on each detection value of the position of the right controller detected before and after the right hand is moved. The method of extending the operation object 28 and rotating the virtual camera 1 (or the virtual space 2) after the extension direction and the extension amount are determined is similar to that in the at least one example described above.

In the above-mentioned example, the user can rotate the virtual camera 1 or the virtual space 2 in a desired direction by operating the right controller without moving the HMD 110 or changing his or her line of sight. For example, in the rotation mode, when the user operates the right controller so as to drag the operation object 28 to the right side with the virtual right hand, the virtual camera 1 can be rotated in the clockwise direction (the virtual space 2 can be rotated in the counterclockwise direction). Meanwhile, in the rotation mode, when the user operates the right controller so as to drag the operation object 28 to the left side with the virtual left hand, the virtual camera 1 can be rotated in the counterclockwise direction (the virtual space 2 can be rotated in the clockwise direction). In those cases, the user can rotate the virtual camera 1 or the virtual space 2 more intuitively.

A functional section may be defined at any position on the celestial sphere surface forming the virtual space 2 in which the platform is developed. The functional section is a region in which a predetermined function can be allocated. Now, description is given of at least one example in which the control circuit unit 200 transitions to the rotation mode when the functional section is selected by the user. In the following at least one example, a function of detecting whether or not the user's line of sight (field-of-view direction or line-of-sight direction NO) has hit the functional section is allocated to the functional section. Further, a function of detecting the time at which the user's line of sight has hit the functional section is also allocated to the functional section.

In the normal mode, when the line-of-sight managing unit 232 detects that the user's line of sight (reference line of sight 5 or line-of-sight direction NO) has hit the functional section for a defined time period or more, the line-of-sight managing unit 232 detects that the functional section has been selected by the user. With this, the control circuit unit 200 transitions to the rotation mode. After that, the control circuit unit 200 starts the rotation of the virtual camera 1 or the virtual space 2 based on a certain operation performed by the user. For example, the control circuit unit 200 determines whether or not the user's line of sight is deviated from the functional section that is selected by the user through gazing for the defined time period or more. When the control circuit unit 200 determines that the user's line of sight is deviated from the functional section, the control circuit unit 200 specifies the direction in which the line of sight is deviated. Then, the control circuit unit 200 specifies the direction in which the line of sight is deviated as the movement direction of the line of sight, and further rotates the virtual camera 1 or the virtual space 2 in the rotational direction based on the specified movement direction of the line of sight. When the functional section is utilized as this example, even in a case where the virtual space 2 in which the operation object 28 cannot be defined is provided to the user, the virtual camera 1 or the virtual space 2 can be rotated based on the operation performed by the user.

This disclosure is not limited to the at least one embodiment described above, and various changes may be made thereto within the appended claims. At least one embodiment that can be obtained by combining as appropriate technical means disclosed in different embodiments is also included in the technical scope of this disclosure. A new technical feature may also be formed by combining the technical means disclosed in each embodiment.

The control blocks of the control circuit unit 200 (detection unit 210, display control unit 220, virtual space control unit 230, storage unit 240, and communication unit 250) may be implemented by a logic circuit (hardware) formed on an integrated circuit (IC chip) or the like, or may be implemented by software with use of a central processing unit (CPU).

In the latter case, the control blocks include a CPU configured to execute a command of a program, which is software for implementing each function, a read only memory (ROM) or a storage device (those components are referred to as "storage medium") having stored therein the above-mentioned program and various types of data that are readable by a computer (or the CPU), and a random access memory (RAM) to which the above-mentioned program is to be loaded. The computer (or the CPU) reads the above-mentioned program from the above-mentioned storage medium to execute the program, and thus the object of this disclosure is achieved. As the above-mentioned storage medium, "non-transitory tangible media" such as a tape, a disk, a card, a semiconductor memory, and a programmable logic circuit may be used. Further, the above-mentioned program may be supplied to the above-mentioned computer via any transmission medium (for example, a communication network or broadcast waves) that is capable of transmitting the program. This disclosure may be achieved by the above-mentioned program in the form of a data signal embedded in a carrier wave, which is embodied by electronic transmission.

This disclosure is not limited to the at least one embodiment described above, and various changes may be made thereto within the appended claims. At least one embodiment obtained by combining as appropriate technical means disclosed in different embodiments is also included in the technical scope of this disclosure.

(Item 1) A method of providing a virtual space to a user wearing a head mounted display (hereinafter referred to as "HMD"). The method includes defining the virtual space. The method further includes generating synthetic content by synthesizing moving image content to be played in the virtual space and sub-content to be displayed in apart of a display region of the moving image content. The method further includes adapting the synthetic content to the virtual space; specifying a line of sight of the user. The method further includes specifying a field-of-view region based on the line of sight; and generating a field-of-view image corresponding to the field-of-view region in the synthetic content to output the field-of-view image to the HMD. When the moving image content is played on the head mounted display, another piece of content, for example, an advertisement, can be displayed.

(Item 2) A method according to Item 1, in which the moving image content and the sub-content are synthesized so that the sub-content is displayed in a section of the virtual space determined in advance. The creator of the moving image content can specify a portion at which it is natural to display an advertisement in a video to be displayed in the moving image content, and hence the advertisement can be displayed without reducing the user's sense of immersion.

(Item 3) A method according to Item 2, further including a step of acquiring advertisement frame information representing a spatial position and a temporal position of the section associated with the moving image content, in which the moving image content and the sub-content are synthesized based on the advertisement frame information. The creator of the moving image content can specify the spatial position and the temporal position at which displaying an advertisement in a video to be displayed in the moving image content is natural, and hence the advertisement can be displayed without reducing the user's sense of immersion.

(Item 4) A method according to Item 2 or 3, further including a step of collecting line-of-sight information by determining whether or not the section and the line of sight intersect with each other. A degree of interest that the user has in the advertisement can be evaluated with use of the section even without using an object.

(Item 5) A method according to Item 4, further includes displaying a content list in which information representing details of a plurality of pieces of candidate moving image content is displayed in a list in adaptation to the virtual space; and specifying at least one of the plurality of pieces of candidate moving image content selected by the user in the content list as the moving image content, in which, when two or more pieces of candidate moving image content included in the plurality of pieces of candidate moving image content are specified as the moving image content, the sub-content is synthesized so as to include a part of the section at the same spatial position. Even when there are a plurality of pieces of moving image content, the degree of interest that the user has in the advertisement can be effectively evaluated.

(Item 5) A method according to Item 4, further including displaying a content list in which information representing details of a plurality of pieces of candidate moving image content is displayed in a list in adaptation to the virtual space. The method further includes specifying at least one of the plurality of pieces of candidate moving image content selected by the user in the content list as the moving image content, in which, when two or more pieces of candidate moving image content included in the plurality of pieces of candidate moving image content are specified as the moving image content, the sub-content is synthesized so as to include a part of the section at the same spatial position.

(Item 6) A method according to any one of Items 2 to 5, in which the step of collecting line-of-sight information includes setting a horizontal width and a vertical width of the section so as to be larger than a horizontal width and a vertical width of a portion of the moving image content in which the sub-content is synthesized, respectively, in which a difference between the horizontal width of the section and the horizontal width of the portion is smaller than a difference between the vertical width of the section and the vertical width of the portion. The need to adjust the initial direction of the moving image content in the vertical direction can be reduced.

(Item 7) A method according to anyone of Items 1 to 4, further includes displaying a content list in which information representing details of a plurality of pieces of candidate moving image content is displayed in a list in adaptation to the virtual space; and specifying at least one of the plurality of pieces of candidate moving image content selected by the user in the content list as the moving image content. The user can select desired moving image content from the plurality of pieces of moving image content.

(Item 8) A system for executing each step of the method of any one of Items 1 to 7.

(Item 9) A non-transitory storage medium having recorded thereon instructions for causing the system of Item 8 to execute the method of any one of Items 1 to 7.

(Item 1A) A method of providing a virtual space to a user wearing a head mounted display (hereinafter referred to as "HMD"). The method includes specifying an initial direction of moving image content for playing the moving image content in adaptation to the virtual space. The method further includes playing the moving image content in adaptation to the virtual space so that a horizontal direction of the initial direction matches with a horizontal direction of a roll direction of the HMD. The method further includes displaying first sub-content on a rear side of the initial direction. The method further includes updating a field of view in accordance with at least one of a direction or an inclination of the HMD. The influence on the user's sense of immersion is small even when another piece of content, for example, an advertisement is displayed when the moving image content is played on the head mounted display.

(Item 2A) A method of providing a virtual space according to Item 1A, further includes further displaying second sub-content on a front side of the initial direction. According to this method, content for guiding the user's line of sight to the first sub-content can be displayed as the second sub-content. Thus, the advertising effectiveness can be enhanced.

(Item 3A) A method according to Item 2A, in which the second sub-content is an image representing at least a part of the first sub-content. According to this method, the user's line of sight can be effectively guided to the first sub-content. Thus, the advertising effectiveness can be enhanced.

(Item 4A) A method according to Item 2A or 3A, in which the moving image content is associated with frame information including a spatial position and a temporal position for displaying the second sub-content. The method further includes acquiring the frame information, and in which the second sub-content is displayed based on the frame information. The creator of the moving image content can specify a portion at which displaying the second sub-content in a video to be displayed in the moving image content is natural, and hence the content for guiding the line of sight to the advertisement can be displayed without reducing the user's sense of immersion.

(Item 5A) A method according to Item 4A, in which the first sub-content is advertisement content, and in which the second sub-content is an image to be projected on a reflective surface that appears in the moving image content. According to this method, the user's line of sight can be effectively guided to the first sub-content without reducing the user's sense of immersion. Therefore, the advertising effectiveness can be enhanced.

(Item 6A) A method according to any one of Items 1A to 5A, in which a frame that forms the moving image content is an image taken by a plurality of image pickup elements that are directed to different directions, and is generated by connecting images that are at least partially separated from each other, and in which the step of updating a field of view includes displaying the first sub-content so as to be superimposed on a joint of the images. The image may be distorted or not displayed at the joint, but such position can be covered with the first sub-content, for example, an advertisement, and hence the user's sense of immersion is not reduced.

(Item 7A) A system for executing each step of the method of any one of Items 1A to 6A.

(Item 8) A non-transitory storage medium having recorded thereon instructions for causing the system of Item 7A to execute the method of any one of Items 1A to 6A.

(Item 1B) A method of providing a virtual space to a user wearing a head mounted display (hereinafter referred to as "HMD"). The method includes under a state in which an inclination of a virtual camera relative to the HMD in the reference coordinate system or an inclination of a spatial coordinate system of the virtual space relative to the reference coordinate system varies depending on content to be played in the virtual space, generating a field-of-view image in accordance with a direction of the virtual camera in the virtual space. The method further includes displaying the field-of-view image on the HMD. Various types of content that are assumed to be viewed in different postures can be suitably played in the virtual space in accordance with the posture of the user.

(Item 2B) A method according to Item 1B, further includes defining the virtual space having the spatial coordinate system that is parallel to the reference coordinate system; arranging the virtual camera in the virtual space. The method further includes inclining the virtual camera relatively to the HMD in the reference coordinate system based on an inclination correction value defined in advance for the content, to thereby set the direction of the virtual camera in the virtual space. Inclining the spatial coordinate system of the virtual space with respect to the reference coordinate system is unnecessary.

(Item 3B) A method according to Item 1B, further includes defining the virtual space having the spatial coordinate system that is inclined relatively to the reference coordinate system based on an inclination correction value defined in advance for the content; arranging the virtual camera in the virtual space. The method further includes setting the direction of the virtual camera in the virtual space by matching an inclination of the virtual camera in the reference coordinate system with an inclination of the HMD. Inclining the virtual camera with respect to the HMD is unnecessary.

(Item 4B) A method according to Item 2B or 3B, in which the setting the direction of the virtual camera includes setting the direction of the virtual camera so as to be parallel to an XZ plane in the virtual space when the inclination of the HMD with respect to a horizontal direction matches with the inclination correction value. Various types of content that are assumed to be viewed in different postures can be most suitably played in the virtual space in accordance with the posture of the user.

(Item 5B) A method according to any one of Items 1B to 4B, further includes specifying a reference line of sight of the user; updating the direction of the virtual camera and specifying a field-of-view region based on the reference line of sight. The method further includes updating the field-of-view image based on the field-of-view region. The field-of-view image can be appropriately updated in synchronization with the movement of the HMD.

(Item 6B) A system for executing each step of the method of any one of Items 1B to 5B.

(Item 7) A non-transitory storage medium having recorded thereon instructions for causing the system of Item 6B to execute the method of any one of Items 1B to 5B.

(Item 1C) A method of providing a virtual space to a user wearing a head mounted display (hereinafter referred to as "HMD"). The method includes, in a first mode, displaying, on the HMD, a field-of-view image that is based on a roll direction of a virtual camera that is arranged in the virtual space and is synchronized with the HMD; and in a second mode, specifying at least a rotational direction based on an operation performed by the user, and updating the field-of-view image to be displayed on the HMD while continuously rotating the virtual camera or the virtual space in the rotational direction as long as the operation is being detected. The operability in the virtual space can be enhanced.

(Item 2C) A method according to Item 1C, in which the step of displaying, on the HMD, a field-of-view image includes displaying, on the HMD, the field-of-view image including an operation object arranged in the virtual space. The method further includes, in the first mode, detecting that the operation object has been selected by the user; and in the first mode, transitioning to the second mode after detection that the operation object has been selected. Transition to the second mode can be achieved in accordance with the will of the user.

(Item 3C) A method according to Item 2C, further includes, in the second mode, specifying a predetermined direction designated by the user on the operation object after detection that the operation object has been selected. The method further includes, in the second mode, elastically deforming the operation object in the predetermined direction, in which the step of determining the rotational direction includes determining the rotational direction based on the predetermined direction. The virtual camera or the virtual space can be rotated based on the operation performed by the user on the operation object.

(Item 4C) A method according to Item 3C, in which the step of determining the rotational direction includes determining the rotational direction based on a horizontal component of the predetermined direction. The user can be prevented from feeling sick in the virtual space.

(Item 5C) A method according to Item 4C, further includes, in the second mode, detecting that designation of the predetermined direction to the operation object has been cancelled; in the second mode, in response to detection that the designation of the predetermined direction has been cancelled, restoring the operation object to an original shape, and cancelling and changing selection of the operation object. The method further includes, in the second mode, in response to detection that the designation of the predetermined direction has been cancelled, stopping rotation of the virtual camera or the virtual space and transitioning to the first mode. The user can stop the rotation of the virtual camera or the virtual space with a simple operation.

(Item 6C) A method according to any one of Items 3C to 5C, further including a step of, in the second mode, specifying a change amount of an inclination of the HMD in a reference coordinate system after detection that the operation object has been selected, in which the step of specifying a predetermined direction includes specifying the predetermined direction based on the change amount of the inclination. The user can change the direction in which the HMD is to be inclined to adjust the rotational speed method of the virtual camera or the virtual space.

(Item 7C) A method according to Item 6C, in which the step of detecting that designation of the predetermined direction has been cancelled includes detecting that the designation of the predetermined direction has been cancelled when the inclination of the HMD detected after the rotation of the virtual camera or the virtual space is started matches with the inclination of the HMD at a time point at which selection of the operation object has been detected. The user can stop the rotation of the virtual camera or the virtual space with a simple operation.

(Item 8C) A method according to any one of Items 3C to 7C, further includes, in the second mode, specifying a predetermined amount designated by the user on the operation object after it is detected that the operation object has been selected. The method further includes, in the second mode, determining a rotational speed used when the virtual camera or the virtual space is rotated based on the predetermined amount, in which the step of elastically deforming the operation object includes extending the operation object by the predetermined amount, and in which the step of updating the field-of-view image includes continuously rotating the virtual camera or the virtual space at the rotational speed. The user can rotate the virtual camera or the virtual space at a desired rotational speed.

(Item 9C) A method according to Item 8C, further includes, in the second mode, restoring the operation object to an original shape and cancelling the selection of the operation object when the predetermined amount exceeds a threshold value; in the second mode, stopping the rotation of the virtual camera or the virtual space when the predetermined amount exceeds the threshold value. The method further includes, in the second mode, transitioning to the first mode after the rotation of the virtual camera or the virtual space is stopped. The user can stop the rotation of the virtual camera or the virtual space with a simple operation.

(Item 10C)

A method according to Item 8C or 9C, further includes, in the second mode, specifying a change amount of an inclination of the HMD in a reference coordinate system after detection that the operation object has been selected, in which the step of specifying a predetermined amount includes specifying the predetermined amount based on the change amount of the inclination. The user can change the degree to incline the HMD to adjust the rotational speed method of the virtual camera or the virtual space.

(Item 11C)

A method according to any one of Items 2C to 10C, further includes, in the first mode, detecting that at least a part of the operation object is positioned outside of a field-of-view region of the virtual camera, The method further includes, in the first mode, moving the operation object into the field-of-view region when it is detected that at least the part of the operation object is positioned outside of the field-of-view region. The user can easily find the object.

(Item 12C)

A method according to Item 1C, further includes, in the first mode, detecting that a functional section defined in the virtual space has been selected by a user; and in the first mode, transitioning to the second mode in response to detection that the functional section defined in the virtual space has been selected by the user. Even when a virtual space in which an object cannot be used is provided, the virtual camera or the virtual space can be rotated based on the operation performed by the user.

(Item 13C) A system for executing each step of the method of any one of Items 1C to 12C.

(Item 14C) A non-transitory storage medium having recorded thereon instructions for causing the system of Item 13C to execute any one of the Items 1C to 12C.

The invention claimed is:

1. A method of providing a 360 degree virtual space to a head mounted display (HMD), the method comprising:
    defining the 360 degree virtual space including sections;
    generating synthetic content by synthesizing a main content and sub-content, the main content to be played in the 360 degree virtual space as a 360 degree movie in accordance with a predetermined timeline, the 360 degree movie is played at a predetermined rate regardless of movement of a user, and the sub-content to be displayed in a part of a display region of the main content at a predetermined temporal position defined by the timeline, the display region is specified by one or more sections of the 360 degree virtual space, and the sub-content is displayed in response to playback reaching the predetermined temporal position;
    adapting the synthetic content to the 360 degree virtual space;
    determining a line of sight of the user;
    specifying a field-of-view region based on the line of sight; and
    generating a field-of-view image corresponding to the field-of-view region in the synthetic content to output the field-of-view image to the HMD.

2. The method according to claim 1, further comprising determining whether the section and the line of sight intersect with each other to collect line-of-sight information.

3. The method according to claim 2, further comprising:
    displaying a content list including plurality of candidate contents adapted to the 360 degree virtual space; and
    specifying one of the candidate content selected by the user as the main content,
    wherein spatial positions of the display region in the 360 degree virtual space is the same between two or more candidate contents specified as the main content.

4. The method according to claim 1,
    wherein a horizontal width of the section included in the display region is larger than a horizontal width of the display region of the main content,
a vertical width of the section in the display region is larger than a vertical width of the display region of the main content, and
    a difference between the horizontal width of the section and the horizontal width of the display region is smaller than a difference between the vertical width of the section and the vertical width of the display region.

5. The method according to claim 1, further comprising:
    displaying a content list including a plurality of candidate contents adapted to the 360 degree virtual space; and
    specifying one of the candidate content selected by the user as the main content.

6. A method of providing a 360 degree virtual space to a head mounted display (HMD), the method comprising:
    defining the 360 degree virtual space including sections;
    acquiring frame information representing a spatial position of the one or more sections and a temporal position associated with a main content,
    generating synthetic content by synthesizing the main content and sub-content based on the frame information, the main content to be played in the 360 degree virtual space as a 360 degree movie, the 360 degree movie is played at a predetermined rate regardless of movement of a user, and the sub-content to be displayed in a part of a display region of the main content at the temporal position of the main content, the display region is specified by the spatial position, and the sub-content is displayed in response to playback reaching the temporal position;
    adapting the synthetic content to the 360 degree virtual space;
    determining a line of sight of the user;
    specifying a field-of-view region based on the line of sight; and
    generating a field-of-view image corresponding to the field-of-view region in the synthetic content to output the field-of-view image to the HMD.

7. The method according to claim 6, further comprising determining whether the section and the line of sight intersect with each other to collect line-of-sight information.

8. The method according to claim 7, further comprising:
    displaying a content list including plurality of candidate contents adapted to the 360 degree virtual space; and
    specifying one of the candidate content selected by the user as the main content,
    wherein spatial positions of the display region in the 360 degree virtual space is the same between two or more candidate contents specified as the main content.

9. The method according to claim 6,
    wherein a horizontal width of the section included in the display region is larger than a horizontal width of the display region of the main content, a vertical width of the section in the display region is larger than a vertical width of the display region of the main content, and a difference between the horizontal width of the section and the horizontal width of the display region is smaller than a difference between the vertical width of the section and the vertical width of the display region.

10. The method according to claim 6, further comprising:

displaying a content list including a plurality of candidate contents adapted to the 360 degree virtual space; and specifying one of the candidate content selected by the user as the main content.

11. A system comprising:

a processor; and a non-transitory storage medium connected to the processor, wherein the processor is configured execute instructions stored in the non-transitory storage medium for:

defining a virtual space to be displayed on a head mounted display (HMD);

generating synthetic content by synthesizing moving image content to be played in the virtual space and sub-content to be displayed in a part of a display region of the moving image content, wherein generating the synthetic content comprising:

synthesizing the moving image content and the sub-content so that the sub-content is displayed in a section defined in advance in the virtual space in response to the playing of the moving image content reaching a predetermined temporal position wherein the moving image content comprises a 360 degree movie played at a predetermined rate regardless of movement of a user;

adapting the synthetic content to the virtual space;

determining a line of sight of the user;

specifying a field-of-view region based on the line of sight; and generating a field-of-view image corresponding to the field-of-view region in the synthetic content to output the field-of-view image to the HMD.

12. A non-transitory storage medium having recorded thereon instructions for causing a system comprising a processor to:

define a virtual space to be displayed on a head mounted display (HMD);

generate synthetic content by synthesizing moving image content to be played in the virtual space and sub-content to be displayed in a part of a display region of the moving image content, wherein the synthetic content is generated by:

synthesizing the moving image content and the sub-content so that the sub-content is displayed in a section defined in advance in the virtual space and in response to the playing of the moving image content reaching a predetermined temporal position, wherein the moving image content comprises a 360 degree movie played at a predetermined rate regardless of movement of a user;

adapt the synthetic content to the virtual space;

determine a line of sight of the user;

specify a field-of-view region based on the line of sight; and generate a field-of-view image corresponding to the field-of-view region in the synthetic content to output the field-of-view image to the HMD.

* * * * *